US011442898B2

(12) United States Patent
Kremer et al.

(10) Patent No.: US 11,442,898 B2
(45) Date of Patent: *Sep. 13, 2022

(54) FILE SYSTEM HIERARCHIES AND FUNCTIONALITY WITH CLOUD OBJECT STORAGE

(71) Applicant: Oracle International Corporation, Redwood Shores, CA (US)

(72) Inventors: James Kremer, Longmont, CO (US); Mark Maybee, Boulder, CO (US); Natalie Ross, Louisville, CO (US); Pascal Ledru, Broomfield, CO (US); Victor Latushkin, Superior, CO (US); Ankit Gureja, Santa Clara, CA (US); Kimberly Morneau, Mountain View, CA (US); Jingfei Zhang, Newark, CA (US); Gavin Gibson, Westminster, CO (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 42 days.

This patent is subject to a terminal disclaimer.

(21) Appl. No.: 16/822,406

(22) Filed: Mar. 18, 2020

(65) Prior Publication Data
US 2020/0218752 A1    Jul. 9, 2020

Related U.S. Application Data

(63) Continuation of application No. 15/610,349, filed on May 31, 2017, now Pat. No. 10,642,878.
(Continued)

(51) Int. Cl.
*G06F 16/20*  (2019.01)
*G06F 16/172* (2019.01)
(Continued)

(52) U.S. Cl.
CPC .............. *G06F 16/172* (2019.01); *G06F 1/28* (2013.01); *G06F 3/061* (2013.01); *G06F 3/064* (2013.01);
(Continued)

(58) Field of Classification Search
CPC .. G06F 16/172; G06F 16/182; G06F 16/1844; G06F 16/434; G06F 16/2365;
(Continued)

(56) References Cited

U.S. PATENT DOCUMENTS 6,732,237 B1    5/2004   Jacobs et al.
7,761,432 B2    7/2010   Ahrens et al.
(Continued)

FOREIGN PATENT DOCUMENTS

EP       2615566        7/2013
JP    2011003187 A      1/2011
(Continued)

OTHER PUBLICATIONS

European Application No. EP17832850.6, Office Action dated Mar. 23, 2021, 16 pages.
(Continued)

*Primary Examiner* — Tarek Chbouki
(74) *Attorney, Agent, or Firm* — Kilpatrick Townsend & Stockton LLP

(57) ABSTRACT

Techniques described herein relate to systems and methods of data storage, and more particularly to providing layering of file system functionality on an object interface. In certain embodiments, file system functionality may be layered on cloud object interfaces to provide cloud-based storage while allowing for functionality expected from a legacy applications. For instance, POSIX interfaces and semantics may be layered on cloud-based storage, while providing access to data in a manner consistent with file-based access with data (Continued)

organization in name hierarchies. Various embodiments also may provide for memory mapping of data so that memory map changes are reflected in persistent storage while ensuring consistency between memory map changes and writes. For example, by transforming a ZFS file system disk-based storage into ZFS cloud-based storage, the ZFS file system gains the elastic nature of cloud storage.

17 Claims, 25 Drawing Sheets

Related U.S. Application Data

(60) Provisional application No. 62/443,391, filed on Jan. 6, 2017.

(51) Int. Cl.
| | |
|---|---|
| *G06F 3/06* | (2006.01) |
| *G06F 11/14* | (2006.01) |
| *G06F 16/182* | (2019.01) |
| *G06F 16/185* | (2019.01) |
| *G06F 12/0868* | (2016.01) |
| *G06F 12/128* | (2016.01) |
| *H04L 67/1095* | (2022.01) |
| *G06F 11/10* | (2006.01) |
| *G06F 12/0897* | (2016.01) |
| *G06F 16/23* | (2019.01) |
| *G06F 16/901* | (2019.01) |
| *G06F 9/50* | (2006.01) |
| *G06F 11/30* | (2006.01) |
| *G06F 12/0804* | (2016.01) |
| *G06F 12/0813* | (2016.01) |
| *G06F 12/123* | (2016.01) |
| *H04L 9/40* | (2022.01) |
| *G06F 16/432* | (2019.01) |
| *G06F 16/11* | (2019.01) |
| *G06F 1/28* | (2006.01) |
| *G06F 9/455* | (2018.01) |
| *G06F 11/07* | (2006.01) |
| *G06F 11/32* | (2006.01) |
| *G06F 11/34* | (2006.01) |
| *G06F 21/60* | (2013.01) |
| *H04L 9/06* | (2006.01) |
| *H04L 9/08* | (2006.01) |
| *H04L 9/14* | (2006.01) |
| *H04L 67/1097* | (2022.01) |
| *G06F 12/14* | (2006.01) |
| *H03M 7/30* | (2006.01) |
| *H03M 7/40* | (2006.01) |

(52) U.S. Cl.
CPC ............ *G06F 3/065* (2013.01); *G06F 3/0605* (2013.01); *G06F 3/0607* (2013.01); *G06F 3/067* (2013.01); *G06F 3/0608* (2013.01); *G06F 3/0617* (2013.01); *G06F 3/0623* (2013.01); *G06F 3/0641* (2013.01); *G06F 3/0643* (2013.01); *G06F 3/0665* (2013.01); *G06F 3/0667* (2013.01); *G06F 9/45558* (2013.01); *G06F 9/5077* (2013.01); *G06F 11/07* (2013.01); *G06F 11/1004* (2013.01); *G06F 11/14* (2013.01); *G06F 11/1446* (2013.01); *G06F 11/1464* (2013.01); *G06F 11/3006* (2013.01); *G06F 11/3034* (2013.01); *G06F 11/3037* (2013.01); *G06F 11/328* (2013.01); *G06F 11/3495* (2013.01); *G06F 12/0804* (2013.01); *G06F 12/0813* (2013.01); *G06F 12/0868* (2013.01); *G06F 12/0897* (2013.01); *G06F 12/123* (2013.01); *G06F 12/128* (2013.01); *G06F 16/128* (2019.01); *G06F 16/182* (2019.01); *G06F 16/184* (2019.01); *G06F 16/185* (2019.01); *G06F 16/1844* (2019.01); *G06F 16/2365* (2019.01); *G06F 16/434* (2019.01); *G06F 16/9027* (2019.01); *G06F 21/602* (2013.01); *H04L 9/0637* (2013.01); *H04L 9/0822* (2013.01); *H04L 9/14* (2013.01); *H04L 63/0428* (2013.01); *H04L 67/1095* (2013.01); *H04L 67/1097* (2013.01); *G06F 12/1408* (2013.01); *G06F 2009/4557* (2013.01); *G06F 2009/45583* (2013.01); *G06F 2009/45595* (2013.01); *G06F 2201/80* (2013.01); *G06F 2201/81* (2013.01); *G06F 2201/84* (2013.01); *G06F 2212/154* (2013.01); *G06F 2212/225* (2013.01); *G06F 2212/262* (2013.01); *G06F 2212/284* (2013.01); *G06F 2212/313* (2013.01); *G06F 2212/401* (2013.01); *G06F 2212/502* (2013.01); *H03M 7/30* (2013.01); *H03M 7/3086* (2013.01); *H03M 7/40* (2013.01)

(58) Field of Classification Search
CPC .. G06F 16/9027; G06F 16/184; G06F 16/128; G06F 16/185; G06F 1/28; G06F 3/0605
See application file for complete search history.

(56) References Cited

U.S. PATENT DOCUMENTS

| | | | |
|---|---|---|---|
| 7,873,601 B1 | 1/2011 | Kushwah | |
| 8,504,529 B1 | 8/2013 | Zheng et al. | |
| 8,706,701 B1 | 4/2014 | Stefanov et al. | |
| 8,805,967 B2 | 8/2014 | Taylor et al. | |
| 9,462,055 B1 | 10/2016 | Herrin et al. | |
| 9,659,047 B2 | 5/2017 | Sharma et al. | |
| 9,836,244 B2 | 12/2017 | Bates | |
| 10,049,121 B2 | 8/2018 | Bender et al. | |
| 10,140,139 B1 | 11/2018 | Pratt | |
| 10,146,694 B1 * | 12/2018 | Laier .................. | G06F 16/13 |
| 10,235,064 B1 | 3/2019 | Natanzon et al. | |
| 10,503,771 B2 | 12/2019 | Maybee et al. | |
| 10,540,384 B2 | 1/2020 | Maybee et al. | |
| 10,552,469 B2 | 2/2020 | Maybee et al. | |
| 10,558,699 B2 | 2/2020 | Maybee et al. | |
| 10,642,878 B2 | 5/2020 | Kremer et al. | |
| 10,642,879 B2 | 5/2020 | Maybee et al. | |
| 10,650,035 B2 | 5/2020 | Maybee et al. | |
| 10,657,167 B2 | 5/2020 | Maybee et al. | |
| 10,698,941 B2 | 6/2020 | Maybee et al. | |
| 10,884,984 B2 | 1/2021 | Maybee et al. | |
| 11,074,220 B2 | 7/2021 | Maybee et al. | |
| 11,074,221 B2 | 7/2021 | Maybee et al. | |
| 2007/0186128 A1 | 8/2007 | Rambo et al. | |
| 2008/0147974 A1 | 6/2008 | Madison et al. | |
| 2010/0250700 A1 | 9/2010 | O'Brien et al. | |
| 2010/0325199 A1 | 12/2010 | Park et al. | |
| 2010/0332456 A1 | 12/2010 | Prahlad et al. | |
| 2011/0022566 A1 | 1/2011 | Beaverson et al. | |
| 2011/0066668 A1 | 3/2011 | Guarraci | |
| 2011/0283085 A1 | 11/2011 | Dilger et al. | |
| 2011/0283113 A1 | 11/2011 | Moffat et al. | |
| 2011/0295929 A1 | 12/2011 | Sagar et al. | |
| 2011/0307529 A1 | 12/2011 | Mukherjee et al. | |
| 2011/0320865 A1 | 12/2011 | Jain et al. | |
| 2012/0011337 A1 | 1/2012 | Aizman | |
| 2012/0233228 A1 | 9/2012 | Barton et al. | |
| 2012/0254116 A1 | 10/2012 | Thereska et al. | |
| 2013/0041872 A1 | 2/2013 | Aizman et al. | |
| 2013/0110779 A1 | 5/2013 | Taylor et al. | |
| 2013/0111262 A1 | 5/2013 | Taylor et al. | |
| 2013/0185258 A1 | 7/2013 | Bestler et al. | |

(56) References Cited

U.S. PATENT DOCUMENTS

| | | |
|---|---|---|
| 2014/0006354 A1 | 1/2014 | Parkison et al. |
| 2014/0006465 A1 | 1/2014 | Davis et al. |
| 2014/0164449 A1* | 6/2014 | Kim .................. G06F 16/188 707/827 |
| 2014/0201145 A1 | 7/2014 | Dorman et al. |
| 2014/0279896 A1 | 9/2014 | Branton et al. |
| 2015/0186287 A1 | 7/2015 | Kass |
| 2015/0227600 A1 | 8/2015 | Ramu et al. |
| 2015/0227602 A1 | 8/2015 | Ramu et al. |
| 2015/0261798 A1 | 9/2015 | Serlet |
| 2015/0288758 A1 | 10/2015 | Ori |
| 2016/0110261 A1 | 4/2016 | Parab et al. |
| 2016/0191250 A1 | 6/2016 | Bestler et al. |
| 2016/0191509 A1 | 6/2016 | Bestler et al. |
| 2016/0192178 A1* | 6/2016 | Blong .............. H04N 21/4334 455/418 |
| 2016/0292178 A1 | 10/2016 | Manville et al. |
| 2016/0337473 A1 | 11/2016 | Rao |
| 2016/0350551 A1 | 12/2016 | Chang et al. |
| 2016/0357443 A1* | 12/2016 | Li ..................... G06F 3/0617 |
| 2017/0075781 A1 | 3/2017 | Bennett, Jr. et al. |
| 2017/0262465 A1 | 9/2017 | Goggin et al. |
| 2017/0371889 A1 | 12/2017 | Golander et al. |
| 2018/0159929 A1 | 6/2018 | Heckle |

FOREIGN PATENT DOCUMENTS

| | | |
|---|---|---|
| JP | 2014010465 A | 1/2014 |
| JP | 2014178734 A | 9/2014 |
| JP | 2016206952 A | 12/2016 |
| WO | 2012055966 | 5/2012 |
| WO | 2016115219 A1 | 7/2016 |

OTHER PUBLICATIONS

European Application No. 17829857.6, Office Action dated Feb. 22, 2021, 12 pages.
European Application No. 18701390.9, Office Action dated Feb. 26, 2021, 6 pages.
European Application No. 17832886.0, Office Action dated Feb. 10, 2021, 6 pages.
U.S. Appl. No. 15/610,361, Final Office Action dated Nov. 13, 2020, 14 pages.
U.S. Appl. No. 15/610,361 received a Non-Final Office Action dated Jun. 1, 20202, 13 pages.
U.S. Appl. No. 15/610,349, Final Office Action dated Sep. 25, 2019, 7 pages.
U.S. Appl. No. 15/610,349, Non-Final Office Action dated Mar. 18, 2019, 11 pages.
U.S. Appl. No. 15/610,365, Non-Final Office Action dated Jul. 27, 2018, 8 pages.
U.S. Appl. No. 15/610,365, Notice of Allowance dated Feb. 25, 2019, 8 pages.
U.S. Appl. No. 15/610,370, Final Office Action dated Oct. 29, 2019, 7 pages.
U.S. Appl. No. 15/610,370, Non-Final Office Action dated Apr. 15, 2019, 13 pages.
U.S. Appl. No. 15/610,380, Non-Final Office Action dated May 2, 2019, 6 pages.
U.S. Appl. No. 15/610,400, Final Office Action dated Oct. 17, 2019, 8 pages.
U.S. Appl. No. 15/610,400, Non-Final Office Action dated Mar. 29, 2019, 13 pages.
U.S. Appl. No. 15/610,416, Non-Final Office Action dated Sep. 26, 2019, 13 pages.
U.S. Appl. No. 15/610,424, Non-Final Office Action dated Mar. 7, 2019, 25 pages.
U.S. Appl. No. 15/610,444, Non-Final Office Action dated Apr. 11, 2019, 9 pages.
U.S. Appl. No. 15/610,456, Non-Final Office Action dated Mar. 7, 2019, 26 pages.
U.S. Appl. No. 15/610,467, Final Office Action dated Oct. 3, 2019, 25 pages.
U.S. Appl. No. 15/610,467, Non-Final Office Action dated Mar. 7, 2019, 22 pages.
U.S. Appl. No. 15/610,467, Non-Final Office Action dated Jan. 30, 2020, 24 pages.
International Application No. PCT/US2017/067708, International Search Report and Written Opinion dated Apr. 6, 2018, 19 pages.
International Application No. PCT/US2017/067962, International Search Report and Written Opinion dated Apr. 6, 2018, 12 pages.
International Application No. PCT/US2017/068292, International Search Report and Written Opinion dated Apr. 6, 2018, 13 pages.
International Application No. PCT/US2017/068857, International Search Report and Written Opinion dated Apr. 6, 2018, 13 pages.
International Application No. PCT/US2017/068861, International Search Report and Written Opinion dated Apr. 6, 2018, 10 pages.
International Application No. PCT/US2017/068863, International Search Report and Written Opinion dated Apr. 4, 2018, 13 pages.
International Application No. PCT/US2017/068864, International Search Report and Written Opinion dated Apr. 6, 2018, 13 pages.
International Application No. PCT/US2017/068866, International Search Report and Written Opinion dated Apr. 6, 2018, 16 pages.
International Application No. PCT/US2017/068867, International Search Report and Written Opinion dated Apr. 6, 2018, 10 pages.
International Application No. PCT/US2018/012254, International Search Report and Written Opinion dated Apr. 3, 2018, 13 pages.
International Application No. PCT/US2018/012313, International Search Report and Written Opinion dated Apr. 6, 2018, 13 pages.
U.S. Appl. No. 16/568,672, Non-Final Office Action dated Dec. 22, 2020, 5 pages.
U.S. Appl. No. 16/748,420, Notice of Allowance dated Oct. 12, 2021, 10 pages.
U.S. Appl. No. 16/829,958, First Action Interview Pilot Program Pre-Interview Communication dated Oct. 26, 2021, 5 pages.
U.S. Appl. No. 16/829,979, First Action Interview Pilot Program Pre-Interview Communication dated Nov. 8, 2021, 5 pages.
U.S. Appl. No. 16/881,638, Non-Final Office Action dated Nov. 9, 2021, 7 pages.
European Application No. 17832885.2, Office Action dated Oct. 22, 2021, 9 pages.
U.S. Appl. No. 16/748,420, Non-Final Office Action dated Jul. 8, 2021, 8 pages.
European Application No. 17832716.9, Office Action dated May 11, 2021, 16 pages.
European Application No. 17832883.7, Summons to Attend Oral Proceedings mailed on Jul. 26, 2021, 10 pages.
European Application No. 18701834.6, Office Action dated Sep. 8, 2021, 7 pages.

* cited by examiner

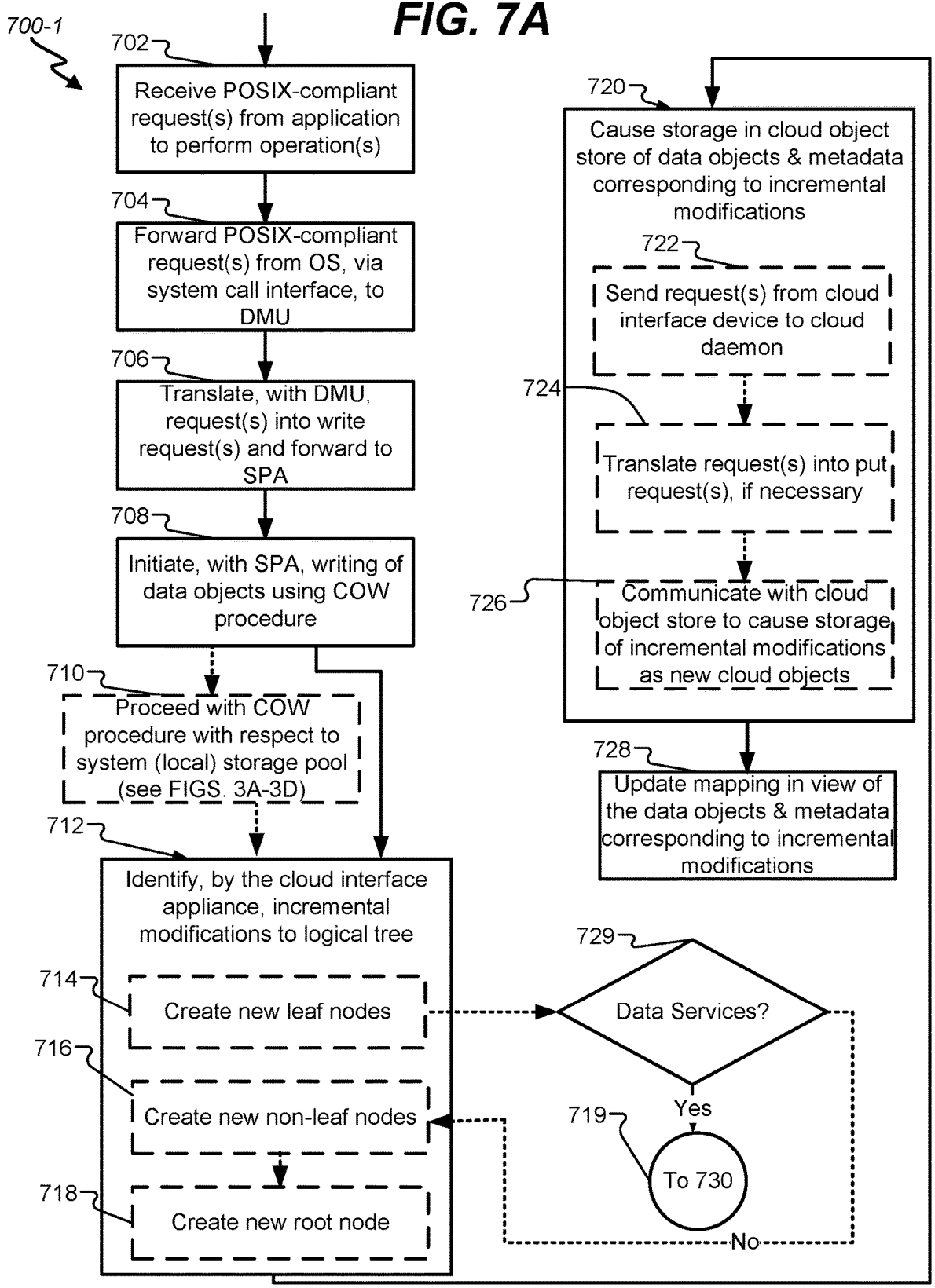

FILE SYSTEM HIERARCHIES AND FUNCTIONALITY WITH CLOUD OBJECT STORAGE

CROSS-REFERENCES TO RELATED APPLICATIONS

This application is a continuation of U.S. patent application Ser. No. 15/610,349, filed May 31, 2017, entitled, "FILE SYSTEM HIERARCHIES AND FUNCTIONALITY WITH CLOUD OBJECT STORAGE," which is a non-provisional of and claims the benefit and priority under 35 U.S.C. 119(e) of U.S. Provisional Application No. 62/443,391, filed Jan. 6, 2017, entitled "FILE SYSTEM HIERARCHIES AND FUNCTIONALITY WITH CLOUD OBJECT STORAGE," the entire contents of each of which are incorporated herein by reference for all purposes.

TECHNICAL FIELD OF THE INVENTION

This disclosure generally relates to systems and methods of data storage, and more particularly to layering file system functionality on an object interface.

BACKGROUND

The continuous expansion of the Internet, along with the expansion and sophistication of computing networks and systems, has led to the proliferation of content being stored and accessible over the Internet. This, in turn, has driven the need for large and sophisticated data storage systems. As the demand for data storage continues to increase, larger and more sophisticated storage systems are being designed and deployed. Many large-scale data storage systems utilize storage appliances that include arrays of physical storage media. These storage appliances are capable of storing incredible amounts of data. For example, at this time, Oracle's SUN ZFS Storage ZS5-4 appliance can store up to 6.9 petabytes of data. Moreover, multiple storage appliances may be networked together to form a storage pool, which can further increase the volume of stored data.

Typically, large storage systems such as these may include a file system for storing and accessing files. In addition to storing system files (operating system files, device driver files, etc.), the file system provides storage and access of user data files. If any of these files (system files and/or user files) contain critical data, then it becomes advantageous to employ a backup storage scheme to ensure that critical data is not lost if a file storage device fails.

Conventional cloud-based storage is object-based and offers elasticity and scale. However, cloud object storage presents a number of problems. Cloud object storage offers interfaces that are based on getting and putting whole objects. Cloud object storage provides a limited ability to search, and typically has high latency. The limited cloud-based interfaces do not align with needs of local file system applications. Converting legacy applications to use an object interface would be expensive and may not be practical or even possible. Cloud object storage encryption keeps encryption keys making data more vulnerable and less secure.

Thus, there is a need for systems and methods that address the foregoing problems in order to provide layering of file system functionality on an object interface. This and other needs are addressed by the present disclosure.

BRIEF SUMMARY

Certain embodiments of the present disclosure relate generally to systems and methods of data storage, and more particularly to systems and methods for layering file system functionality on an object interface.

Various techniques (e.g., systems, methods, computer-program products tangibly embodied in a non-transitory machine-readable storage medium, etc.) are described herein for providing layering of file system functionality on an object interface. In certain embodiments, file system functionality may be layered on cloud object interfaces to provide cloud-based storage while allowing for functionality expected from a legacy applications. For instance, POSIX interfaces and semantics may be layered on cloud-based storage, while providing access to data in a manner consistent with file-based access with data organization in name hierarchies. Various embodiments also may provide for memory mapping of data so that memory map changes are reflected in persistent storage while ensuring consistency between memory map changes and writes. For example, by transforming a ZFS file system disk-based storage into ZFS cloud-based storage, the ZFS file system gains the elastic nature of cloud storage.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of embodiments according to the present disclosure may be realized by reference to the remaining portions of the specification in conjunction with the following appended figures.

FIGS. 7A-F are block diagrams that illustrates an example method directed to certain features of a COW process for the hybrid cloud storage system, in accordance with certain embodiments of the present disclosure including data services, snapshots, and clones.

Figure 1:
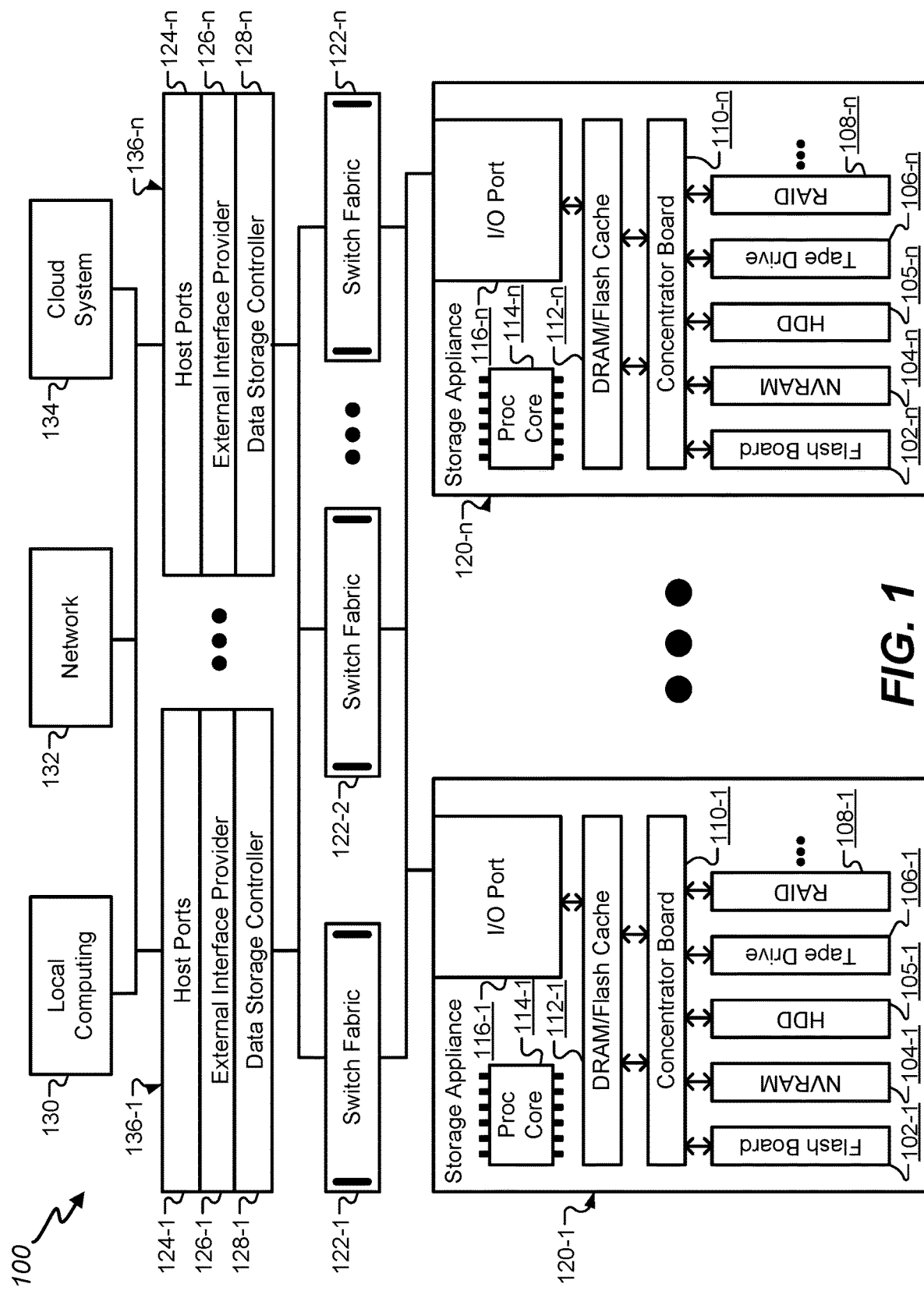
FIG. 1 illustrates one example storage network that may be used in accordance with certain embodiments of the present disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

As noted above, cloud-based storage offers elasticity and scale, but presents a number of problems. Cloud object storage offers interfaces that are based on getting and putting whole objects. Cloud object storage provides a limited ability to search, and typically has high latency. The limited cloud-based interfaces do not align with needs of local file system applications. Converting legacy applications to use an object interface would be expensive and may not be practical or even possible. Hence, solutions are needed so that is not necessary to change file system applications to directly access cloud object storage because it promises to be complex and expensive.

The solutions should allow native application interfaces to be preserved without introducing various types of adaptation layers to map the data of a local storage system to object storage in the cloud. Accordingly, certain embodiments according to the present disclosure may layer file system functionality on cloud object interfaces to provide cloud-based storage while allowing for functionality expected from a legacy applications. For example, legacy applications, which are not cloud-based, may access data primarily as files and may be configured for POSIX interfaces and semantics. From the legacy application perspective, being able to modify content of a file without rewriting the file is expected. Likewise, being to be able to organize data in name hierarchies is expected.

To accommodate such expectations, certain embodiments may layer POSIX interfaces and semantics on cloud-based storage, while providing access to data in a manner that, from a user perspective, is consistent with file-based access with data organization in name hierarchies. Further, certain embodiments may provide for memory mapping of data so that memory map changes are reflected in persistent storage while ensuring consistency between memory map changes and writes. By transforming a ZFS file system disk-based storage into ZFS cloud-based storage, the ZFS file system gains the elastic nature of cloud storage. By mapping "disk blocks" to cloud objects, the storage requirements for the ZFS file system are only the "blocks" actually in use. The system may always be thinly provisioned with no risk of running out of backing storage. Conversely, the cloud storage gains ZFS file system semantics and services. Full POSIX semantics may be provided to cloud clients, as well as any additional data services (such as compression, encryption, snapshots, etc.) provided by the ZFS file system.

Certain embodiments may provide the ability to migrate data to-and-from the cloud and may provide for local data to co-exist with data in the cloud by way of a hybrid cloud storage system, which provides for storage elasticity and scale while layering ZFS file system functionality on the cloud storage. By extending the ZFS file system to allow storing of objects in cloud object stores, a bridge may be provided to traditional object storage while preserving ZFS file system functionality in addition to all ZFS file system data services. The bridging of the gap between traditional local file systems and the ability to store data in various clouds object stores redounds to significant performance improvements.

Furthermore, embodiments of the present invention enable the use of traditional ZFS data services in conjunction with the hybrid cloud storage. As an example, compression, encryption, deduplication, snapshots, and clones are each available in certain embodiments of the present invention and are described in short detail immediately below. In the present invention users can continue to use all of the data services provided by the ZFS file system seamlessly when extending storage to the cloud. For instance, the Oracle Key Manager or equivalent manages the key local to a user allowing end-to-end secure encryption with locally managed keys when storing to the cloud. The same commands used to compress, encrypt, deduplicate, take snapshots, and make clones on disk storage are used for storage to the cloud. As a result, users continue to benefit from the efficiencies and the security provided by ZFS compression, encryption, deduplication, snapshots, and clones.

Compression is typically turned on because it reduces the resources required to store and transmit data. Computational resources are consumed in the compression process and, usually, in the reversal of the process (decompression). Data compression is subject to a space-time complexity trade-off. For instance, a compression scheme may require intensive processing decompression fast enough to be consumed as it is being decompressed. The design of data compression schemes involves trade-offs among various factors, including the degree of compression and the computational resources required to compress and decompress the data.

ZFS encryption enables an end-to-end secure data block system with locally saved encryption keys providing an additional layer of security. ZFS encryption does not of itself prevent the data blocks from being misappropriated, but denies the message content to the interceptor. In an encryption scheme, the intended data block, is encrypted using an encryption algorithm, generating ciphertext that can only be read if decrypted. For technical reasons, an encryption scheme usually uses a pseudo-random encryption key generated by an algorithm. It is in principle possible to decrypt the message without possessing the key, but, for a well-designed encryption scheme, large computational resources and skill are required. ZFS Data blocks are encrypted using AES (Advanced Encryption Standard) with key lengths of 128, 192, and 256.

Data block duplication is a specialized data compression technique for eliminating duplicate copies of repeating data blocks. Data block deduplication is used to improve storage utilization and can also be applied to network data transfers to reduce the number of data blocks that must be sent to store to memory. In the deduplication process, unique data blocks are identified and stored during a process of analysis. As the analysis continues, other data blocks are compared to the stored copy and whenever a match occurs, the redundant data block is replaced with a small reference that points to the stored stored data block. Given that the same data block pattern may occur dozens, hundreds, or even thousands of times the number of data blocks that must be stored or transferred is reduced substantially using deduplication.

Snapshots for ZFS storage to the cloud object store are created seamlessly in the ZFS system. Snapshots freeze certain data and metadata blocks so that they may not be written over in case a backup to the snapshot is needed. A tree hierarchy can have many snapshots, and each snapshot will be saved until deleted. Snapshots can be stored locally or in the cloud object store. And snapshots are "free" in the ZFS system as they don't require any extra storage capability than creating the root block the snapshot points to. The root block and all subsequent blocks from the root block are not available for copy on write operation when accessed from the snapshot reference to the root block. At the next progression after the snap shot is taken—a new root block becomes the active root block.

Clones are created from snapshots and, unlike snapshot, blocks accessed using the clone reference to the root block are available for copy on write operation. Clones allow development and trouble shooting on a system without corrupting the active root block and tree. Clones are linked to snapshots and snapshots cannot be deleted if a clone linking to a snapshot block persists. Clones, in some cases, can be promoted to the active hierarchical tree.

Various embodiments will now be discussed in greater detail with reference to the accompanying figures, beginning with FIG. 1.

FIG. 1 illustrates one example storage network 100 that may be used to implement certain embodiments according to the present disclosure. The selection and/or arrangement of hardware devices depicted in FIG. 1 are shown only by way of example, and are not meant to be limiting. FIG. 1 provides a plurality of storage appliances 120 connected through one or more switch circuits 122. The switch circuits 122 may connect the plurality of storage appliances 120 to a plurality of I/O servers 136, which in turn may provide access to the plurality of storage appliances 120 for client devices, such as local computer systems 130, computer systems available over a network 132, and/or cloud computing systems 134.

Each I/O server 136 may execute multiple independent file system instances, each of which may be responsible for the management of a portion of the overall storage capacity. As will be described in greater detail below, these file system instances may include the Oracle ZFS file system. The I/O servers 136 may comprise blade and/or standalone servers that include host ports 124 to communicate with the client devices by receiving read and/or write data access requests. The host ports 124 may communicate with an external interface provider 126 that identifies a correct data storage controller 128 to service each I/O request. The data storage controllers 128 can each exclusively manage a portion of data content in one or more of the storage appliances 120 described below. Thus, each data storage controller 128 can access a logical portion of the storage pool and satisfy data requests received from the external interface providers 126 by accessing their own data content. Redirection through the data storage controllers 128 may include redirection of each I/O request from the host ports 124 to a file system instance (e.g., a ZFS instance) executing on the I/O servers 136 and responsible for the blocks requested. For example, this may include a redirection from a host port 124-1 on one I/O server 136-1 to a ZFS instance on another I/O server 136-n. This redirection may allow any part of the available storage capacity to be reached from any host port 124. The ZFS instance may then issue the necessary direct I/O transactions to any storage device in the storage pool to complete the request. Acknowledgements and/or data may then be forwarded back to the client device through the originating host port 124.

A low-latency, memory-mapped network may tie together the host ports 124, any file system instances, and the storage appliances 120. This network may be implemented using one or more switch circuits 122, such as Oracle's Sun Data Center InfiniBand Switch 36 to provide a scalable, high-performance cluster. A bus protocol, such as the PCI Express bus, may route signals within the storage network. The I/O servers 136 and the storage appliances 120 may communicate as peers. The redirection traffic and ZFS memory traffic may both use the same switch fabric.

In various embodiments, many different configurations of the storage appliances 120 may be used in the network of FIG. 1. In some embodiments, the Oracle ZFS Storage Appliance series may be used. The ZFS Storage Appliance provides storage based on the Oracle Solaris kernel with Oracle's ZFS file system ("ZFS") described below. The processing core 114 handles any operations required to implement any selected data protection (e.g., mirroring, RAID-Z, etc.), data reduction (e.g., inline compression, duplication, etc.), and any other implemented data services (e.g., remote replication, etc.). In some embodiments, the processing core may comprise an 8×15 core of 2.8 GHz Intel® Xeon® processors. The processing core also handles the caching of stored data in both DRAM and Flash 112. In some embodiments, the DRAM/Flash cache may comprise a 3 TB DRAM cache.

In some configurations, the storage appliances 120 may comprise an I/O port 116 to receive I/O requests from the data storage controllers 128. Each of the storage appliances 120 may include an integral rack-mounted unit with its own internally redundant power supply and cooling system. A concentrator board 110 or other similar hardware device may be used to interconnect a plurality of storage devices. Active components such as memory boards, concentrator boards 110, power supplies, and cooling devices may be hot swappable. For example, the storage appliance 120 may include flash memory 102, nonvolatile RAM (NVRAM) 104, various configurations of hard disk drives 105, tape drives, RAID arrays 108 of disk drives, and so forth. These storage units may be designed for high availability with hot swapping and internal redundancy of memory cards, power, cooling, and interconnect. In some embodiments the RAM may be made non-volatile by backing it up to dedicated Flash on loss of power. The mix of Flash and NVRAM cards may be configurable, and both may use the same connector and board profile.

Although not shown explicitly, each of the I/O servers 136 may execute a global management process, or data storage system manager, that may supervise the operation of the storage system in a pseudo-static, "low touch" approach, intervening when capacity must be reallocated between ZFS instances, for global Flash wear leveling, for configuration changes, and/or for failure recovery. The "divide and conquer" strategy of dividing the capacity among individual ZFS instances may enable a high degree of scalability of performance, connectivity, and capacity. Additional performance may be achieved by horizontally adding more I/O servers 136, and then assigning less capacity per ZFS instance and/or fewer ZFS instances per I/O server 136. Performance may also be scaled vertically by using faster servers. Additional host ports may be added by filling available slots in the I/O servers 136 and then adding additional servers. Additional capacity may also be achieved by adding additional storage appliances 120, and allocating the new capacity to new or existing ZFS instances.

Figure 2:
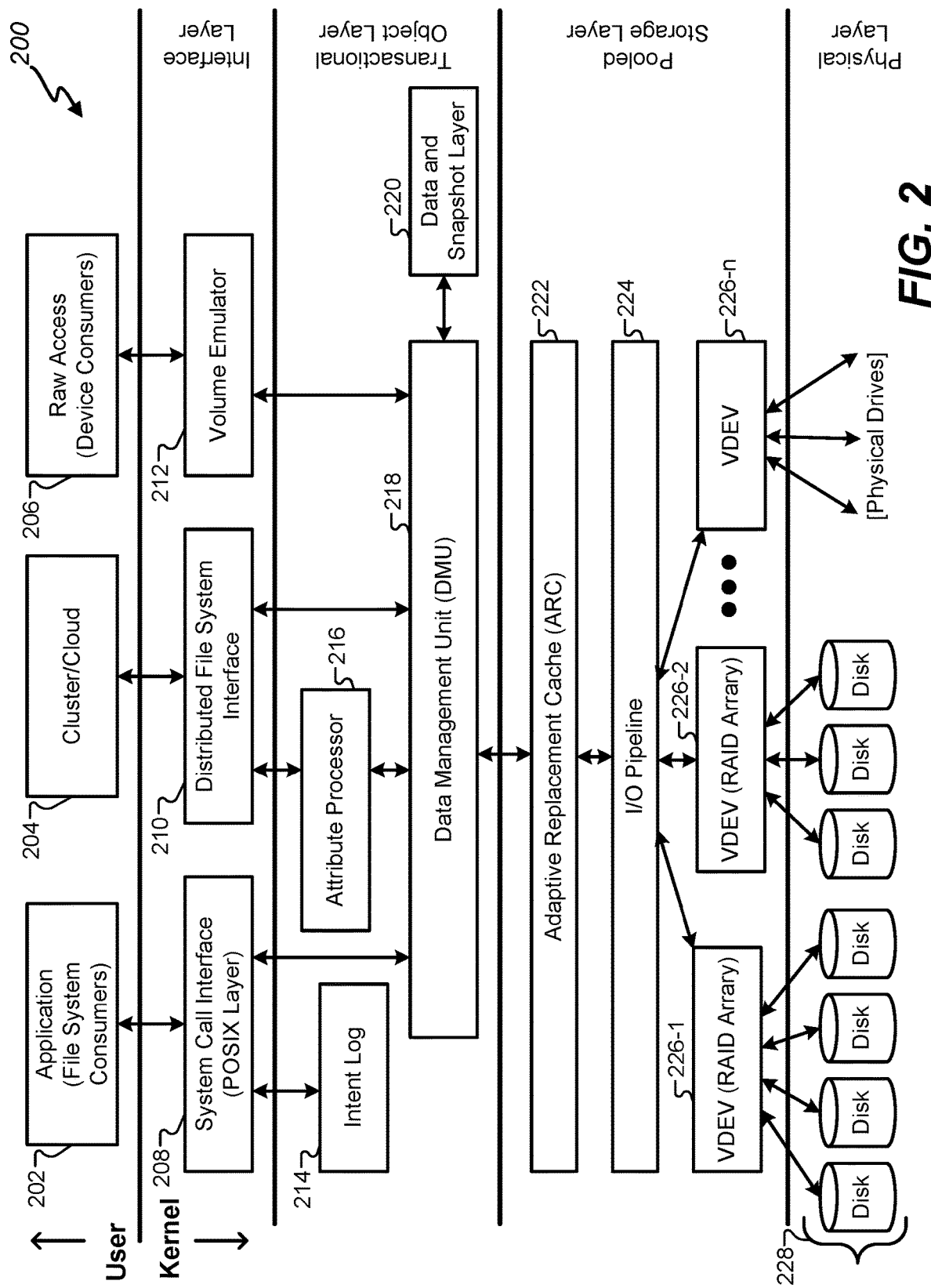
FIG. 2 illustrates an instance of a file system that may be executed in a storage environment, in accordance with certain embodiments of the present disclosure.

FIG. 2 illustrates an instance of an example network file system 200 that may be executed in a storage environment, including the storage environment of FIG. 1, in accordance with certain embodiments of the present disclosure. For example, the file system 200 may include the Oracle ZFS file system ("ZFS"), which provides very large capacity (128-bit), data integrity, an always-consistent, on-disk format, self-optimizing performance, and real-time remote replication. Among other ways, ZFS departs from traditional file systems at least by eliminating the need for a separate volume manager. Instead, a ZFS file system shares a common storage pool of storage devices and acts as both the volume manager and the file system. Therefore, ZFS has complete knowledge of both the physical disks and volumes (including their condition, status, and logical arrangement into volumes, along with all the files stored on them). Devices can be added or removed from the pool as file system capacity requirements change over time to dynamically grow and shrink as needed without needing to repartition the underlying storage pool.

In certain embodiments, the system 200 may interact with an application 202 through an operating system. The operating system may include functionality to interact with a file system, which in turn interfaces with a storage pool. The operating system typically interfaces with the file system 200 via a system call interface 208. The system call interface 208 provides traditional file read, write, open, close, etc., operations, as well as VNODE operations and VFS operations that are specific to the VFS architecture. The system call interface 208 may act as a primary interface for interacting with the ZFS as a file system. This layer resides between a data management unit (DMU) 218 and presents a file system abstraction of the files and directories stored therein. The system call interface 208 may be responsible for bridging the gap between the file system interfaces and the underlying DMU 218 interfaces.

In addition to the POSIX layer of the system call interface 208, the interface layer of the file system 200 may also provide a distributed file system interface 210 for interacting with cluster/cloud computing devices 204. For example, a Lustre® interface may be provided to provide a file system for computer clusters ranging in size from small workgroup clusters to large-scale, multi-site clusters. A volume emulator 212 may also provide a mechanism for creating logical volumes which can be used as block/character devices. The volume emulator 212 not only allows a client system to distinguish between blocks and characters, but also allows the client system to specify the desired block size and thereby create smaller, sparse volumes in a process known as "thin provisioning." The volume emulator 212 provides raw access 206 to external devices.

Underneath the interface layer lies a transactional object layer. This layer provides an intent log 214 configured to record a per-dataset transactional history which can be replayed upon a system crash. In ZFS, the intent log 214 saves transaction records of system calls that change the file system in memory with sufficient information to be able to replay the system calls. These are stored in memory until the DMU 218 commits them to the storage pool and they can be discarded or they are flushed. In the event of a power failure and/or disk failure, the intent log 214 transactions can be replayed to keep the storage pool up-to-date and consistent.

The transactional object layer also provides an attribute processor 216 that may be used to implement directories within the POSIX layer of the system call interface 208 by making arbitrary {key, value} associations within an object. The attribute processor 216 may include a module that sits on top of the DMU 218 and may operate on objects referred to in the ZFS as "ZAP objects." ZAP objects may be used to store properties for a dataset, navigate file system objects, and/or store storage pool properties. ZAP objects may come in two forms: "microzap" objects and "fatzap" objects. Microzap objects may be a lightweight version of the fatzap objects and may provide a simple and fast lookup mechanism for a small number of attribute entries. Fatzap objects may be better suited for ZAP objects containing large numbers of attributes, such as larger directories, longer keys, longer values, etc.

The transactional object layer also provides a data set and snapshot layer 220 that aggregates DMU objects in a hierarchical namespace, and provides a mechanism for describing and managing relationships between properties of object sets. This allows for the inheritance of properties, as well as quota and reservation enforcement in the storage pool. DMU objects may include ZFS file system objects, clone objects, CFS volume objects, and snapshot objects. The data and snapshot layer 220 can therefore manage snapshot and clones.

A snapshot is a read-only copy of a file system or volume. A snapshot is a view of a filesystem as it was at a particular point in time. ZFS's snapshots are useful in the same way that some other filesystems's snapshots are: By doing a backup of a snapshot, you have a consistent, non-changing target for the backup program to work with. Snapshots can also be used to recover from recent mistakes, by copying the corrupted files from the snapshot. Snapshots can be created almost instantly, and they initially consume no additional disk space within the pool. However, as data within the active dataset changes, the snapshot consumes disk space by continuing to reference the old data, thus preventing the disk space from being freed. The blocks containing the old data will only be freed if the snapshot is deleted. Taking a snapshot is a constant-time operation. The presence of snapshots doesn't slow down any operations. Deleting snapshots takes time proportional to the number of blocks that the delete will free, and is very efficient. ZFS snapshots include the following features: they persist across system reboots; the theoretical maximum number of snapshots is $2^{64}$; they use no separate backing store; they consume disk space directly from the same storage pool as the file system or volume from which they were created; recursive snapshots are created quickly as one atomic operation; and they are created together (all at once) or not created at all. The benefit of atomic snapshot operations is that the snapshot data is always taken at one consistent time, even across descendent file systems. Snapshots cannot be accessed directly, but they can be cloned, backed up, rolled back to, and so on. Snapshots can be used to "roll back" in time to the point when the snapshot was taken A clone is a writable volume or file system whose initial contents are the same as the dataset from which it was created. In the ZFS system clones are always created from snapshots. As with snapshots, creating a clone is nearly instantaneous and initially consumes no additional disk space. In addition, you can snapshot a clone. Clones can only be created from a snapshot. When a snapshot is cloned, an implicit dependency is created between the clone and snapshot. Even though the clone is created somewhere else in the dataset hierarchy, the original snapshot cannot be destroyed as long as the clone exists. Clones do not inherit the properties of the dataset from which it was created. A clone initially shares all its disk space with the original snapshot. As changes are made to the clone, it uses more disk space. Clones are useful to branch off and do development or troubleshooting—and can be promoted to replace the live file system. Clones can also be used to duplicate a file system on multiple machines.

The DMU 218 presents a transactional object model built on top of a flat address space presented by the storage pool. The modules described above interact with the DMU 218 via object sets, objects, and transactions, where objects are pieces of storage from the storage pool, such as a collection of data blocks. Each transaction through the DMU 218 comprises a series of operations that are committed to the storage pool as a group. This is the mechanism whereby on-disk consistency is maintained within the file system. Stated another way, the DMU 218 takes instructions from the interface layer and translates those into transaction batches. Rather than requesting data blocks and sending single read/write requests, the DMU 218 can combine these into batches of object-based transactions that can be optimized before any disk activity occurs. Once this is done, the batches of transactions are handed off to the storage pool layer to schedule and aggregate the raw I/O transactions required to retrieve/write the requested data blocks. As will be described below, these transactions are written on a copy-on-write (COW) basis, which eliminates the need for transaction journaling.

The storage pool layer, or simply the "storage pool," may be referred to as a storage pool allocator (SPA). The SPA provides public interfaces to manipulate storage pool configuration. These interfaces can create, destroy, import, export, and pool various storage media and manage the namespace of the storage pool. In some embodiments, the SPA may include an adaptive replacement cache (ARC) 222 that acts as a central point for memory management for the SPA. Traditionally, an ARC provides a basic least-recently-used (LRU) object replacement algorithm for cache management. In ZFS, the ARC 222 comprises a self-tuning cache that can adjust based on the I/O workload. Additionally, the ARC 222 defines a data virtual address (DVA) that is used by the DMU 218. In some embodiments, the ARC 222 has the ability to evict memory buffers from the cache as a result of memory pressure to maintain a high throughput.

The SPA may also include an I/O pipeline 224, or "I/O manager," that translates the DVAs from the ARC 222 into logical locations in each of the virtual devices (VDEVs) 226 described below. The I/O pipeline 224 drives the dynamic striping, compression, checksum capabilities, and data redundancy across the active VDEVs. Although not shown explicitly in FIG. 2, the I/O pipeline 224 may include other modules that may be used by the SPA to read data from and/or write data to the storage pool. For example, the I/O pipeline 224 may include, without limitation, a compression module, an encryption module, a checksum module, and a metaslab allocator. The checksum may be used, for example, to ensure data has not been corrupted. In some embodiments, the SPA may use the metaslab allocator to manage the allocation of storage space in the storage pool.

Compression is the process of reducing the data size of a data block (referred to interchangeably with leaf node or data node), typically by exploiting redundancies in the data block itself. Many different compression types are used by ZFS. When compression is enabled, less storage can be allocated for each data block. The following compression algorithms are available. LZ4—an algorithm added after feature flags were created. It is significantly superior to LZJB. LZJB is the original default compression algorithm) for ZFS. It was created to satisfy the desire for a compression algorithm suitable for use in filesystems. Specifically, that it provides fair compression, has a high compression speed, has a high decompression speed and detects incompressible data detection quickly. GZIP (1 through 9 implemented in the classic Lempel-Ziv implementation. It provides high compression, but it often makes IO CPU-bound. ZLE (Zero Length Encoding)—a very simple algorithm that only compresses zeroes. In each of these cases there is a trade-off of compression ratio to the amount of latency involved in compressing and decompressing the data block. Typically—the more compressed the data—the longer it takes to compress and decompress it.

Encryption is the process of adding end-to-end security to data blocks by encoding them cryptographically with a key. Only users with a key can decrypt the data block. As used in the ZFS system, a ZFS pool can support a mix of encrypted and unencrypted ZFS data sets (file systems and ZVOLs). Data encryption is completely transparent to applications and provides a very flexible system for securing data at rest, and it doesn't require any application changes or qualification. Furthermore ZFS encryption randomly generates a local encryption key from a passphrase or an AES key and all keys are stored locally with the client—not in the cloud object store 404 as traditional file systems do. Encryption is transparent to the application and storage to the cloud object store 404 when turned on. ZFS makes it easy to encrypt data and manage data encryption. You can have both encrypted and unencrypted file systems in the same storage pool. You can also use different encryption keys for different systems, and you can manage encryption either locally or remotely—although the randomly generated encryption key always remains local. ZFS encryption is inheritable to descendent file systems. Data is encrypted using AES (Advanced Encryption Standard) with key lengths of 128, 192, and 256 in the CCM and GCM operation modes.

Deduplication is the process of recognizing that a data block to be stored in the file system is already stored on the file system as an existing data block and pointing to that existing data block rather than storing the data block again. ZFS provides block-level deduplication because this is the finest granularity that makes sense for a general-purpose storage system. Block-level dedup also maps naturally to ZFS's 256-bit block checksums, which provide unique block signatures for all blocks in a storage pool as long as the checksum function is cryptographically strong (e.g. SHA256). Deduplication is synchronous and is performed as data blocks are sent to the cloud object store 404. If data blocks are not duplicated, enabling deduplication will add overhead without providing any benefit. If there are duplicate data blocks, enabling deduplication will both save space and increase performance. The space savings are obvious; the performance improvement is due to the elimination of storage writes when storing duplicate data, plus the reduced memory footprint due to many applications sharing the same pages of memory. Most storage environments contain a mix of data that is mostly unique and data that is mostly replicated. ZFS deduplication is per-dataset and can be enabled when it is likely to help.

In ZFS, the storage pools may be made up of a collection of VDEVs. In certain embodiments, at least a portion of the storage pools may be represented as a self-described Merkle tree, a logical tree where both data and metadata are stored by VDEVs of the logical tree. There are two types of virtual devices: physical virtual devices called leaf VDEVs, and logical virtual devices called interior VDEVs. A physical VDEV may include a writeable media block device, such as a hard disk or Flash drive. A logical VDEV is a conceptual grouping of physical VDEVs. VDEVs can be arranged in a tree with physical VDEVs existing as leaves of the tree. The storage pool may have a special logical VDEV called a "root VDEV" which roots the tree. All direct children of the root VDEV (physical or logical) are called "top-level" VDEVs. In general, VDEVs implement data replication, mirroring, and architectures such as RAID-Z and RAID-Z2. Each leaf VDEV represents one or more physical storage devices 228 that actually store the data provided by the file system.

In some embodiments, the file system 200 may include an object-based file system where both data and metadata are stored as objects. More specifically, the file system 200 may include functionality to store both data and corresponding metadata in the storage pool. A request to perform a particular operation (i.e., a transaction) is forwarded from the operating system, via the system call interface 208, to the DMU 218, which translates the request to perform an operation on an object directly to a request to perform a read or write operation (i.e., an I/O request) at a physical location within the storage pool. The SPA receives the request from the DMU 218 and writes the blocks into the storage pool using a COW procedure. COW transactions may be performed for a data write request to a file. Instead of overwriting existing blocks on a write operation, write requests cause new segments to be allocated for the modified data. Thus, retrieved data blocks and corresponding metadata are never overwritten until a modified version of the data block and metadata are committed. Thus, the DMU 218 writes all the modified data blocks to unused segments within the storage pool and subsequently writes corresponding block pointers to unused segments within the storage pool. To complete a COW transaction, the SPA issues an I/O request to reference the modified data block.

FIGS. 3A-3D illustrate a COW process for a file system, such as the file system 200, in accordance with certain embodiments of the present disclosure. For example, the ZFS system described above uses a COW transactional model where all block pointers within the file system may contain 256-bit checksum of a target block which is verified when the block is read. As described above, blocks containing active data are not overwritten in place. Instead the new block is allocated, modified data is written to it, and then any metadata blocks referencing it are simply read, reallocated, and rewritten.

Figure 3A:
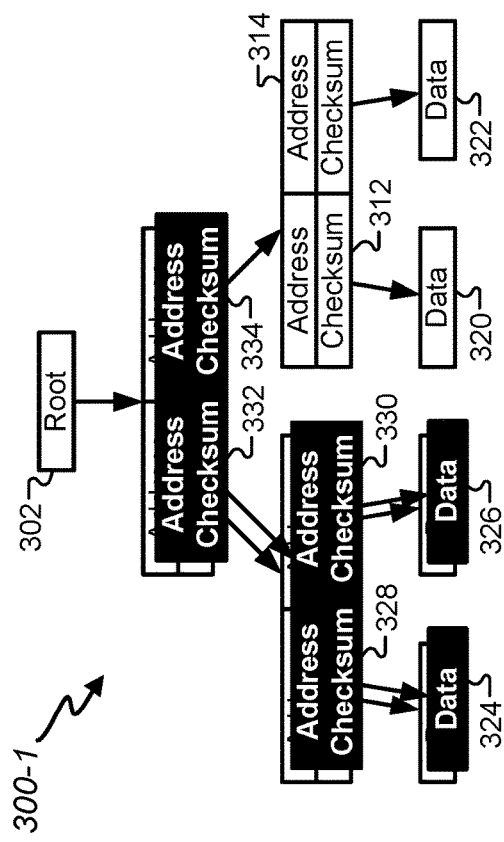
FIGS. 3A-3F illustrate a copy-on-write process for a file system, in accordance with certain embodiments of the present disclosure.

FIG. 3A illustrates a simplified diagram of a file system storage of data and metadata corresponding to one or more files as a logical tree 300, according to some embodiments. The logical tree 300, as well as other logical trees described herein, may be a self-described Merkle tree where the data and metadata are stored as blocks of the logical tree 300. A root block 302 may represent the root of the logical tree 300, or "uberblock." The logical tree 300 can be traversed through files and directories by navigating through each child node 304, 306 of the root 302. Each non-leaf node represents a directory or file, such as nodes 308, 310, 312, and 314. In some embodiments, each non-leaf node may be assigned a hash of values of its child nodes. Each leaf node 316, 318, 320, 322 represents a data block of a file.

Figure 3C:
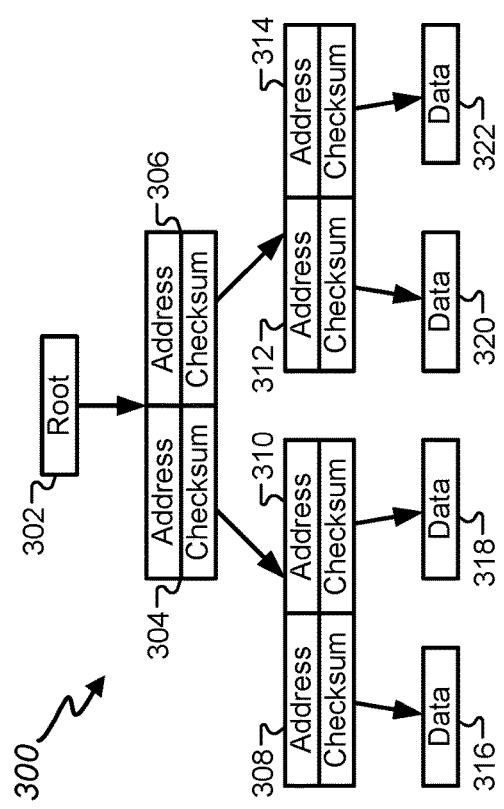
Figure 3B:
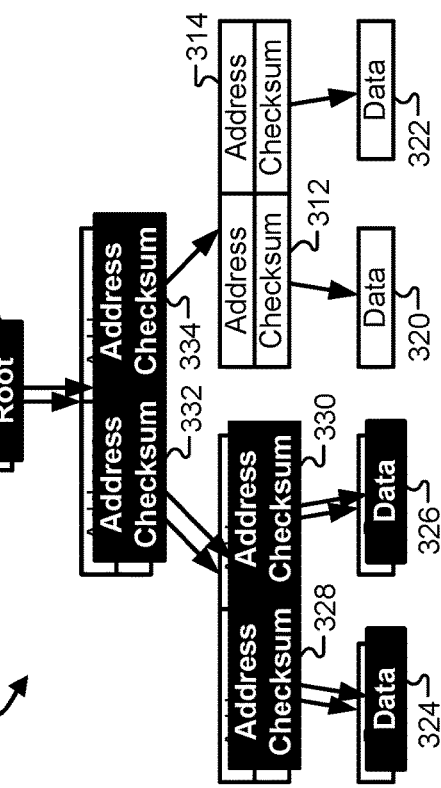

FIG. 3B illustrates an example of the logical tree 300-1 after an initial stage of a write operation. In this example, the data blocks represented by nodes 324 and 326 have been written by the file system 200. Instead of overwriting the data in nodes 316 and 318, new data blocks are allocated for nodes 324 and 326. Thus, after this operation, the old data in nodes 316 and 318 persist in the memory along with the new data in nodes 324 and 326.

FIG. 3C illustrates an example of the logical tree 300-2 as the write operation continues. In order to reference the newly written data blocks in nodes 324 and 326, the file system 200 determines nodes 308 and 310 that reference the old nodes 316 and 318. New nodes 328 and 330 are allocated to reference the new data blocks in nodes 324 326. The same process is repeated recursively upwards through the file system hierarchy until each node referencing a changed node is reallocated to point to the new nodes.

When the pointer blocks are allocated in new nodes in the hierarchy, the address pointer in each node is updated to point to the new location of the allocated child in memory. Additionally, each data block includes a checksum that is calculated by the data block referenced by the address pointer. For example, the checksum in node 328 is calculated using the data block in node 324. This arrangement means that the checksum is stored separately from the data block from which it is calculated. This prevents so-called "ghost writes" where new data is never written, but a checksum stored with the data block would indicate that the block was correct. The integrity of the logical tree 300 can be quickly checked by traversing the logical tree 300 and calculating checksums at each level based on child nodes.

Figure 3D:
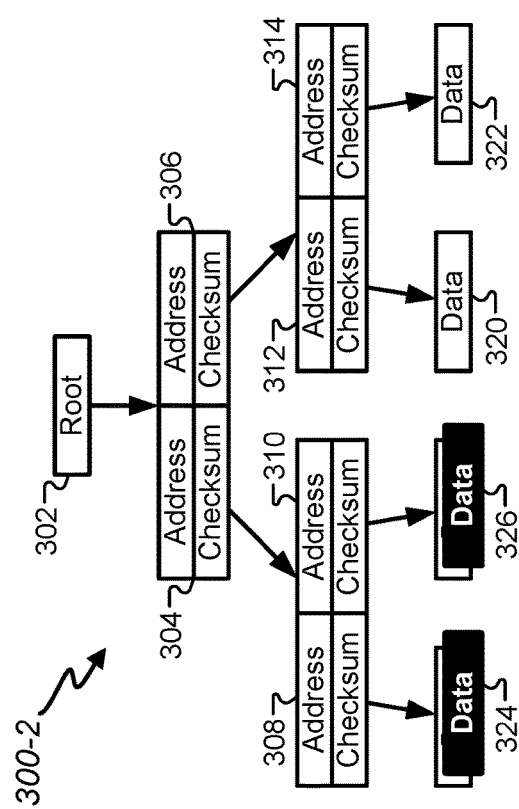

In order to finalize the write operation, the root 302 can be reallocated and updated. FIG. 3D illustrates an example of the logical tree 300-3 at the conclusion of the write operation. When the root 302 is ready to be updated, a new uberblock root 336 can be allocated and initialized to point to the newly allocated child nodes 332 and 334. The root 336 can then be made the root of the logical tree 300-3 in an atomic operation to finalize the state of the logical tree 300-3.

Figure 3E:
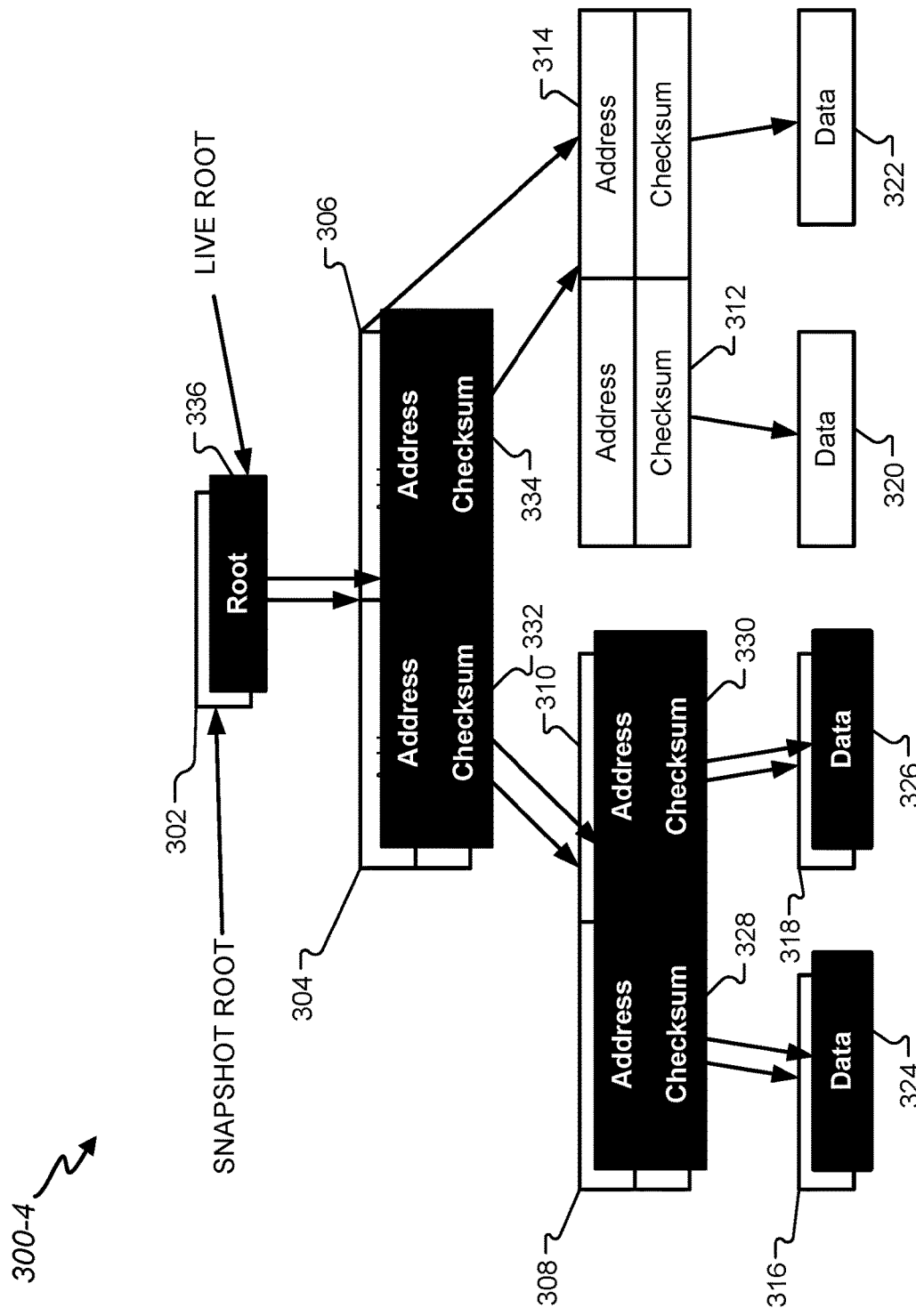

A snapshot is a read-only copy of a file system or volume. A snapshot is a view of a filesystem as it was at a particular point in time. ZFS's snapshots are useful in the same way that some other file systems' snapshots are: by doing a backup of a snapshot, you have a consistent, non-changing target for the backup program to work with. Snapshots can also be used to recover from recent mistakes, by copying the corrupted files from the snapshot. Snapshots can be created almost instantly, and they initially consume no additional disk space within the pool. However, as data within the active dataset changes, the snapshot consumes disk space by continuing to reference the old data, thus preventing the disk space from being freed. The blocks containing the old data will only be freed if the snapshot is deleted. Taking a snapshot is a constant-time operation. The presence of snapshots does not slow down any operations. Deleting snapshots takes time proportional to the number of blocks that the delete will free, and is very efficient. ZFS snapshots include the following features: they persist across system reboots; the theoretical maximum number of snapshots is $2^{64}$; they use no separate backing store; they consume disk space directly from the same storage pool as the file system or volume from which they were created; recursive snapshots are created quickly as one atomic operation; and they are created together (all at once) or not created at all. The benefit of atomic snapshot operations is that the snapshot data is always taken at one consistent time, even across descendent file systems. Snapshots cannot be accessed directly, but they can be cloned, backed up, rolled back to, and so on. Snapshots can be used to "roll back" in time to the point when the snapshot was taken. FIG. 3E depicts an example of the snapshot data service in ZFS where the snapshot was taken before the COW process described in FIGS. 3A-3D made root block 336 the new live root block. A live root block is the root block that the next data progression will be made from when performing a COW. The snapshot root and the "live" root are shown. The live root is the root that will be operated on in the next storage operation. All blocks pointed to by the snapshot root (302-322) are made "read only" meaning that they are put on list of blocks that cannot be freed for further use by the storage system until the snapshot is deleted.

It should be noted that some terminology is used interchangeably throughout the application. For instance leaf nodes, leaf blocks, and data blocks may be the same in certain instances, particularly when referencing local tree instances. Further, non-leaf nodes, metadata, and metadata blocks may be used interchangeably in certain instances, particularly when referencing local tree instances. Root nodes and root blocks similarly may be used interchangeably in certain instances, particularly when referencing local tree instances. Further, it should be noted that references to leaf nodes, non-leaf nodes, and root nodes may be similarly applied to cloud storage objects corresponding to cloud versions of logical trees generated based at least in part on local tree instances.

Figure 3F:
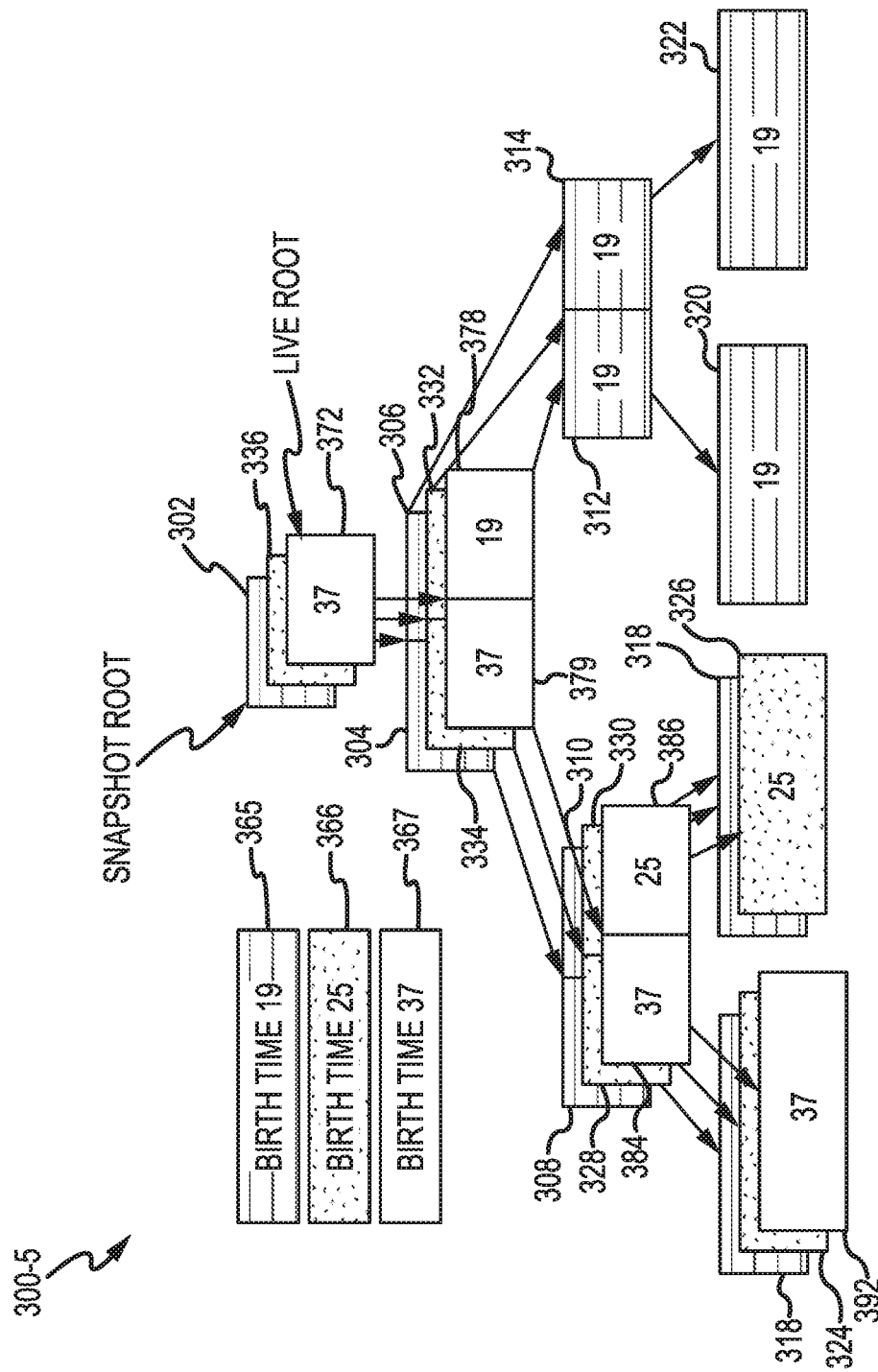

When blocks are created they are given a "birth" time that represents the iteration or progression of the COW that the block was created. FIG. 3F demonstrates this idea. In FIG. 3F, as shown in 365—the birth time 19 of FIG. 3A. 366 shows the birth time, 25 of FIG. 3D. 367 shows a birth time 37 as shown by the new tree created by blocks 372, 378, 379, 384, 386, and 392, and represents a data transaction on the tree 12 iterations after birth time 25. Thus a rollback or back up to the snapshot would leave only the blocks as shown in FIG. 3A. Thus—using a birth time hierarchy—the ZFS system can generate and roll back to any point in a birth time for the entire tree structure from a snapshot of the root of the tree. Essentially, this allows all new blocks with birth times after the snapshot to be made available in the storage pool as long as they are not linked to by any other snapshot or metadata block.

A clone is a writable volume or file system whose initial contents are the same as the dataset from which it was created. In the ZFS system, clones are always created from snapshots. As with snapshots, creating a clone is nearly instantaneous and initially consumes no additional disk space. In addition, you can snapshot a clone. Clones can only be created from a snapshot. When a snapshot is cloned, an implicit dependency is created between the clone and snapshot. Even though the clone is created somewhere else in the dataset hierarchy, the original snapshot cannot be destroyed as long as the clone exists. Clones do not inherit the properties of the dataset from which it was created. A clone initially shares all its disk space with the original snapshot. As changes are made to the clone, it uses more disk space. Clones are useful to branch off and do development or troubleshooting—and can be promoted to replace the live file system. Clones can also be used to duplicate a file system on multiple machines.

The embodiments described herein may be implemented in the system described above in FIGS. 1-3. For example, the system may comprise one or more processors of the various servers, storage appliances, and/or switching circuits of FIG. 1. Instructions may be stored in one or more memory devices of the system that cause the one or more processors to perform various operations that affect the functioning of the file system. Steps of various methods may be performed by the processors, memory devices, interfaces, and/or circuitry of the system in FIGS. 1-2.

Figure 4:
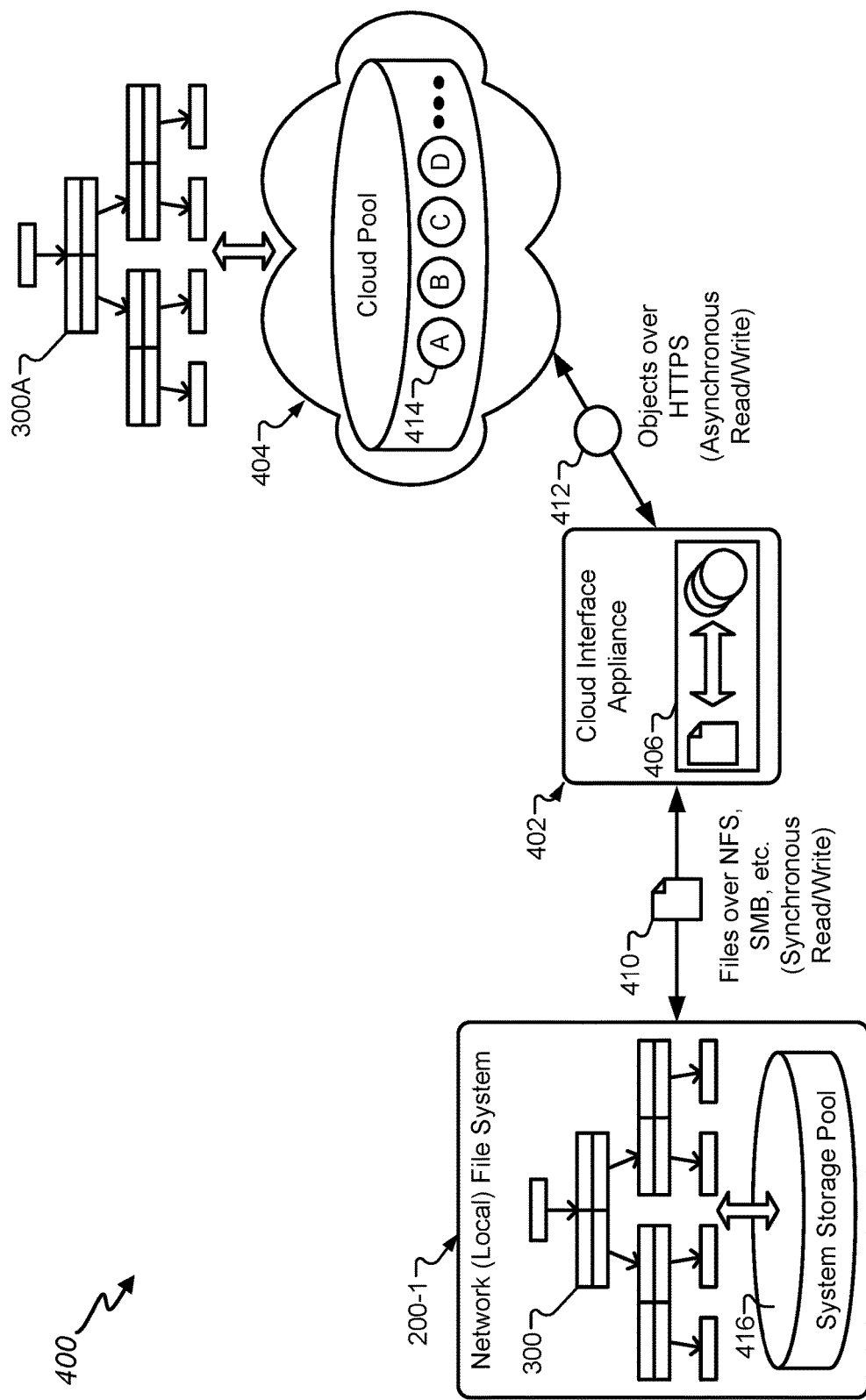
FIG. 4 is a high-level diagram illustrating an example of a hybrid cloud storage system, in accordance with certain embodiments of the present disclosure.

Turning now to FIG. 4, FIG. 4 is a high-level diagram illustrating an example of a hybrid cloud storage system 400, in accordance with certain embodiments of the present disclosure. The hybrid cloud storage system 400 may transform a network file system, such as a ZFS file system, into a cloud-capable file system where functionality of the file system, including file system data services, is layered on a cloud object store that is remote from the file system. As in the depicted diagram, the hybrid cloud storage system 400 may include the network file system 200 (also referenced herein as the "local file system 200"). The local file system 200 may be communicatively coupled to a cloud object storage 404. In some embodiments, the cloud object storage 404 may correspond to the cluster/cloud 204 indicated in FIG. 2. The local file system 200 may be communicatively coupled to the cloud object storage 404 by way of a cloud interface appliance 402. The cloud interface appliance 402 may be used by the local file system 200 as an access point for the cloud object store 404.

The hybrid cloud storage system 400 provides a solution to overcome traditional limitations of cloud object storage. Traditional cloud object protocols are limited to restricted data/object access semantics. Cloud object stores traditionally have limited interfaces and primitives, and are not POSIX compliant. For example, once an object is written, it cannot be thereafter modified; it may only be deleted and replaced with a newly created object. As another example, traditional cloud object storage has namespace limitations such that the namespace is simplified and limited to only top-level containers. However, not only may the hybrid cloud storage system 400 migrate data to and from the cloud object store 404, but also the hybrid cloud storage system 400 may layer file system functionality of the local file system 200 on cloud object interfaces to the cloud object storage 404 to provide the cloud-based storage.

The local file system 200 may be configured for POSIX interfaces and semantics. For example, the local file system 200 may provide a user with access to data as files, allowing for modification of content of a file without rewriting the file. The local file system 200 may also provide for the organization of data in name hierarchies as is typical for ZFS file systems. All the functionalities of a ZFS file system may be available to a user of the local file system 200. The cloud interface appliance 402 may allow for layering of file-system semantics on top of a cloud object protocol—for example, to provide the abilities to construct a namespace, create files, create directories, etc.—and extend such abilities with respect to data migrated to and from the cloud object storage 404. The cloud interface appliance 402 may facilitate a plug-n-play object storage solution to improve the local file system 200 while supporting ZFS file system data services.

The cloud interface appliance 402 may be configured to provide an object API (application programming interface). In some embodiments, the cloud interface appliance 402 may be configured to use a number of API translation profiles. According to certain embodiments, the API translation profiles may integrate modules and functions (e.g., the data services and modules), POSIX interfaces and semantics, and other components which may not be natively designed to interact with cloud storage. The API translation profiles, in some embodiments, may translate protocols, formats, and routines of the file system 200 (e.g., by way of API calls) to allow interaction with the cloud data store 404. Information for such integration may be stored in an API translation data store, which could be co-located with the cloud interface appliance 402 or otherwise communicatively coupled to the cloud interface appliance 402. The cloud interface appliance 402 may utilize the information to cohesively integrate POSIX interfaces and semantics to interface with the cloud data store 404 while preserving the semantics.

The hybrid cloud storage system 400 may allow the local file system 200 to use the cloud object storage 404 as a "drive." In various instances, the files 410 may be stored as data objects with metadata objects, and/or as data blocks with associated metadata. The cloud interface appliance 402 may receive and transfer files 410 from and to the local file system 200. In various embodiments, the local file system 200 may receive and/or transmit the files 410 via the NFS (Network File System) protocol, SMB (Server Message Block Protocol), and/or the like. In some embodiments, the cloud interface appliance 402 may translate the files 410 into objects 412. The translation of the files 410 may include translating data blocks and associated metadata and/or data objects associated with metadata objects, any of which may correspond to the files 410. In some embodiments, the translation may include the cloud interface appliance 402 performing API translation with a number of the API translation profiles. The translation, according to some embodiments, may include the cloud interface appliance 402 extracting data and/or metadata from the files 410, objects, and/or blocks. The cloud interface appliance 402 may convert the files 410, objects, and/or blocks to cloud storage objects at least in part by using the extracted data. In some embodiments, the cloud interface appliance 402 may create corresponding cloud storage objects with extracted data embedded in put requests directed to the cloud object store 404. Likewise, with any of the translations effected by the cloud interface appliance 402 to interface out to the cloud data store 404, the cloud interface appliance 402 may, in some embodiments, reverse the translation processes to interface with local components of the local file system 200.

The cloud interface appliance 402 may transfer and receive objects 412 to and from the cloud object storage 404. In some embodiments, the cloud interface appliance 402 may transceive the objects 412 via HTTPS and/or the like. In some embodiments, the cloud interface appliance 402 may be co-located with the local file system 200. In other embodiments, the cloud interface appliance 402 may be located remotely from local file system 200, such as with at least some equipment facilitating the cloud object store 404 or at some other communicatively coupled site.

As disclosed further herein, files in the local file system 200 may be stored as "disk blocks," virtual storage blocks where data objects and metadata corresponding to a file are stored as a logical tree 300 (e.g., a self-described Merkle tree where data and metadata are stored as blocks). The cloud interface appliance 402 may create a mapping 406 of each logical block in the tree 300 of data directly to cloud objects 414 in the cloud object store 404. Some embodiments may employ a one-to-one block-to-object mapping. Other embodiments, additionally or alternatively, may employ any other suitable ratio of blocks to cloud objects, for example, to map multiple blocks to one cloud object. In some instances of such embodiments, an entire logical tree of blocks may be mapped to a single cloud object. In other instances, only part of a logical tree of blocks may be mapped to a single cloud object.

In some embodiments, address pointers are updated when the blocks are converted into cloud objects. When blocks are converted into cloud objects with a one-to-one block-to-object conversion scheme, the address pointers may be updated so that non-leaf cloud objects in the hierarchy point to child cloud objects in the cloud object store 404. By way of example, an address pointer could correspond to an object name of child cloud object and path specification, which may include parameters such as the object name, a bucket specification, etc. Accordingly, some embodiments may translate the blocks of the logical tree 300 to cloud objects of the logical tree 300A. With some embodiments, such translation may enable the cloud interface appliance 402 to traverse the logical tree 300A of cloud objects utilizing the address pointers of the cloud objects.

In some embodiments, when blocks are converted into cloud objects with a multiple-to-one block-to-object conversion scheme such that part of the logical tree 300 is converted to one cloud object, the address pointers the cloud objects comprising the logical 300A may be similarly updated, but to a less granular extent, so that non-leaf cloud objects in the hierarchy point to child cloud objects in the cloud object store 404. Such translation may enable the cloud interface appliance 402 to traverse the logical tree 300A of cloud objects utilizing the address pointers of the cloud objects, in a less granular but faster manner than traversal facilitated by the one-to-one block-to-object conversion scheme. Additionally, in some embodiments, checksums may be updated with conversion process. Checksums for individual cloud objects could be updated and stored separately in parent cloud objects. In conversions employing the multiple-to-one block-to-object conversion scheme, a single checksum could be calculated for a cloud object that corresponds to a set of blocks.

The realization of the mapping 406 accordingly allows for communications over one or more networks to the cloud object store 404, and the interface with the cloud object store 404 may be object-based as opposed to block-based. As disclosed further herein, with the cloud interface appliance 402 between the local file system 200 and the cloud object store 404, the hybrid cloud storage system 400 may possess different characteristics and failure modes than traditional ZFS file systems. The cloud interface appliance 402 may translate file system interfaces of the local file system 202 on the client side and may be capable of coordination via object protocol out to the cloud object store 404 to read and write data. Through the cloud interface appliance 402, the cloud objects 414 may remain accessible by the local file system 200 over NFS, SMB, and/or the like.

With the mapping 406 of cloud objects 414 as logical blocks, collections of the cloud objects 414 may be grouped to form a drive that hosts ZFS storage pools as self-contained collections. The drive content may be elastic such that cloud objects may only be created for logical blocks that have been allocated. In some embodiments, the cloud interface appliance 402 may have the capability to assign variable object sizes (e.g., for different data types) to allow for greater storage flexibility. The data need not be limited to a specific byte size. Storage size may be expanded as needed by modifying the metadata. In some embodiments, cloud-based pools may be imported on any server. Once imported, cloud-based pools may appear as local storage with all ZFS services supported for the cloud-based pools. A cloud-based pool may be indicated as a new type of storage pool. Yet, from a user perspective, the data from the cloud-based pools may appear indistinguishable from native pools.

Figure 5:
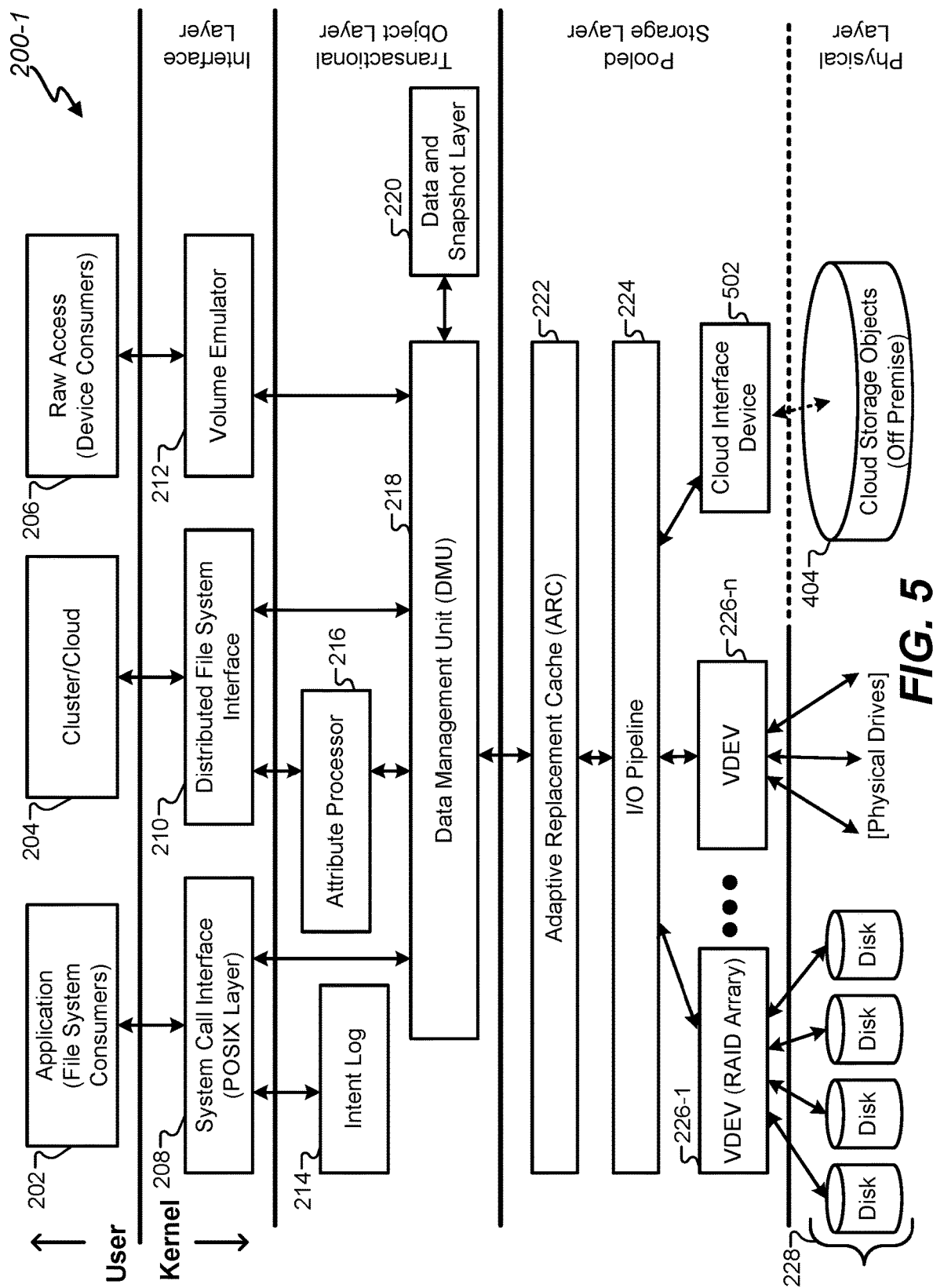
FIG. 5 illustrates an instance of an example network file system of the hybrid cloud storage system, in accordance with certain embodiments of the present disclosure.

FIG. 5 illustrates an instance of an example network file system 200-1 of the hybrid cloud storage system 400, in accordance with certain embodiments of the present disclosure. The file system 200-1 may correspond to the file system 200, but with cloud device management integrated directly into a ZFS control stack. Beyond that which is disclosed with respect to the file system 200, the file system 200-1 may include a cloud interface device 502 that facilitates leveraging of the cloud object store 404 as a storage medium for the file system 200-1. The cloud interface device 502 may facilitate a cloud drive at least in part by mapping a cloud storage into a device abstraction.

In some embodiments, the cloud interface device 502 may correspond to one or more VDEVs of another VDEV type of a device driver interface inside a ZFS file system architecture. The ZFS may communicate directly with the cloud interface device 502. The cloud interface device 502 may be at a virtual device layer directly above a driver layer of the file system 200-1. Some embodiments of the cloud interface device 502 may correspond to an abstraction of the device driver interface inside the ZFS architecture. Other components of the file system 200-1 may communicate with the cloud interface device 502 as though it was another VDEV of another device type, such as the VDEVs 226. To enable passage of a greater amount of information through the cloud interface device 502 relative to through other VDEVs 226, interfaces associated with the cloud interface device 502 may be wider to pass more information through the I/O pipeline 224 and the cloud interface device 502, out to the cloud object data store 404.

In some embodiments, the cloud interface device 502 may translate file system interfaces on the client end. In some embodiments, in order to provide complete POSIX file system semantics, the cloud interface device 502 may convert file system interface requests into object interface requests directed toward the cloud object store 404. In some embodiments, the cloud interface device 502 may be capable of communicating via object protocol out to the cloud object store 404 to read and write data.

Figure 6:
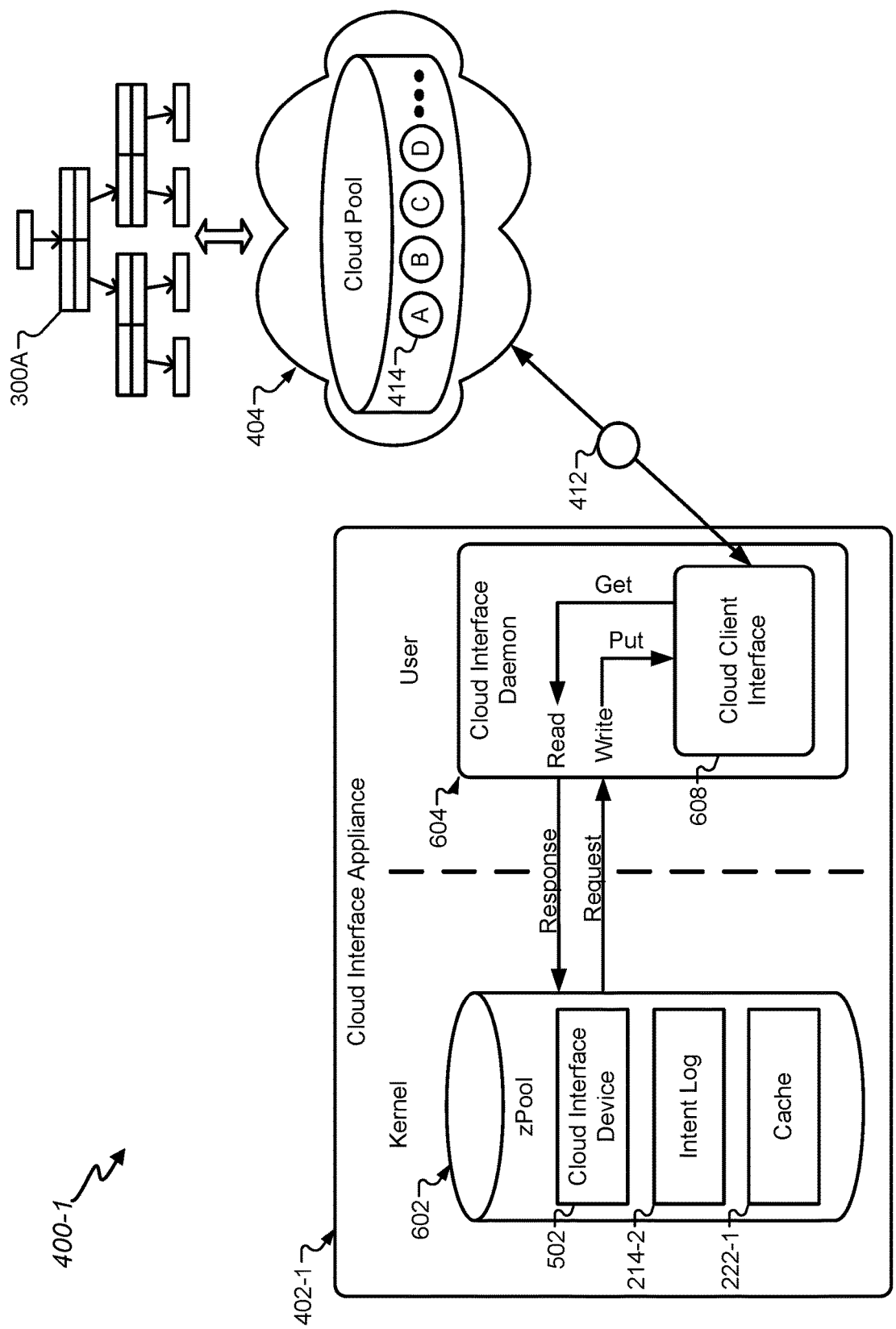
FIG. 6 is a diagram illustrating additional aspects of a cloud interface appliance of a hybrid cloud storage system, in accordance with certain embodiments of the present disclosure.

FIG. 6 is a diagram illustrating additional aspects of a cloud interface appliance 402-1 of a hybrid cloud storage system 400-1, in accordance with certain embodiments of the present disclosure. As indicated in the example depicted, some embodiments of the cloud interface appliance 402 may include a virtual storage pool 602 and a cloud interface daemon 604. The virtual storage pool 602 may be at the kernel of the file system 200-1, and the cloud interface daemon 604 may be on the user space of the file system 200-1. In various embodiments, the cloud interface daemon 604 may correspond to a cloud interface component of the application 202 and/or the cluster/cloud 204 indicated in FIG. 5.

In some embodiments, the virtual storage pool 602 may include at least one cloud interface device 502, intent log 214-2, and cache 222-1. The intent log 214-2 and the cache 222-1 described above with respect to FIGS. 1-2 and below with respect to FIG. 7. The cloud interface device 502 may interact with the cloud interface daemon 604 to coordinate operations with respect to the cloud object data store 404 based at least in part on the mapping 406. The cloud interface daemon 604 may include a cloud client interface 608 to interface with the cloud object data store 404. In some implementations, the cloud client interface 608 may include an endpoint providing Swift/S3 compatibility with the cloud object data store 404. Operations of the cloud client interface 608 may be based at least in part on getting and putting whole data objects 412 in order to facilitate read and write access to the cloud object data store 404.

Referring back to FIGS. 4 and 5, in operation according to some embodiments, requests to perform one or more transactions with respect to one or more files may be received from the application 202 at an application layer of the file system 200-1, and through the system call interface 208 of the interface layer of the file system 200-1. The requests may be POSIX-compliant and may be converted by one or more components of the file system 200-1 into one or more object interface requests to perform one or more operations with respect to a cloud-based instantiation 300A of the logical tree 300 stored in the cloud object store 404. For example, in some embodiments, the cloud interface appliance 402 may convert the POSIX-compliant requests, or intermediary requested caused by the POSIX-compliant requests, into corresponding object interface requests. In some embodiments, the DMU 218 may translate the POSIX-compliant requests into I/O requests to perform I/O operations, and the cloud interface appliance 402 may translate the I/O requests into corresponding object interface requests, coordinating the object interface requests using the mapping 406.

In some instances, the transactions could correspond to operations to cause storage of the files locally. In some instances, the file system 200-1 may store data objects and corresponding metadata in a system storage pool 416 provided by the one or more of the VDEVs 226 and the one or more physical storage devices 228. The data objects may correspond to the one or more files. As disclosed above, the data objects and metadata corresponding to the one or more files may be stored as a logical tree 300. Hence, the storage of the logical tree 300 may be stored locally in the system storage pool 416.

In further operation according to some embodiments, the file system 200-1 may cause storage of the data objects and the corresponding metadata of the logical tree 300 in the cloud object store 404. While the logical tree 300 may first be stored in the local storage pool before being migrated to cloud storage in some embodiments, in other embodiments the logical tree 300 may not be stored in the local storage pool before being stored in the cloud object store 404. For example, some embodiments may create at least part of the logical tree 300 in cache and then migrate it to the cloud object store 404. Thus, it should be appreciated that various embodiments are possible.

In order to store the data objects and the corresponding metadata of the logical tree 300 in the cloud object store 404, the cloud interface device 502 may create a mapping 406 of each logical block in the logical tree 300 to a respective cloud object 414 in the cloud object store 404. In some embodiments, the DMU 218 may read data from the system storage pool 416 (e.g., from a RAIDZ or a RAIDZ2 of the local pool) to provide the data to the cloud interface device 502 as a basis for creating the mapping 406. In some embodiments, the cloud interface device 502 may communicate directly or indirectly with another VDEV 226 to read data as a basis for the mapping 406. In some embodiments, the mapping 406 may map objects directly to blocks represented in a physical drive. The mapping 406 may be more refined than mapping file parts to objects; it may map at a lower level. Accordingly, the mapping 406 may be a per-object mapping 406. The mapping 406 may map virtual storage blocks onto objects in the cloud object store 404 so that the logical tree 300 is represented in the cloud object store 404, as is illustrated by the logical tree 300A. When the local file system 200-1 interfaces with the data objects 416 in the cloud object store 404, the logical tree 300A conforms to a new device type with which the local file system 200-1 is able to communicate.

The mapping 406 may be updated with every I/O operation or only with write operations to the cloud object store 404. In some embodiments, the mapping 406 may include an object directory that indexes all the cloud objects 414. Cloud object states may be kept in an index, a table, an index-organized table, and/or the like which may be indexed on a per-object basis. In some embodiments, the mapping 406 may include an object directory that indexes only some of the cloud objects 414. For example, such embodiments may index only cloud objects 414 that correspond to uberblocks. In some embodiments, cloud object states for each object relative to each leaf path may be indexed. In some embodiments, the object directory may reference the cloud objects 414 by address pointers that could correspond to object names and path specifications. In some embodiments, the object directory may reference the cloud objects 414 by URLs.

The cloud object states indexed in the mapping 406 may be used to route object requests. Utilizing the index, the cloud interface device 502 may request cloud objects based at least in part on the uberblocks. According to a first method, such requests may entail requesting a set of cloud objects associated with a particular uberblock so that the entire logical tree 300A is represented by the set of cloud objects transferred in response to the request. According to a second method, such requests may entail iterative requests for subsets of cloud objects associated with a particular uberblock in order to iteratively traverse the entire logical tree 300A until the desired one or more cloud objects are read from the cloud object store 404. With certain embodiments, the cloud interface device 502 may selectively used one of the two methods based at least in part on the size of the cloud objects representing various logical trees 300A. For example, the cloud interface device 502 could utilize one method when the size of the cloud objects is less than an aggregate size threshold, and transition to the other method when the size of the cloud objects meets or exceeds the aggregate size threshold.

Some embodiments may employ another method where the object directory may index the cloud objects on a per-object basis and may be used to request cloud objects directly without tree traversal at the cloud level. Some embodiments may retain a local snapshot of metadata of the logical tree 300A. Such embodiments may utilize the local snapshot to request cloud objects directly or indirectly. Additionally, some embodiments may retain checksums for the logical tree 300A in the object directory or a local snapshots, which checksums may be used to validate cloud objects retrieved from the cloud data store 404.

Thus, the file system 200-1 may maintain a tree of data and map that tree onto the cloud object store 404. The namespace of the tree 300A may correspond to metadata stored within nodes of the tree 300A. The file system 200-1 may continue to use a hierarchical tree representation, but map the hierarchical tree representation into a cloud object store as a way to store the data.

Referring again to FIG. 6, to effect I/O operations with respect to the cloud object store 404, the cloud interface device 502 may send requests to the cloud interface daemon 604. For example, in some implementations, the cloud interface device 502 may send requests through the transactional object layer and the interface layer of the file system 200-1 to the cloud interface daemon 604. The requests sent by the cloud interface device 502 may be based at least in part on POSIX-compliant requests received via the application 202 and/or based at least in part on I/O requests created by the DMU 218 (e.g., responsive to POSIX-compliant requests), which the cloud interface device 502 may convert into the requests for the cloud interface daemon 604.

In some embodiments, the requests sent by the cloud interface device 502 to the cloud interface daemon 604 may be translated into get requests and put requests for the cloud client interface 608. The requests sent by the cloud interface device 502 may be get requests and put requests in some embodiments; in other embodiments, the cloud interface daemon 604 may translate the requests sent by the cloud interface device 502 into get requests and put requests. In any case, responsive to the requests sent by the cloud interface device 502, the cloud interface daemon 604 may communicate, via the object protocol over the one or more networks, with the cloud object store 404 to perform corresponding I/O operations with respect to the data objects 414.

For example, the communications to the cloud object store 404 may include specifying, based at least in part on the mapping 406, storage of the data objects and the corresponding metadata of the logical tree 300A in the cloud object store 404. In some embodiments, the communications may specify different object sizes, for example, for different data types. Thus, the cloud interface appliance 402 may specify a certain object size to store certain data objects that are identified as being of one data type, and may specify a different object size to store other data objects that are identified as being of a different data type.

FIG. 7A is a block diagram that illustrates an example method 700 directed to certain features of a COW process for the hybrid cloud storage system 400, in accordance with certain embodiments of the present disclosure. According to certain embodiments, the method 700 may begin as indicated by block 702. However, teachings of the present disclosure may be implemented in a variety of configurations. As such, the order of certain steps comprising the method 700 and/or other methods disclosed herein may be shuffled or combined in any suitable manner and may depend on the implementation chosen. Moreover, while the following steps may be separated for the sake of description, it should be understood that certain steps may be performed simultaneously or substantially simultaneously.

As indicated by block 702, POSIX-compliant request(s) to perform particular operation(s) (i.e., a transaction(s)) may be received from the application 202. Such an operation may correspond to writing and/or modifying data. As indicated by block 704, the POSIX-compliant request(s) may be forwarded from the operating system, via the system call interface 208, to the DMU 218. In various embodiments, transactions effected through the DMU 218 may include a series of operations that are committed to one or both of the system storage pool 416 and the cloud object store 404 as a group. These transactions may be written on a COW basis.

As indicated by block 706, the DMU 218 may translate requests to perform operations on data objects directly to requests to perform write operations (i.e., I/O requests) directed to a physical location within the system storage pool 416 and/or the cloud object store 404. In some modes, the operations may be performed on locally stored data objects first, then changes to the data objects may be propagated to corresponding cloud-stored data objects, by the DMU 218 directing the specific changes or by the DMU 218 directed the cloud interface appliance 402 to read the changes directly or indirectly with another VDEV 226. In other modes, the operations may be performed on locally stored data objects and corresponding cloud-stored data objects simultaneously or substantially simultaneously. In still other modes, the operations may be performed on cloud-stored data objects only. For example, some implementations may not have local tree 300, and may only have a cloud-based version of a logical tree 300A. Various embodiments may be configured to allow user selection of one or more modes.

As indicated by block 708, the SPA may receive the I/O requests from the DMU 218. And, responsive to the requests, the SPA may initiate writing of data objects into the system storage pool 416 and/or the cloud object store 404 using a COW procedure. As indicated by block 710, in modes where writing of data objects is performed on locally stored data objects before, or concurrently with, writing of data objects to the cloud object store 404, the COW procedure disclosed above (e.g., in view of FIGS. 3A-3D) may proceed with respect to the system storage pool 416.

As indicated by block 712, the cloud interface appliance 402 may receive the I/O requests and identify incremental modifications to the logical tree 300A. The incremental modifications may correspond to new tree portions resulting from COW processes to effect the write requests. The cloud interface appliance 402 may translate the I/O requests into corresponding object interface requests. Having the modified data either from I/O requests or from reading changes to locally stored data objects, the cloud interface device 502 may coordinate the object interface requests using the mapping 406 of cloud storage objects 414 in the cloud object store 404.

For example, in some embodiments, the incremental modifications may be determined based at least in part on changes to the data objects stored locally to reflect changes to the logical tree 300. In some instances, the cloud interface appliance 402 may read the logical tree 300 or at least the changes thereto in order to determine the incremental modifications. Such data may be passed to the cloud interface appliance 402 by another component of the file system such as the DMU 218 or a mirror VDEV. With some embodiments, the incremental modifications may be transferred to the cloud interface appliance 402. However, in some embodiments, the cloud interface appliance 402 may determine the incremental modifications based at least in part on analyzing write requests in view of a copy or a snapshot of the logical tree 300 and/or a snapshot of the logical tree 300A. With embodiments where the cloud interface appliance 402 uses a snapshot of the logical tree 300A, the snapshot may, in some embodiments, be retained in the mapping 406 or otherwise be stored in memory and/or the physical layer.

Referring again more particularly to FIG. 7A, as indicated by block 714, the determination of the incremental modifications may include creating new leaf nodes (e.g., leaf nodes 324, 326). After an initial stage of a write operation, new data blocks (i.e., leaf nodes) have been allocated in memory and data per the write operation has been written by the cloud interface appliance 402 to the new data blocks, while the previous data and data blocks likewise persist in memory.

As indicated by block 729, after the leaf nodes (data blocks) are created in block 714, a determination is made as to whether any of the ZFS data services have been turned on or requested. These include, but are not limited to, compression, encryption, deduplication, snapshotting, and cloning. If any of these data services are not required—then as indicated by block 716, new non-leaf nodes may be created (e.g., non-leaf nodes 326, 330). As the write operation continues, the cloud interface appliance 402 may determine non-leaf nodes that reference previous versions of nodes. In order to reference the newly written data, new non-leaf nodes are allocated to reference the new data blocks in the leaf nodes. The same process may be repeated recursively upwards through the hierarchy of the logical tree 300A, reflected by the snapshot 301, until each non-leaf node referencing a changed node is reallocated to point to new nodes. When the pointer blocks are allocated in new nodes in the hierarchy, the address pointer in each node may be updated to point to the new location of the allocated child in memory. As indicated by block 718, in order to finalize the write operation, the root node can be reallocated and updated (e.g., root node 336). When the root node is ready to be updated, a new root node (uberblock) can be allocated and initialized to point to the newly allocated child nodes below the new root node.

As part of the writing operation, the metadata of all portions of the tree involved in transactional write operations is updated with check summing. Each node created includes a checksum that is calculated using the node referenced by the address pointer. This arrangement means that the checksum is stored separately from the node from which it is calculated. By storing the checksum of each node in its parent node pointer and not in the node itself, every node in the tree contains the checksums for all its children. This is illustrated in further detail with respect to the examples of FIGS. 3A-3D. By doing this, each tree is automatically self-validating, and it is always possible to detect inconsistencies with read operations.

Figure 7B:
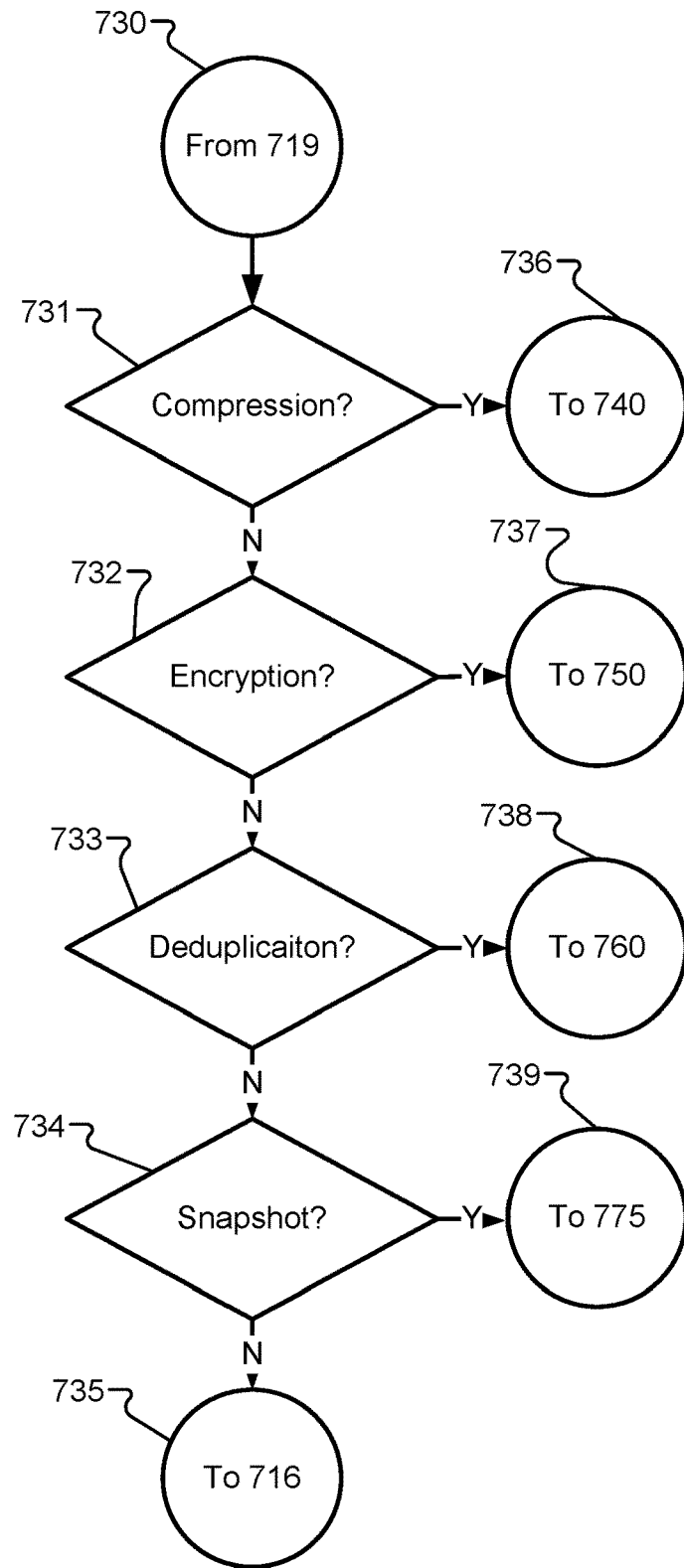

If at block 729 data services are required, the next block 719 goes to block 730 on FIG. 7B. Data services include, but are not limited to, compression, encryption, deduplication (which must be done in that order), snapshotting and cloning.

Compression is the process of reducing the data size of a data block (referred to interchangeably with leaf node or data node), typically by exploiting redundancies in the data block itself. Many different compression types are used by ZFS. When compression is enabled, less storage can be allocated for each data block. The following compression algorithms are available. LZ4—an algorithm added after feature flags were created. It is significantly superior to LZJB. LZJB is the original default compression algorithm) for ZFS. It was created to satisfy the desire for a compression algorithm suitable for use in file systems. Specifically, that it provides fair compression, has a high compression speed, has a high decompression speed and detects incompressible data detection quickly. GZIP (1 through 9 implemented in the classic Lempel-Ziv implementation. It provides high compression, but it often makes IO CPU-bound. ZLE (Zero Length Encoding)—a very simple algorithm that only compresses zeroes. In each of these cases there is a trade-off of compression ratio to the amount of latency involved in compressing and decompressing the data block. Typically—the more compressed the data—the longer it takes to compress and decompress it.

Encryption is the process of adding end-to-end security to data blocks by encoding them cryptographically with a key. Only users with a key can decrypt the data block. As used in the ZFS system, a ZFS pool can support a mix of encrypted and unencrypted ZFS data sets (file systems and ZVOLs). Data encryption is completely transparent to applications and provides a very flexible system for securing data at rest, and it doesn't require any application changes or qualification. Furthermore ZFS encryption randomly generates a local encryption key from a passphrase or an AES key and all keys are stored locally with the client—not in the cloud object store 404 as traditional file systems do. Encryption is transparent to the application and storage to the cloud object store 404 when turned on. ZFS makes it easy to encrypt data and manage data encryption. You can have both encrypted and unencrypted file systems in the same storage pool. You can also use different encryption keys for different systems, and you can manage encryption either locally or remotely—although the randomly generated encryption key always remains local. ZFS encryption is inheritable to descendent file systems. Data is encrypted using AES (Advanced Encryption Standard) with key lengths of 128, 192, and 256 in the CCM and GCM operation modes.

Deduplication is the process of recognizing that a data block to be stored in the file system is already stored on the file system as an existing data block and pointing to that existing data block rather than storing the data block again. ZFS provides block-level deduplication because this is the finest granularity that makes sense for a general-purpose storage system. Block-level deduplication also maps naturally to ZFS's 256-bit block checksums, which provide unique block signatures for all blocks in a storage pool as long as the checksum function is cryptographically strong (e.g. SHA256). Deduplication is synchronous and is performed as data blocks are sent to the cloud object store 404. If data blocks are not duplicated, enabling deduplication will add overhead without providing any benefit. If there are duplicate data blocks, enabling deduplication will both save space and increase performance. The space savings are obvious; the performance improvement is due to the elimination of storage writes when storing duplicate data, plus the reduced memory footprint due to many applications sharing the same pages of memory. Most storage environments contain a mix of data that is mostly unique and data that is mostly replicated. ZFS deduplication is per-dataset and can be enabled when it is likely to help.

A snapshot is a read-only copy of a file system or volume. A snapshot is a view of a filesystem as it was at a particular point in time in terms of changes to the tree image. ZFS's snapshots are useful in the same way that some other filesystems's snapshots are: By doing a backup of a snapshot, you have a consistent, non-changing target for the backup program to work with. Snapshots can also be used to recover from recent mistakes, by copying the corrupted files from the snapshot. Snapshots can be created almost instantly, and they initially consume no additional disk space within the pool. However, as blocks (in this case both data and metadata) within the active dataset changes, the snapshot consumes disk space by continuing to reference the old blocks, thus preventing the storage space from being freed. The blocks containing the old data will only be freed if the snapshot is deleted. Taking a snapshot is a constant-time operation. The presence of snapshots doesn't slow down any operations. Deleting snapshots takes time proportional to the number of blocks that the delete will free and make available, and is very efficient. ZFS snapshots include the following features: they persist across system reboots; the theoretical maximum number of snapshots is $2^{64}$; they use no separate backing store; they consume disk space directly from the same storage pool as the file system or volume from which they were created; recursive snapshots are created quickly as one atomic operation; and they are created together (all at once) or not created at all. The benefit of atomic snapshot operations is that the snapshot data is always taken at one consistent time, even across descendent file systems. Snapshots cannot be accessed directly, but they can be cloned, backed up, rolled back to, and so on. Snapshots can be used to "roll back" to the point when the snapshot was taken A clone is a writable volume or file system whose initial contents are the same as the dataset from which it was created. In the ZFS system clones are always created from snapshots. As with snapshots, creating a clone is nearly instantaneous and initially consumes no additional disk space. In addition, you can snapshot a clone. Clones can only be created from a snapshot. When a snapshot is cloned, an implicit dependency is created between the clone and snapshot. Even though the clone is created somewhere else in the dataset hierarchy, the original snapshot cannot be destroyed as long as the clone exists. Clones do not inherit the properties of the dataset from which it was created. A clone initially shares all its disk space with the original snapshot. As changes are made to the clone, it uses more disk space. Clones are useful to branch off and do development or troubleshooting—and can be promoted to replace the live file system. Clones can also be used to duplicate a file system on multiple machines.

Referring now back to FIG. 7B, flowchart 700-2 showing a method for determining and applying data services to data blocks. At decision block 731 if compression is turned on or requested then the next block is 740. At decision block 732, if encryption is turned on or requested then the next block is 750. At decision block 733, if deduplication is turned on or requested then the next block is 738. At decision block 734, if a snapshot is to be taken, the next block is 775. Block 735 returns to block 716. FIG. 7B also illustrates the required ordering of any requested data services. Compression must be performed first followed by encryption, deduplication, and snapshotting and cloning. When data blocks are read, the reverse order must be employed.

As indicated by block 720, data objects and metadata corresponding to the incremental modifications may be stored in the cloud object store 404. In various embodiments, the cloud interface appliance 402 may create, read, forward, define, and/or otherwise specify data objects and metadata corresponding to the incremental modifications. As indicated by block 722, in some embodiments, the storage of the data objects and metadata may be caused at least in part by the cloud interface device 502 sending requests to the cloud interface daemon 604. As indicated by block 724, the requests sent by the cloud interface device 502 to the cloud interface daemon 604 may be translated into put requests for the cloud client interface 608. The requests sent by the cloud interface device 502 may be put requests in some embodiments; in other embodiments, the cloud interface daemon 604 may translate the requests sent by the cloud interface device 502 into put requests.

As indicated by block 726, responsive to the requests sent by the cloud interface device 502, the cloud interface daemon 604 may communicate, via the object protocol over the one or more networks, with the cloud object store 404 to cause storage of the data objects and metadata corresponding to the incremental modifications as new cloud objects. As indicated by block 728, the cloud interface appliance 402 may update the mapping 406 in view of the data objects and metadata corresponding to the incremental modifications stored in the cloud object store 404.

Figure 7C:
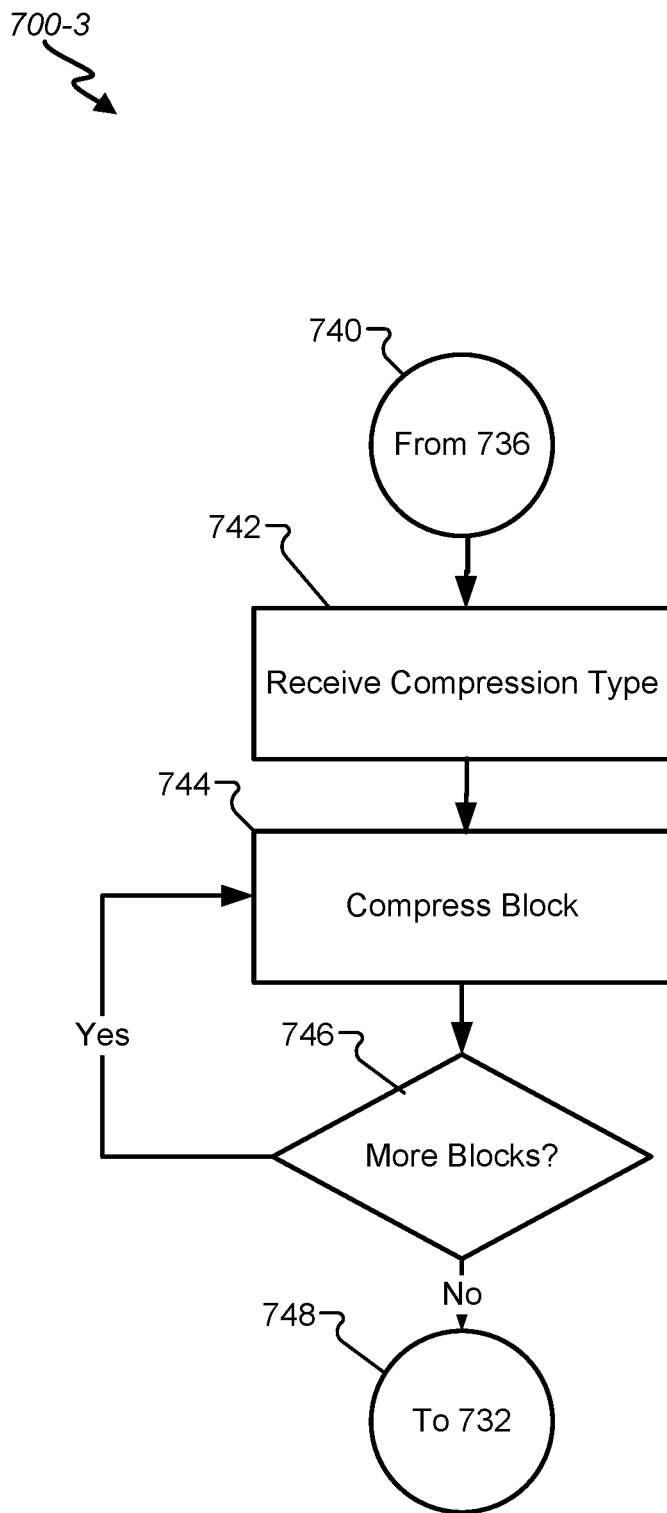

Referring now to FIG. 7C depicting a flowchart 700-3 at block 742 from block 740. FIG. 7C depicts a flowchart of compressing the data blocks to preserve storage space. Compression is performed in the transactional object layer at the DMU 218 as shown in FIG. 2. Compression is typically turned on because it reduces the resources required to store (cloud object store 404) and transmit data. Computational resources are consumed in the EMU 218 in the compression process and, usually, in the reversal of the process (decompression). Data compression is subject to a space-time complexity trade-off. For instance, a compression scheme may require intensive processing decompression fast enough to be consumed as it is being decompressed. The design of data compression schemes involves trade-offs among various factors, including the degree of compression and the computational resources required to compress and decompress the data. A compression type is received or retrieved at block 742 by the DMU 218 to compress the data block. Many different types of compression are supported by ZFS including, but not limited to, LZ4 LZJB, GZIP, and ZLE. At block 744 the data blocks is compressed by the DMU 218 using the compression type. At decision block 746 it is determined if there are more data blocks from the tree hierarchy that are to be written to the cloud object store 404 that need to be compressed. If so—then block 744 is repeated until the all blocks are compressed by the DMU 218 using the compression type. Once all blocks are compressed, block 748 returns to block 732 of FIG. 7B.

Figure 7D:
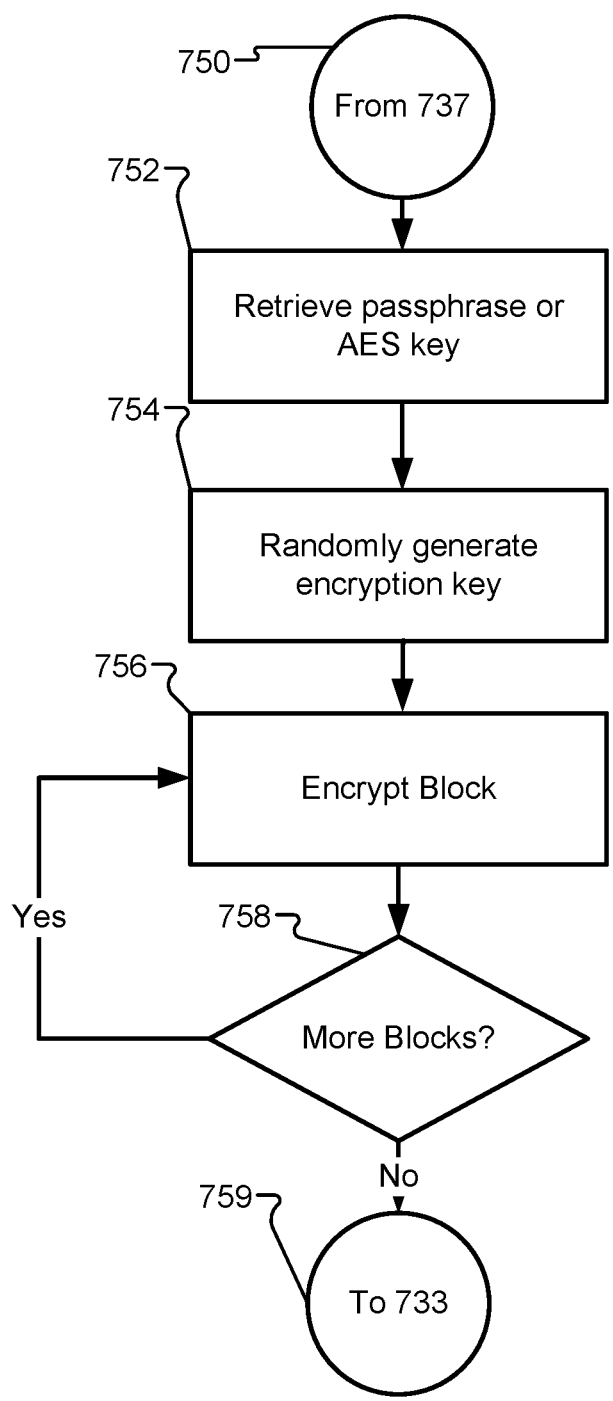

FIG. 7D depicts a flow chart 700-4 of the process of encrypting the data blocks if encryption is requested or turned on. At block 752, the passphrase or AES key is retrieved or provided to the DMU 218. ZFS uses a "wraparound" encryption key system that uses a passphrase or AES key, stored locally, to then randomly generate an encryption key to encrypt the data blocks as shown in block 754. The passphrase or AES key can be stored in any local storage including the ARC 224. Encryption does not of itself prevent the data blocks from being misappropriated, but denies the message content to the interceptor. In an encryption scheme, the intended data block, is encrypted using an encryption algorithm, generating ciphertext that can only be read if decrypted. For technical reasons, an encryption scheme usually uses a pseudo-random encryption key generated by an algorithm. It is in principle possible to decrypt the message without possessing the key, but, for a well-designed encryption scheme, large computational resources and skill are required. ZFS Data blocks are encrypted using AES (Advanced Encryption Standard) with key lengths of 128, 192, and 256. The data blocks are encrypted at block 756 using the randomly generated encryption key. At decision block 758, it is determined if more data blocks need to be encrypted, and if there are, they are encrypted at block 756 until there are no more data blocks to encrypt. Then blocks 759 returns to block 733 of FIG. 7B to determine if the data blocks need more data service processing.

Figure 7E:
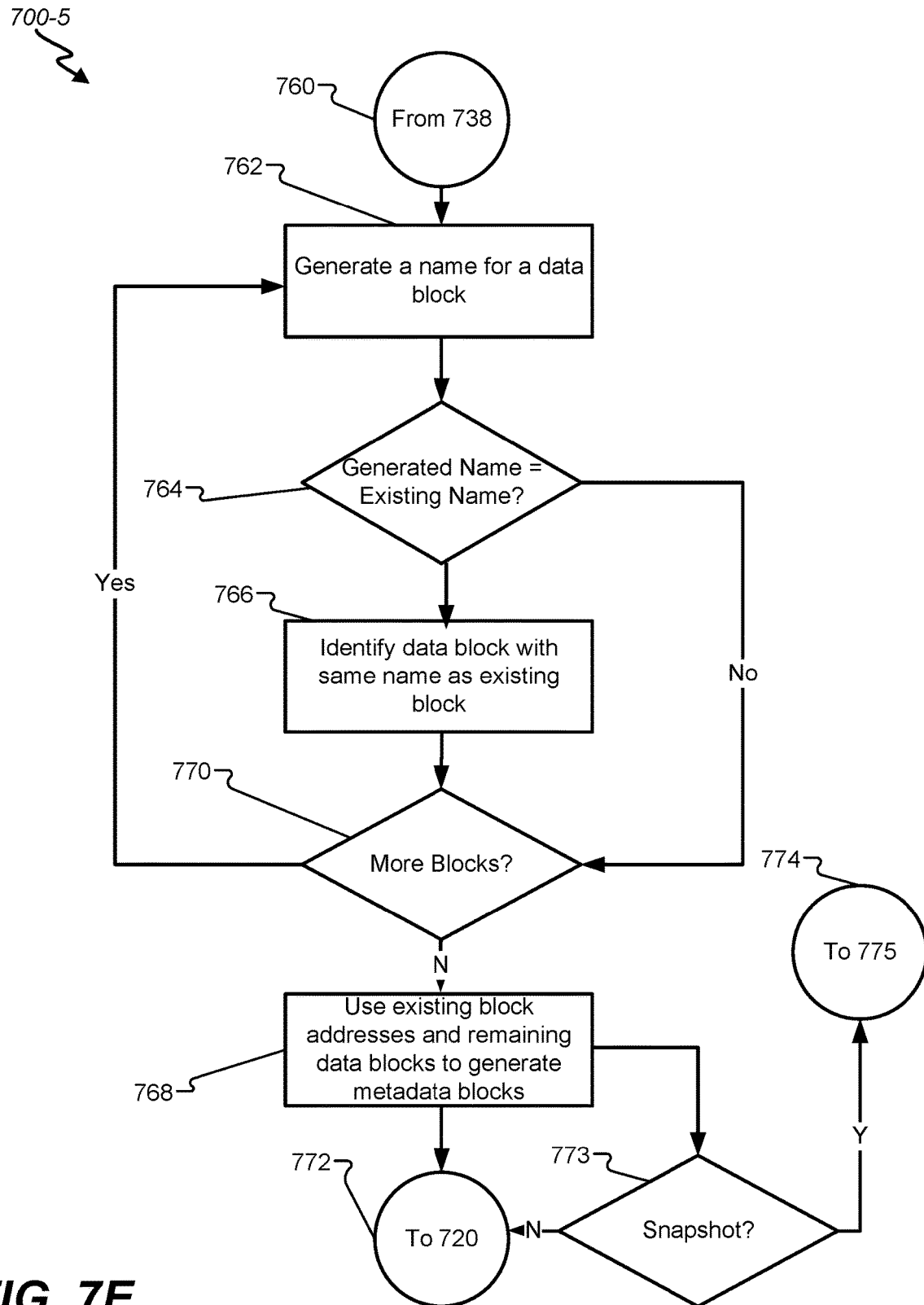

FIG. 7E depicts the flowchart 700-5 to deduplicate data blocks in the cloud object store 404. Data block duplication a specialized data compression technique for eliminating duplicate copies of repeating data. Data block deduplication is used to improve storage utilization and can also be applied to network data transfers to reduce the number of data blocks that must be sent to store in a COW memory. In the deduplication process, unique data blocks are identified and stored during a process of analysis. As the analysis continues, other data blocks are compared to the stored copy and whenever a match occurs, the redundant data block is replaced with a small reference that points to the stored data block. Given that the same data block pattern may occur dozens, hundreds, or even thousands of times the number of data blocks that must be stored or transferred is reduced substantially using deduplication. This type of deduplication is different from that performed by standard file-compression discussed for FIG. 7C. That compression identifies short repeated substrings inside individual data blocks, the intent of storage-based data deduplication is to inspect large volumes of data and identify entire data blocks that are identical, in order to store only one copy of it. Consider, for example a typical email system might contain 100 instances of the same 1 MB (megabyte) file attachment and if all 100 instances of the attachment are saved, it would require 100 MB storage space. With data deduplication, only one instance of the attachment is actually stored; the subsequent instances are referenced back to the saved copy for deduplication ratio of roughly 100 to 1. Thus, data block deduplication can reduce the required storage place in the cloud object store 404 and reduce the pressure on the network transferring the data blocks to the cloud object store 404.

In FIG. 7D at block 762 the first process is to generate a name for the data block using a name generation protocol. In ZFS that includes using a checksum algorithm such as the SHA256. When the checksum algorithm is performed on the data block, it generates a checksum that is unique to the content of the data block. Thus—if any other data block has exactly the same content—the checksum, using that same algorithm or naming protocol, would be exactly the same. And that is the key to ZFS data deduplication. At the decision block 764 it is determined if there is an existing data block with the same name. This can be done in a multitude of ways. One is to keep a local table of existing names. That, however, would limit data block deduplication to deduplicating only data blocks originating locally. The table of existing names can be stored on the object store 404. The table on objet store 404 could be stored in the client local data pool or globally and available to all clients. Where the data is stored at the object store will affect the amount of data block compression that can be achieved through data block deduplication. For instance—if the table with existing names is global, only one copy of the 1 MB file discussed above would need to be stored on the cloud object store 404 even if there were multiple clients using the cloud object store 404. This would be the case even if the 1 MB attachment had gone "viral" through email and ending up as an attachment to thousands of emails. With a global existing name table on the cloud object store 404—that 1 MB file would be stored only once on the cloud object store 404—but referenced by perhaps 1000s of metadata blocks pointing to it. To that end at block 766 the data block with the same name as the existing name ignored when doing further storage computations with the data blocks and the pointer to the existing block is used to create metadata blocks to generate the tree at block 768 according to the method of blocks 716 and 718 in FIG. 7A. Decision block 770 causes a repeat of the process for as many data blocks in the tree by returning to block 762. At decision block 773 if a snapshot has been requested the at block 774 the next block is 775 in FIG. 7F. If a snapshot has not been requested the next block at 772 is block 720 in FIG. 7A.

Figure 7F:
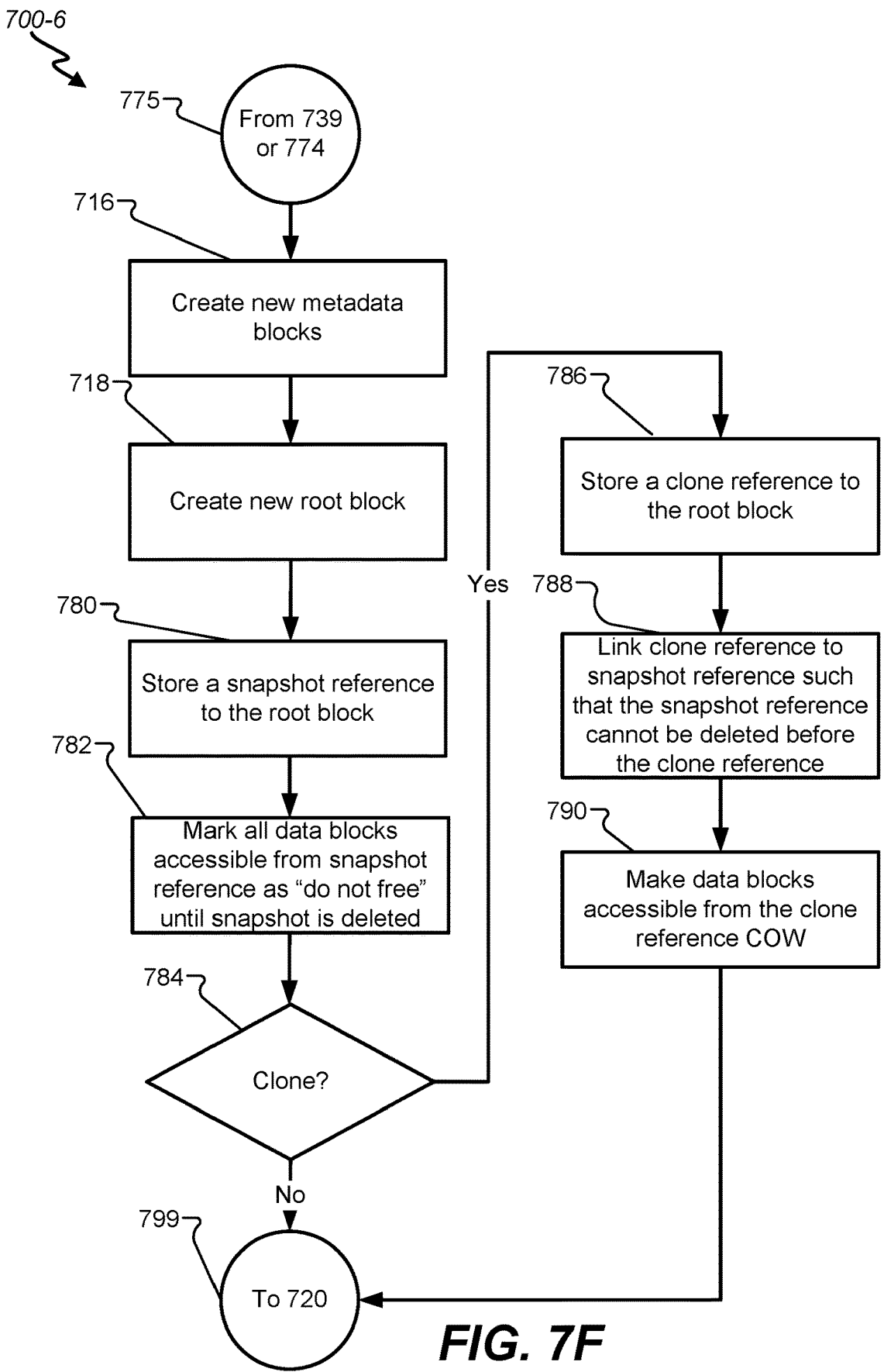

FIG. 7F depicts the flowchart 700-6 of a method for ZFS snapshotting and cloning to a cloud object store 404. ZFS snapshots are the essential and effortless backup mechanism for ZFS systems. ZFS snapshots are a "picture" of the ZFS tree hierarchy at moment in the tree's "life." As discussed in FIG. 3F, time, in terms of a snapshot, is based on the birth time of the root block (used interchangeably with root node and uberblock) which is expressed in terms of which progression the root block was created in. A progression occurs each time a data block is generated to be stored. Ultimately—the complete tree hierarchy is generated before taking a snapshot as described in FIGS. 3A-3D and blocks 716 and 718 of FIG. 7A. A reference to the root block is stored as depicted in block 780. The root block and all blocks active at that progression are part of the snapshot in that the snapshot reference points to the root block and the root block points to all blocks through each lower level block, but they are not stored as duplicate blocks. Rather, as shown in block 782 all of the blocks in the tree that accessible from the tree root block are marked as "do not free," which designates them as "Read Only" in ZFS syntax. In the normal progression of the ZFS storage COW system, once a block is not active—in other words—it is not referenced by any higher level block—it is made free for other storage needs. The snapshot blocks must be kept intact for a snapshot to be useful at all. When a block is referenced through a root block referenced by a snapshot—the block cannot be "freed" until the snapshot is deleted. This makes it possible to back up to the point the snapshot was made until the snapshot is deleted. Snapshots can be stored in the cloud object store 404, ARC 222, L2ARC 222-3, or any other local storage such as system storage 228. Using the ZFS file system, snapshots can be requested at particular instances in the progression of the hierarchical tree and they can be automatically generated at a particular periodic point in time. Old snapshots are not automatically deleted when new snapshots are created—so even after a new snapshot is created—a backup can occur to a previous snapshot as long as it has not been deleted. Thus—snapshots enable incremental backups—since the entire file system does not have to copied indeed the entire backup is already in the cloud object store 404 as pointed to by the root block referenced by the snapshot. The root block pointed to by the snapshot reference becomes the active root block and all subsequent root blocks an block created at a birth time after the snapshot can be freed for other storage use.

At decision block 784 that determines if a clone has been requested. If a clone has not been requested, at block 799 the snapshot process is over and block 720 in FIG. 7A is next. If a clone has been requested—it is made from the snapshot and as shown in block 786, a clone reference points to the same root block that the snapshot points to. A clone is always generated from a snapshot such that a snapshot cannot be deleted until the clone is deleted as shown in block 788. Clones are used for a variety of purposes—for multiple development purposes from the same data storage set, to instantiate a new virtual machine, to troubleshoot issues, etc. To that end, clones must be made able to be COW when accessed from the clone reference. Clones are different than snapshots in that respect—since no COW can occur from a snapshot. Clones need no extra storage capability at generation time—but as progressions are made on the clone tree—clones will use more storage. Snapshots can be made from clones just as they can from active trees and for all the same reasons. Clones do not inherit the properties of the root block data. Clones can be ultimately be promoted to be the active tree as well. At block 799, clone generation is done and block 720 in FIG. 7A is next.

Figure 8:
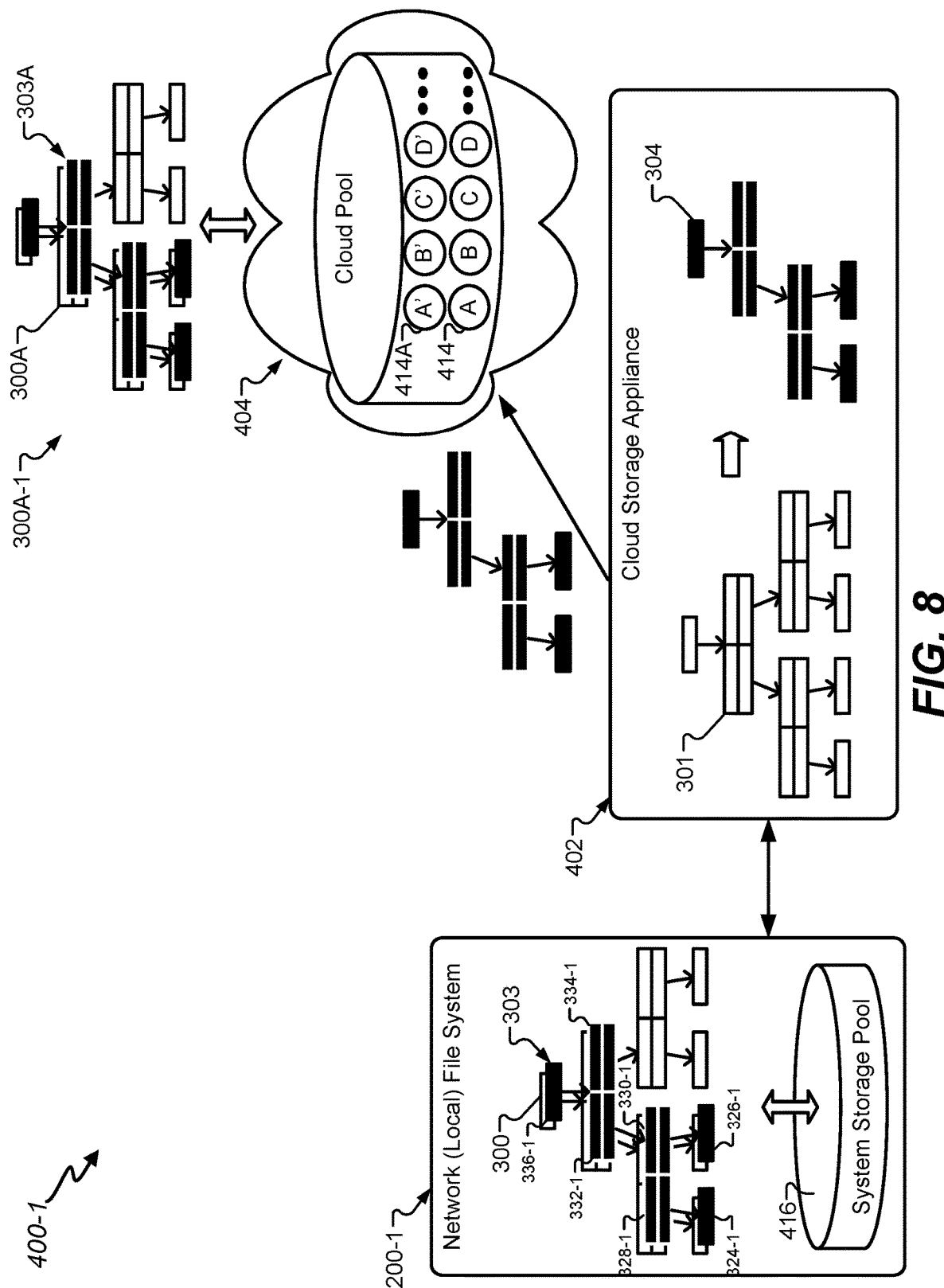
FIG. 8 is a high-level diagram illustrating an example of the cloud interface appliance handling incremental modifications, in accordance with certain embodiments of the present disclosure.

FIG. 8 is a high-level diagram illustrating an example of the cloud interface appliance 402 handling incremental modifications, in accordance with certain embodiments of the present disclosure. Certain embodiments may provide a very efficient incremental-always (also known as incremental forever) backup capability, in addition to the ability to restore optimally (without applying multiple incremental updates) from the cloud. Traditional backup methods in the industry involve pushing copies into the cloud. But certain embodiments according to the present disclosure allow for a cloud-based, copy-on-write file system where only new data objects are written to cloud storage. Cloud storage where only new and modified data needs to be sent provides an extremely effective solution for backing up and restoring from cloud providers. Old data objects need not be modified. These embodiments, along with the consistency model using transaction groups, facilitates cloud storage with incremental forever backup where consistency can always be confirmed.

For illustration, FIG. 8 depicts the cloud interface appliance 402 as having created an initial backup (e.g., cloud data objects 414 corresponding to backup logical tree 300A) of the local instance of the logical tree 300. In some embodiments, the cloud interface appliance 402 may utilize an active tree image 301 or a full copy to create the backup. After a full backup of the local instance of the logical tree 300 is initially created, a number of modifications 303 may be made to the logical tree 300 with various transactions. In FIG. 8, the storing of the data objects and metadata corresponding to the incremental modification 303 is illustrated. The incremental modification 303 is depicted, by way of example, with new leaf nodes 324, 326; new non-leaf nodes 328, 330, 332, 334; and a new root node 336.

The cloud interface appliance 402 may be configured to create incremental backups, potentially indefinitely. To that end, certain embodiments of the cloud interface appliance 402 may utilize a snapshot COW process (e.g., as disclosed above with respect to FIGS. 3E and 7F). In the example depicted in FIG. 8, may utilize an image 304 to create the incremental modification. In some embodiments, the image 304 may correspond to an active tree image; in some embodiments, the image 304 may correspond to a snapshot. With the image 304, the cloud interface appliance 402 may cause storage of an incremental modification 303A, which may correspond to cloud storage objects 414A. In accordance with the cloud-based COW process, new cloud objects 414A are allocated for the data objects and metadata corresponding to the incremental modification 303, with the cloud-based instantiation of the incremental modification 303 indicated as incremental modification 303A. The new root node can then be made the root of the modified logical tree 300A-1 with the storing operation to finalize the state of the modified logical tree 300A-1. The modified logical tree 300A-1 may correspond to the logical tree 300A modified by the incremental modification 303A.

With the storing of the incremental modification 303A, blocks of the logical tree 300A (saved as cloud data objects 414) containing active data may not be overwritten in place. The new cloud data objects 414A may be allocated, and modified/new data and metadata may be written to the cloud data objects 414A. The previous version of data may be retained, allowing a snapshot version of the logical tree 300A to be maintained. In some embodiments, any unchanged data may be shared among the modified logical tree 300A-1 and its associated snapshots.

Thus, utilizing snapshots, such as the exemplary snapshot 301, and uberblocks, such as those corresponding to roots 336, 336-1, the cloud object store 404 may be updated only with respect to a subset of nodes that changed since the last snapshot. And that update of the incremental 303A may hook in to the version of tree 300A in the cloud via the root node so that any part of the whole modified logical tree 300A-1 may be accessed.

By sending incremental snapshots into the cloud date store 404, metadata that can be retained inside the data instance which allows traversal of the tree and get a picture of the tree at time of snapshot. At the same time, this allows for a very condensed representation of data that only retains data of blocks referenced that are specified/requested as to be retained in by the snapshot, such that only a minimal amount of data need be stored in the tree to retain point-in-time images of the tree. Every incremental may be merged with the tree 300A previously stored in the cloud date store 404 so that, after each incremental is sent, so that a full, current representation of data always exists. Each merging of an additional incremental with the tree 300A may results in single data instance such that full backup operations are unnecessary.

Although unnecessary from a performance perspective, in some embodiments, full back-ups may be made periodically to avoid having to gather up a high number of incrementals if that is not desired by a client. With some implementations, multiple versions of full backups may be retained, if desired. Thus, certain embodiments provide for complete control of intervals, snapshots, and backups. Advantageously, certain embodiments may be configured to dynamically self-adjust incremental intervals. For example, some embodiments may initially operate according to a first interval. In various instances, an interval could be with every write operation to the local tree, every half hour, every day, etc. When a churn rate (e.g., a metric monitored by the hybrid cloud storage system 400 that indicates rates of changes the local tree) exceeds (or decrease to) a certain churn threshold, the hybrid cloud storage system 400 may automatically transition to a different interval. For example, if the churn rate exceeds a first churn threshold, the hybrid cloud storage system 400 may automatically transition to a greater interval of time for the incremental interval. Likewise, if the churn rate decreases to the first churn threshold or another churn threshold, the hybrid cloud storage system 400 may automatically transition to a lesser interval of time for the incremental interval. Certain embodiments may employ multiple churn thresholds to throttle incremental frequencies per a gradated scheme. Similarly, certain embodiments may dynamically self-adjust full backup intervals based at least in part on such churn thresholds and/or incremental size and/or number thresholds, which could be client-defined in some instances.

One of the chief problems with writing an object into a cloud and subsequently reading the object from the cloud is that integrity of the object read is not guaranteed. There is a risk of degradation of data incumbent with the cloud storage (e.g., storage loss, transmission failure, bitrot, etc.). Furthermore, with the involvement of multiple versions of objects, there is a risk of reading an undesired version of an object. For example, a previous version of the desired object may be read, such as the most recent version in an instance where an update of the object is incomplete.

Traditional object store architectures rely on copies of data wherein a quorum (i.e., 2 copies) is satisfied initially and additional copies (e.g., a third copy) are updated asynchronously. This presents the possibility that a client could receive a copy of data before all copies been updated, and consequently get an inconsistent view of the data. A typical solution for object store consistency is to ensure that all copies are made prior to the data being available, however ensuring consistency with that solution is typically not realistic or attainable. An object-based approach where the checksum of the object is stored in the object's metadata alongside the object or in a reference database elsewhere would allow validation of the object content but would not validate the correct version of the object. Moreover, solutions that might use object versioning and check from a single location would somewhat defeat the purpose and intent of cloud storage.

However, certain embodiments according to the present disclosure may provide consistency model that can ensure guaranteed integrity in the cloud and that can ensure always-consistent semantics from an eventually consistent object model. For example, certain embodiments may provide fault isolation and consistency through the use of logical trees disclosed herein. With all transactional write operations to the cloud object stores, the checksums in the metadata of the self-describing Merkle tree may be updated. As described above, the storing of checksums separately from the node from which the checksums are calculated ensures that each tree is automatically self-validating. At every tree layer, the node below is referenced by a node pointer that includes a checksum. So, when an object is read out of the cloud, it may be determined whether that object is correct.

Figure 9:
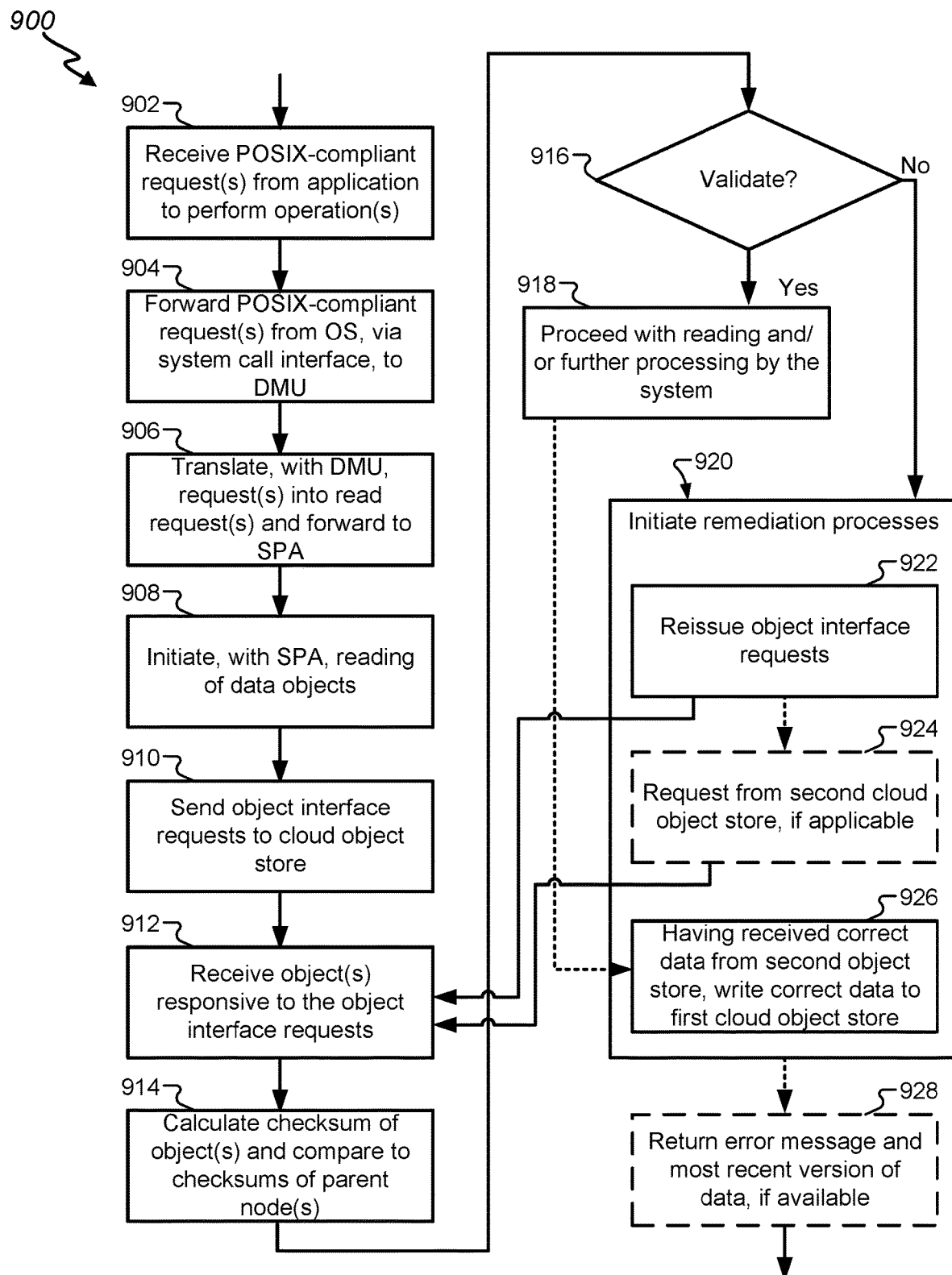
FIG. 9 is a block diagram that illustrates an example method directed to certain features of the hybrid cloud storage system that ensure integrity in the cloud and always-consistent semantics from an eventually consistent object model, in accordance with certain embodiments of the present disclosure.

FIG. 9 is a block diagram that illustrates an example method 900 directed to certain features of the hybrid cloud storage system 400 that ensure guaranteed integrity in the cloud and always-consistent semantics from an eventually consistent object model, in accordance with certain embodiments of the present disclosure. According to certain embodiments, the method 900 may begin as indicated by block 902. However, as clarified above, teachings of the present disclosure may be implemented in a variety of configurations such that the order of certain steps of methods disclosed herein may be shuffled or combined in any suitable manner and may depend on the implementation chosen. Moreover, while the following steps may be separated for the sake of description, it should be understood that certain steps may be performed simultaneously or substantially simultaneously.

As indicated by block 902, a POSIX-compliant request to perform one or more particular operations (i.e., one or more transactions) may be received from the application 202.

Such an operation may correspond to reading or otherwise accessing data. As indicated by block 904, the POSIX-compliant request may be forwarded from the operating system, via the system call interface 208, to the DMU 218. As indicated by block 906, the DMU 218 may translate requests to perform operations on data objects directly to requests to perform one or more read operations (i.e., one or more I/O requests) directed to the cloud object store 404. As indicated by block 908, the SPA may receive the I/O request(s) from the DMU 218. Responsive to the request(s), the SPA may initiate reading of one or more data objects from the cloud object store 404.

As indicated by block 910, the cloud interface appliance 402 may receive the I/O request(s) and may send corresponding cloud interface request(s) to the cloud object store 404. In some embodiments, the cloud interface appliance 402 may translate the I/O requests into corresponding object interface requests. The cloud interface device 502 may coordinate the object interface requests using the mapping 406 of cloud storage objects 414 in the cloud object store 404. For example, the cloud interface appliance 402 may identify and request all or a portion of a file stored as cloud data objects in accordance with a logical tree.

As indicated by block 912, the cloud interface appliance 402 may receive data object(s) responsive to the object interface requests. As indicated by block 914, the data object(s) may be checked with a checksum(s) from parent node(s) in the logical tree. In various embodiments, the checking may be performed by the cloud interface appliance 402 and/or the I/O pipeline 224.

Figure 10:
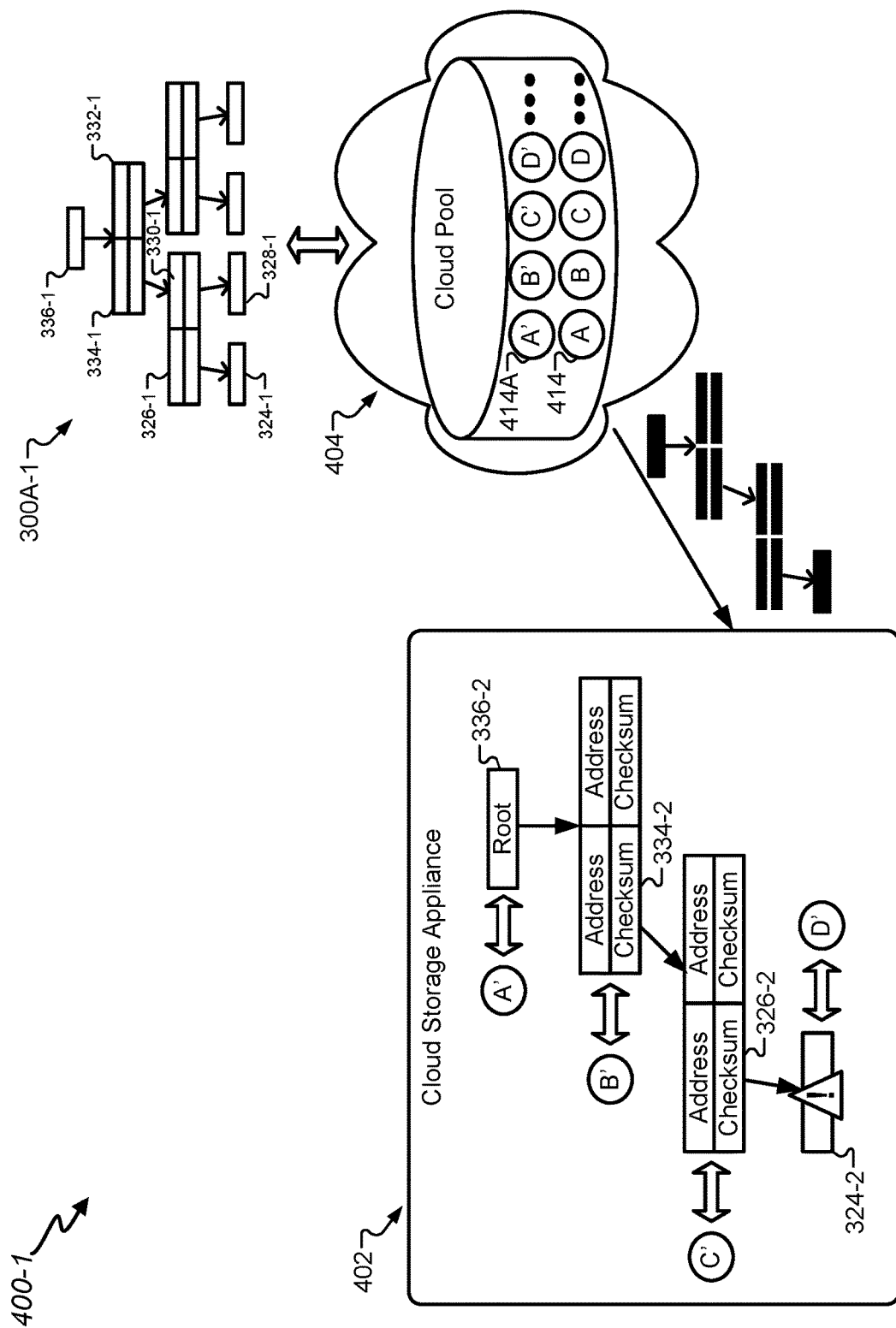
FIG. 10 is a high-level diagram illustrating an example of the cloud interface appliance handling the checking, in accordance with certain embodiments of the present disclosure.

FIG. 10 is a high-level diagram illustrating an example of the cloud interface appliance 402 handling the checking, in accordance with certain embodiments of the present disclosure. Again, in other embodiments, another component of the system 400 may perform the checking. But, in FIG. 10, the cloud interface appliance 402 is depicted as having accessed the cloud object store 404 to read data stored according to the logical tree 300A-1. In the example depicted, the cloud storage appliance 402 is illustrated as having accessed cloud objects 414A corresponding to the logical tree 300A-1. The cloud storage appliance 402 accessed the leaf node 324-2 by way of the addresses of the non-leaf nodes 326-2, 334-2, and the root node 336-2.

As described herein, when reading a node out of the logical tree, the node is read using a pointer of a node in higher level in the logical tree. That pointer includes a checksum for the data that is expected to be read so that, when data is pulled from the cloud, the data may be checked with the checksum. The actual checksum of the data may be calculated and compared to the expected checksum already obtained by the cloud interface appliance 402 and/or the I/O pipeline 224. In the example depicted, the non-leaf node 326-2 includes the checksum for leaf node 324-2.

In some embodiments, a checksum may be received from the cloud data store with one object and the data to be checked with the checksum is received with a different object. The checksum may be received from the cloud data store with the separate object prior to receiving the different object with the data to be checked, according to some embodiments. Some embodiments may employ an iterative object interface request process such that, in response to a particular object interface request, the object with the checksum is received, and, in response to a subsequent object interface request, the object with the data to be checked is received. Further, with some embodiments, the subsequent object interface request may be made using addressing information that was received with the particular object interface request and points to the object with the data to be checked. With some embodiments, instead of an iterative process, a plurality of objects is received from the cloud data store, after which the checking may be performed on the plurality of objects. The integrity of the logical tree can be quickly checked by traversing the logical tree and calculating checksums of child nodes at each level based on parent nodes. In alternative embodiments, the cloud interface appliance 402 and/or the I/O pipeline 224 may obtain the checksum prior to initiating the read operations and/or may obtain the checksum from another source. For example, in such alternative embodiments, the checksum may be retained in the mapping 406, a snapshot of the logical tree, and/or a local data store.

Referring again to FIG. 9, as indicated by block 916, it may be determined whether to validate the data object(s) by the checksum(s) from parent node(s) in the logical tree with the actual checksum(s) of the data object(s). As indicated by block 918, in the case of the data object(s) being validated, the reading and/or further processing operations of the system 400 may proceed, as the data has been determined to be not corrupted and not the incorrect version. As necessary, checking may proceed with additional objects until all objects are check summed and validated by parent object pointer metadata.

In the case of mismatch of actual and expected checksums of the data object(s), an error condition may be identified. This is the case illustrated in FIG. 10, where the actual checksum of the object D' (which corresponds to leaf node 324-2) does not match the checksum specified by the parent node 326-2 (which corresponds to object C'). With an error condition, process flow of FIG. 9 may proceed to block 920. The mismatch of actual and expected checksums may correspond to situations of getting the wrong version of data that is not up to date, degradation of data due to cloud storage failure, bitrot, and/or transmission loss, etc. As indicated by block 920, remediation may be initiated. In some embodiments, the remediation may include reissuing one or more cloud interface requests to the cloud object store 404. Responsive to each reissued request, process flow may return to block 912, where the cloud interface appliance 402 may receive one or more data objects and another iteration of the checking process may proceed.

The reissuance of the one or more cloud interface requests may correspond to requests that the cloud object store 404 try harder to find the correct version of the object requested. With some embodiments, the cloud interface appliance 402 may iteratively go through cloud nodes/devices until the correct version is retrieved. Some embodiments may iteratively check snapshots of previous versions of tree portions that may be stored in the cloud object store 404. Some embodiments may employ a threshold such that the cloud interface appliance 402 may proceed to other remediation measures after the threshold has been satisfied. The threshold may correspond to a number of reissuances of the one or more cloud interface requests. Alternatively or additionally, the threshold may correspond to an limit on the extent of the search of nodes and/or snapshots. For example, the threshold may govern how many nodes and/or how many snapshots are to be searched before the cloud interface appliance 402 turns to a different remediation measure.

Another remediation measure that the cloud interface appliance 402 may employ is the requesting the correct version of the data from another cloud object store in multiple-cloud implementations, as indicated by block 924. Certain embodiments of multiple-cloud storage are described further herein. A record of the second cloud object store may be inspected to determine whether a copy of the data had been stored in the second cloud object store. In some embodiments, the record could correspond to another mapping 406 specific to the second cloud object store. Having determined that a copy of the data had been stored in the second cloud object store, the cloud interface appliance 402 may initiate one or more object interface requests to the second cloud object store in order to retrieve the desired data.

With such embodiments, the request for the object of interest may be made to the second cloud object store after the threshold of reissued requests to the cloud object store 404 has been satisfied without successfully received the correct version. Alternatively, some implementations could resort to the second cloud object store as a first default, rather than reissuing requests to the cloud object store 404. In any case, responsive to the request to the second cloud object store, process flow may return to block 912, where the cloud interface appliance 402 may receive one or more data objects and another iteration of the checking process may proceed. In the case of the correct data being retrieved from the second cloud object store and being validated, the reading and/or further processing operations of the system 400 may proceed, as indicated by block 918. Additionally, having received correct data from the second cloud object store, the system 400 may write the correct data to the cloud object store 404, as indicated by block 926. The writing of the correct data may be effected with a COW procedure to apply an incremental modification, as disclosed with respect to FIG. 7.

In some embodiments, if the correct data is not retrievable through the remediation processes, an error message and a most recent version of the data may be returned, as indicated by block 928. With some instances, the most recent version of the data may not be retrievable. For example, metadata that should point to the data may be corrupted such that the most recent version of the data cannot be referenced and retrieved. In those instances, an error message may be returned without a most recent version of the data. However, when the most recent version of the data is retrievable, it may be returned, as well. Accordingly, with an end-to-end checksum model, certain embodiments may cover end-to-end traversal of the data from the client into the cloud and back again. Certain embodiments may not only provide for check summing of an entire tree and detecting errors, but also the ability to correct portions of the tree through resilvering and data scrubbing.

Figure 11:
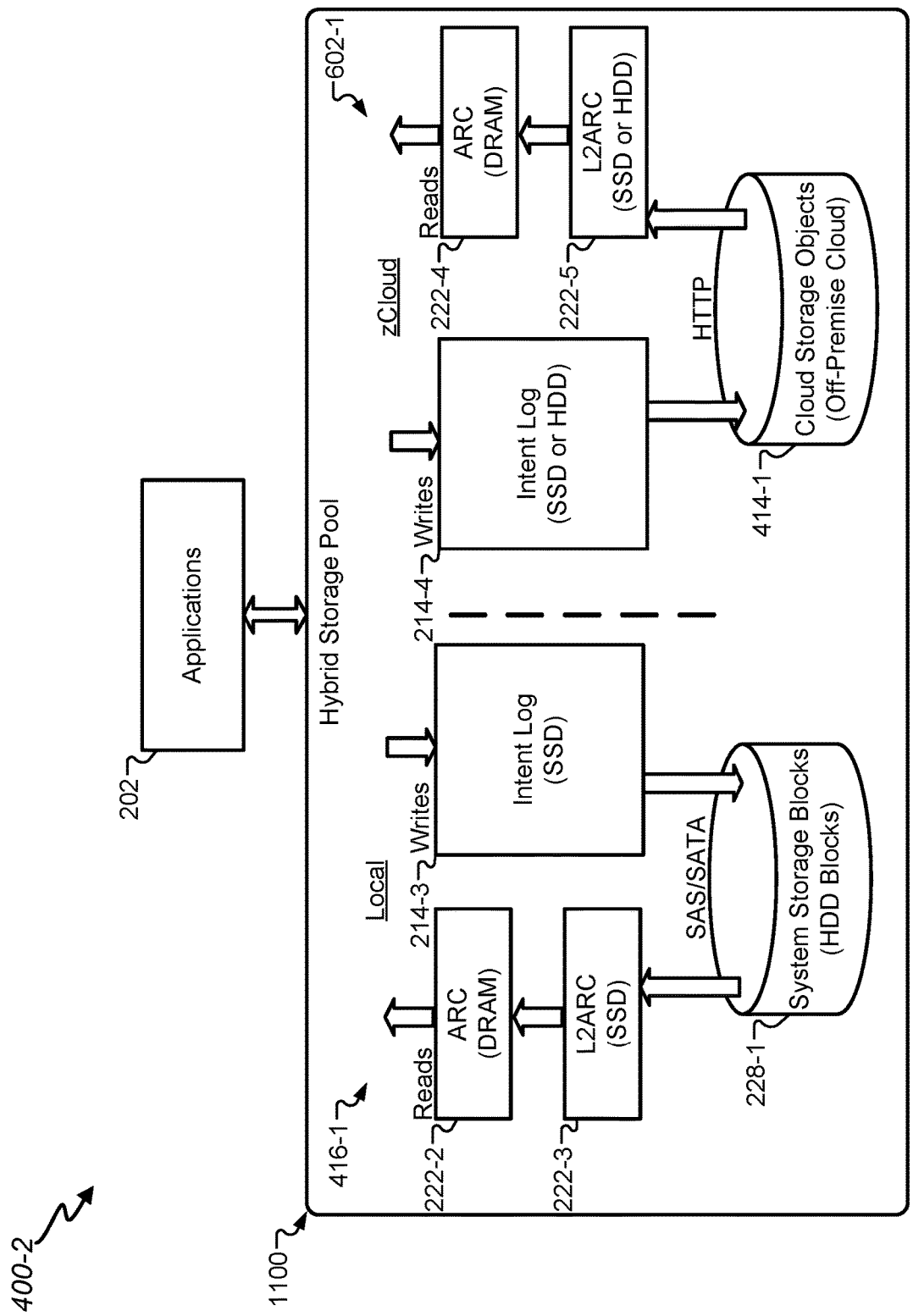
FIG. 11 is a diagram of a simplified example further illustrating features of a hybrid cloud storage system, in accordance with certain embodiments of the present disclosure.

FIG. 11 is a diagram of a simplified example further illustrating features of a hybrid cloud storage system 400-2, in accordance with certain embodiments of the present disclosure. The hybrid cloud storage system 400-2 illustrates how a hybrid storage pool 1100 is at least partially formed of the system storage pool 416 and the virtual storage pool 602-1. Flows for read operations and write operations are illustrated for each of the system storage pool 416 and the virtual storage pool 602-1.

In some embodiments, the ARC 222 may include the ARC 222-2. Read operations of the system storage pool 416 may be facilitated by the ARC 222-2 and system storage blocks 228-1. As indicated, certain embodiments of the ARC 222-2 may be implemented with DRAM. As is also indicated, certain embodiments of the system storage blocks 228-1 may have a SAS/SATA-based implementation. With some embodiments, read operations of the system storage pool 416 may be further facilitated by a L2ARC device 222-3 that may extend the cache size. With some embodiments, the ARC 222 may be referenced as inclusive of the L2ARC device 222-3. As indicated in FIG. 11, certain embodiments of the L2ARC device 222-3 may have a SSD-based implementation. Write operations of the system storage pool 416 may be facilitated by the system storage blocks 228-1 and the intent log 214-3. As indicated, certain embodiments of the intent log 214-3 may have a SSD-based implementation.

To the local system, the virtual storage pool 602-1 may appear and behave as a logical disk. Similar to the system storage pool 416, read operations of the virtual storage pool 602-1 may be facilitated by the ARC 222-4 and the cloud storage objects blocks 414-1. With some embodiments, the ARC 222 may be referenced as inclusive of the ARC 222-4, even though the ARC 222-4 may be implemented with one or more separate devices in some embodiments. As indicated in FIG. 11, certain embodiments of the ARC 222-4 may be implemented with DRAM. In some embodiments, the ARC 222-4 may be the same cache as the ARC 222-2; in other embodiments, the ARC 222-4 may be a separate cache of the virtual storage pool 602-1 that is distinct from the ARC 222-2. As indicated, certain embodiments facilitating the cloud storage objects blocks 414-1 may have an HTTP-based implementation.

With some embodiments, read operations of the virtual storage pool 602-1 may be further facilitated by a L2ARC device 222-5. With some embodiments, the ARC 222 may be referenced as inclusive of the L2ARC device 222-5. In some embodiments, the LSARC device 222-5 may be the same cache as the L2ARC device 222-3; in other embodiments, the LSARC device 222-5 may be a separate cache device of the virtual storage pool 602-1 that is distinct from the L2ARC device 222-3. As indicated, certain embodiments of the L2ARC device 222-5 may have a SSD-based or a HDD-based implementation.

Write operations of the virtual storage pool 602-1 to the cloud storage objects blocks 414-1 may be facilitated by the intent log 214-4. In some embodiments, the intent log 214-4 may be the same as the intent log 214-3; in other embodiments, intent log 214-4 may be a separate and distinct from the intent log 214-3. As indicated, certain embodiments of the intent log 214-4 may have a SSD-based or a HDD-based implementation.

The transition to cloud storage provides several advantages (e.g., cost, scale, and geographic locality), but, when used conventionally, cloud storage comes with some limitations. When application clients are located on premise and not co-resident in the cloud, latency is frequently a significant concern with conventional technologies. However, the hybrid cloud storage system 400 can eliminate that concern. Certain embodiments of the hybrid cloud storage system 400 may provide mirroring features to facilitate performance, migration, and availability.

With the hybrid cloud storage system 400, the differential between latencies of read operations of the system storage pool 416 and read operations of the virtual storage pool 602-1 may be minimized. The ARCs and L2ARC devices of the two pools could be local implementations in some embodiments. And the latencies at the ARCs and L2ARC devices of the two pools may be equivalent or substantially equivalent. For example, typical latencies for read operations of the ARCs may be 0.01 ms or less, and typical latencies for the L2ARCs may be 0.10 ms or less. Latencies of read operations from the cloud storage objects blocks 414-1 may be higher, but the hybrid cloud storage system 400 may intelligently manage both pools to minimize the higher latencies.

Certain embodiments may provide for low-latency, direct cloud access with file system semantics. Certain embodiments may facilitate running from cloud storage while preserving application semantics. Certain embodiments may enable local storage read performance while retaining replicated copies of all data in the cloud. In order to provide those features, certain embodiments may utilize on premise caching devices and leverage the hybrid storage pool caching algorithms. By providing cloud storage with effective caching and file system semantics, cloud storage may be employed for more than backup and restore. The hybrid storage system may use cloud storage "live." Stated otherwise, through the intelligent use of on premise caching devices, the benefit of full performance may be provided to the local system without having to keep full or multiple copies locally.

Figure 12:
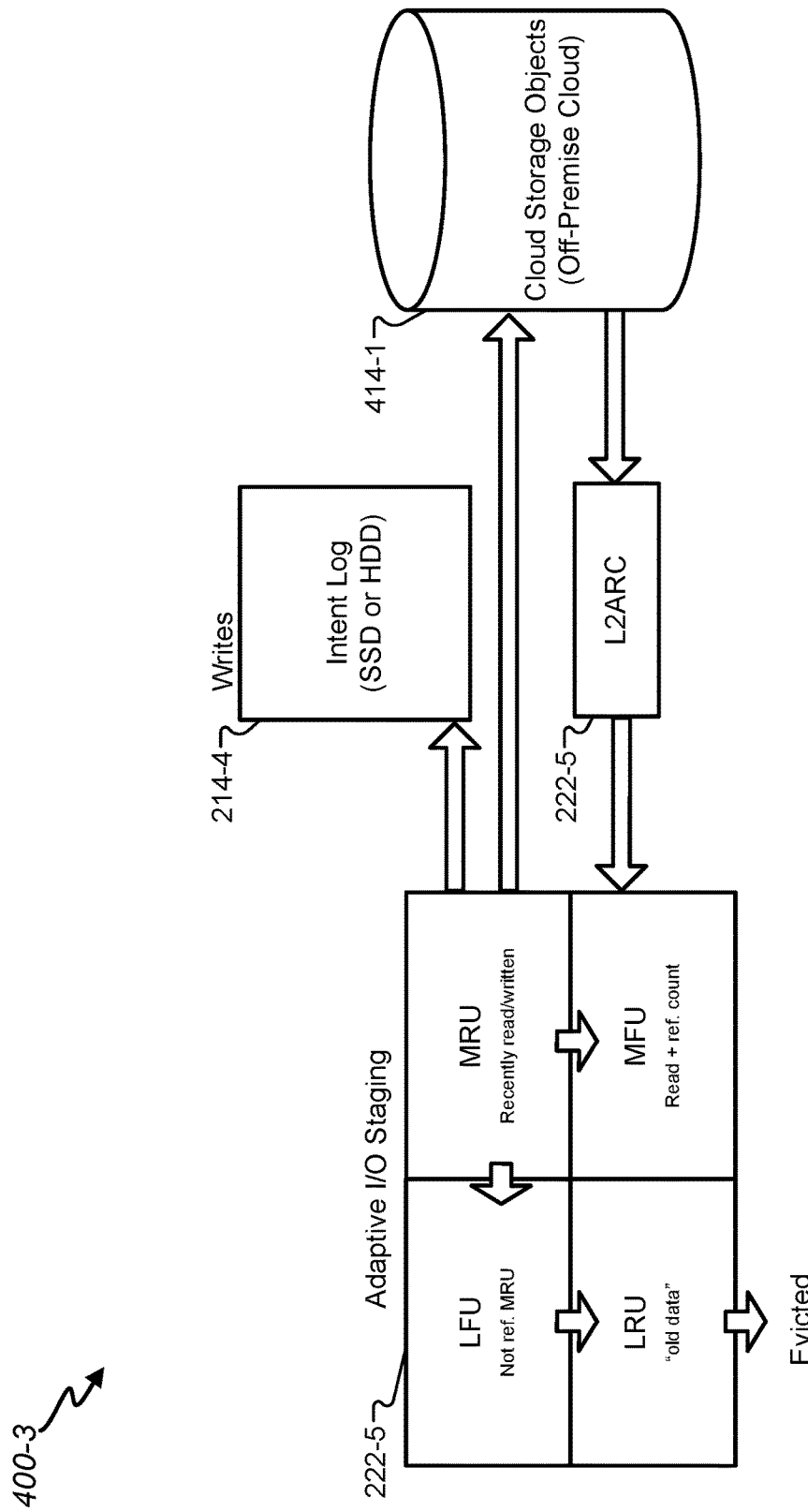
FIG. 12 is a diagram of a simplified example further illustrating features of a hybrid cloud storage system, in accordance with certain embodiments of the present disclosure.

FIG. 12 is a diagram of a simplified example further illustrating features of a hybrid cloud storage system 400-2, in accordance with certain embodiments of the present disclosure. With effective caching devices and algorithms, the hybrid cloud storage system 400-2 may cache at the block level and not at the file level, so accesses to large objects (e.g., a large database) do not require caching of the entire object. In various embodiments, the example depicted may correspond to one or a combination of the virtual storage pool 602-1 and the system storage pool 416.

The hybrid cloud storage system 400-2 may employ adaptive I/O staging to capture most of the objects needed for system operations. The hybrid cloud storage system 400-2 may configure a plurality of cache devices to provide adaptive I/O staging. In the example depicted, adaptive I/O staging is implemented with an ARC 222-5. Yet, in various embodiments, the hybrid cloud storage system 400-2 may be configured to use a plurality of ARCs 222 and/or L2ARCs 222 to provide adaptive I/O staging. While the following description uses an ARC 222 as an example, it should be understood that various embodiments may use a plurality of ARCs 222, as well as one or more L2ARCs 222, to provide the disclosed features.

In some embodiments, the ARC 222-5 may be self-tuning such that the ARC 222-5 may adjust based on the I/O workload. By way of example, in embodiments where the hybrid cloud storage system 400-2 uses cloud storage in a live mode, not merely for back-up and migration, the ARC 222-5 may provide caching algorithms that stage objects according to a precedence order. That precedence order for caching may correspond to most recently used (MRU) objects, most frequently used (MFU) objects, least frequently used (LFU) objects, and least recently used (LRU) objects. With each I/O operation, the ARC 222-5 may determine whether self-adjustment of staged data objects is necessary. Note that, in certain embodiments, the L2ARC 225-5 may work in conjunction with ARC 222-5 to facilitate one or more of the stages. By way of example, the L2ARC 225-5, which may have a higher latency than the ARC 222-5, may be used for one or more of the lower ranked stages, such as the LRU and/or LFU stages. In some embodiments, another component of the hybrid cloud storage system 400-2 may cause the caching in accordance with these embodiments. By way of example, the cloud storage appliance 402 may coordinate the caching and servicing of read and write requests. Further, the cloud storage appliance 402 may include the ARC(s) 222-5, L2ARC(s) 222-5, and/or intent log 214-4 according to some embodiments.

With each I/O operation, the ARC 222-5 may adjust the staging of one or more objects previously staged to some extent. At a minimum, the adjustment may include updating tracking of accesses of at least one object. The adjustment may include demotion to a lower stage, eviction, or promotion to a higher stage. The transition criteria for promotion and demotion may be different for each transition from a current stage to another stage or to eviction. As disclosed herein, the ARC 222-5 may have the ability to evict memory buffers from the cache as a result of memory pressure to maintain a high throughput and/or to meet usage thresholds.

With a given I/O operation, if the one or more objects corresponding to the I/O operation had not already been staged as MRU objects, then the one or more objects may be newly staged as MRU objects. Yet, if the one or more objects corresponding to the I/O operation are already be staged as MRU objects, the ARC 222-5 may apply transition criteria to the one or more objects to determine whether to transition the one or more objects to a different stage. If the transition criteria is not met, no change in staging is necessary with the servicing of the I/O operation.

Figure 13:
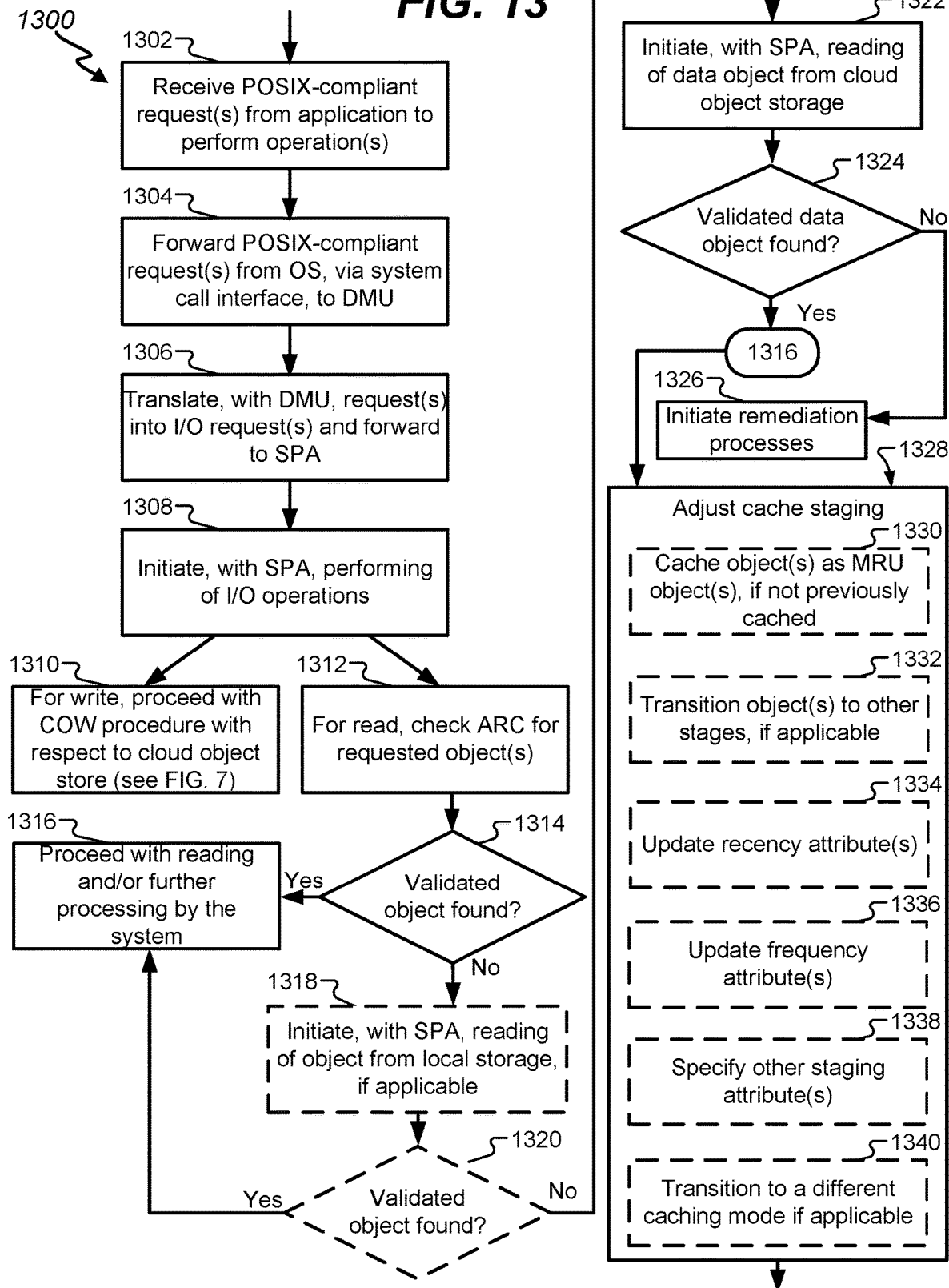
FIG. 13 is a block diagram that illustrates an example method directed to certain features of the hybrid cloud storage system for cache management and cloud latency masking, in accordance with certain embodiments of the present disclosure.

FIG. 13 is a block diagram that illustrates an example method 1300 directed to certain features of the hybrid cloud storage system 400-3 for cache management and cloud latency masking, in accordance with certain embodiments of the present disclosure. According to certain embodiments, the method 1300 may begin as indicated by block 1302. However, as clarified above, certain steps of methods disclosed herein may be shuffled, combined, and/or performed simultaneously or substantially simultaneously in any suitable manner and may depend on the implementation chosen.

As indicated by block 1302, POSIX-compliant request(s) to perform particular operation(s) (i.e., a transaction(s)) may be received from the application 202. Such an operation may correspond to reading, writing, and/or modifying data. As indicated by block 1304, the POSIX-compliant request(s) may be forwarded from the operating system, via the system call interface 208, to the DMU 218. As indicated by block 1306, the DMU 218 may translate requests to perform operations on objects directly to requests to perform I/O operations directed to a physical location within the cloud object store 404. The DMU 218 may forward the I/O requests to the SPA.

As indicated by block 1308, the SPA may receive the I/O requests from the DMU 218. And, responsive to the requests, the SPA may initiate performing I/O operations. As indicated by block 1310, in the case of write operations, the SPA may initiate writing of objects to the cloud object store 404 using a COW procedure. For example, the cloud interface appliance 402 may proceed with the COW procedure disclosed above (e.g., in view of FIG. 7) with respect to the cloud object store 404. As indicated by block 1312, in the case of read operations, the SPA may initiate reading of objects. The ARC 222-5 may be checked for the one or more requested objects. In some embodiments, as indicated by block 1314, it may be determined whether one or more validated data objects corresponding to the I/O request(s) exist in the ARC 222-5. This may include the SPA first determining if one or more objects corresponding to the read request(s) is retrievable from the ARC 222-5. Then, if such one or more objects are retrievable, the object(s) may be checked with one or more checksums from one or more parent nodes in the logical tree. In various embodiments, the checking may be performed by the ARC 222-5, the cloud storage appliance 402, and/or the I/O pipeline 224. As indicated by block 1316, in the case of the data object(s) being validated (or, in some embodiments not employing validation, in the simple case of a hit), the reading and/or further processing operations of the system 400 may proceed.

In some embodiments, as indicated by block 1318, in the case of the data object(s) not being validated (or, in some embodiments not employing validation, in the simple case of no hit), the SPA may initiate reading of one or more objects from the local storage 228. With some embodiments, a pointer to the one or more objects may be cached and used to read the one or more objects from the local storage 228. Some implementations may not check local storage 228 for the one or more objects if such a pointer is not cached. If the one or more objects are retrievable, the one or more objects may be checked with one or more checksums from one or more parent nodes in the logical tree. Again, in various embodiments, the checking may be performed by the ARC 222-5, the cloud storage appliance 402, and/or the I/O pipeline 224. As indicate by block 1320, in the case of the object(s) being validated, the process flow may transition to block 1316, and the reading and/or further processing operations of the system 400 may proceed.

As indicated by block 1320, in the case of the data object(s) not being validated (or, in some embodiments not employing validation, in the simple case of no hit), the process flow may transition to block 1322. As indicated by block 1322, the SPA may initiate reading of the one or more data objects from the cloud object store 404. In various embodiments, the imitating of the reading may be performed by one or a combination of the DMU 218, the ARC 222-5, the I/O pipeline 224, and/or the cloud interface appliance 402. The reading of the one or more objects from the cloud object store 404 may include steps previously disclosed herein, for example, with regard to FIG. 9. Such steps may include one or a combination of issuing I/O request(s) to the cloud interface appliance 402, sending corresponding cloud interface request(s) to the cloud object store 404 using the mapping 406 of cloud storage objects 414, receiving data object(s) responsive to the object interface requests, and the like, which are detailed above. As indicated by block 1324, it may be determined whether a validated object has been retrieved from the cloud object store 404. Again, this may involve steps previously disclosed herein, for example, with regard to FIG. 9, where it is determined whether to validate the data object(s) by the checksum(s) from parent node(s) in the logical tree.

In the case of mismatch of actual and expected checksums of the data object(s), the process flow may transition to block 1326, where remediation processes may be initiated. This may involve steps previously disclosed herein, for example, with regard to FIG. 9, where remediation processes are disclosed. However, in the case of the data being validated, the process flow may transition to block 1316, and the reading and/or further processing operations of the system 400 may proceed.

As indicated by block 1328, having retrieved the one or more objects, the cache staging may be adjusted. In certain instances, the adjustment of cache staging may include newly caching one or more objects as MRU objects, as indicated by block 1330. If the one or more objects corresponding to a given I/O operation had not already been staged as MRU objects, then the one or more objects may be newly staged as MRU objects.

Yet, in certain instances, when the one or more objects corresponding to the I/O operation are already be staged as MRU, MFU, LFU, or LRU objects, the ARC 222-5 may apply transition criteria to the one or more objects to determine whether to transition the one or more objects to a different stage, as indicated by block 1332. However, if the transition criteria is not met, a change in staging may not be necessary with the servicing of the I/O operation.

In some embodiments, the staging of objects may be at least partially a function of recency of access of the objects.

As indicated by block 1334, in some embodiments, the adjustment of cache staging may include updating one or more recency attributes. The ARC 222-5 may define a recency attribute for the one or more new objects in order to track recency of access of the one or more objects. The recency attribute may correspond to a time parameter that indicates a last access time corresponding to one or more objects (e.g., by absolute time, system time, time differential, etc.) and/or a sequential parameter that indicates an access count corresponding to the one or more objects against which recency attributes of other objects may be compared.

In various embodiments, the transition criteria may include one or more recency thresholds defined in order for objects to qualify for transition from current stages. For example, the ARC 222-5 may determine if the one or more objects should be transitioned to LFU or LRU stages (or eviction) based at least in part on the value of the recency attribute assigned to the one or more objects. In some embodiments, the recency threshold may be a dynamic threshold, adjusted as a function of recency attributes defined for other objects in one or more stages. For example, the recency threshold may be a function of a lowest value of any recency attribute defined for any objects already staged as MFU objects, when the values of recency attributes defined for the staged objects are sorted in an ascending or descending order.

Additionally or alternatively, in some embodiments, the staging of objects may be at least partially a function of frequency of access of the objects. As indicated by block 1336, in some embodiments, the adjustment of cache staging may include updating one or more frequency attributes. With the particular I/O operation, the ARC 222-5 may increment a frequency attribute defined for the one or more objects in order to track the frequency of access of the one or more objects. The frequency attribute may indicate numbers of accesses over any suitable time period, which could be an absolute time period, an activity-based time period (e.g., a user session, or time since a last amount of access activity that meets a minimum activity threshold), and/or the like.

In various embodiments, the transition criteria may include one or more frequency thresholds defined in order for objects to qualify for transition from current stages. For example, consequent to a change in the value of the frequency attribute, the ARC 222-5 may determine if the one or more objects should be staged as MFU objects (or as objects in another stage). Such a determination may be made based at least in part on comparing the updated frequency attribute to a frequency threshold. In some embodiments, the frequency threshold may be a dynamic threshold, adjusted as a function of frequency attributes defined for other staged objects (e.g., staged as MFU objects or objects in another stage). For example, the frequency threshold may be a function of a lowest value of any frequency attribute defined for any objects already staged as MFU objects, when the values of frequency attributes defined for the staged objects are sorted in an ascending or descending order.

As indicated by block 1338, additionally or alternatively, the adjustment of cache staging may include specifying one or more other staging attributes, according to some embodiments. A staging attribute could indicate an operation type. With some embodiments, the staging of objects may be at least partially a function of operation type. For example, the staging algorithm could employ discrimination of write operations versus read operations so that only objects accessed with a read operation may be staged as MFU objects. In such embodiments, objects referenced with write operations may be initially maintained as MRU objects and be thereafter subject to demotion according to LFU staging criteria. Alternatively, in such embodiments, objects referenced with write operations may be initially maintained as MRU objects and be thereafter subject to demotion according to LRU staging criteria and then be subject to eviction, effectively skipping LFU staging. As another alternative, objects referenced with write operations may be initially maintained as MRU objects and be thereafter subject to eviction, effectively skipping LFU staging and LRU staging. With such alternatives, the ARC 222-5 discriminates write operations to commit cloud objects to the cloud object store 404 as being less likely needed for subsequent read operations, hence allowing such potential operations to incur cloud access latencies should the operations arise.

A staging attribute could indicate a data type. Additionally or alternatively, in some embodiments, the staging of objects may be at least partially a function of data type. For example, some embodiments may accord a higher priority to metadata vis-à-vis data. That higher priority may include retaining all metadata objects, and subjecting data objects to staging. Alternatively, that higher priority may include applying different criteria for staging transition (promotion and/or demotion from current stages) to metadata objects versus data objects. For example, thresholds (e.g., recency, frequency, and/or the like thresholds) defined for data objects to qualify for demotion may be lower (and, hence, more easily satisfied) than thresholds defined for metadata objects to qualify for demotion. Alternatively, other embodiments may accord a higher priority to data vis-à-vis metadata. With some embodiments, a portion of the cloud objects may be defined as always to cached regardless of frequency of use.

A staging attribute could indicate an operation characteristic. Additionally or alternatively, in some embodiments, the staging of objects may be at least partially a function of read operation characteristics. For example, some embodiments may accord a higher priority to read operations having a size characteristic such that the size of objects read satisfies a size threshold. Additionally or alternatively, a higher priority may be accorded to read operations having a sequential characteristic such that the sequence of objects read satisfies a sequence threshold. Accordingly, a large, sequential streaming read operation may be given a higher priority for caching than smaller, more isolated read operations. In that way, higher cloud-access latencies for the large, sequential streaming read operations are avoided.

Certain embodiments of the ARC 222-5 may employ different functions, transition criteria, and/or thresholds for each stage. In some embodiments, the ARC 222-5 may employ a staging scoring system. Some embodiments may score objects with a numerical expression, for example, a staging score. The staging scores may reflect qualifications of the objects with respect to any suitable criteria, such as the transition criteria. For example, a given staging score for an object may be cumulative of scoring according to criteria such as frequency of access, recency of access, operation type, data type, operation characteristics, object size, and/or the like. The given object could be scored with respect to each criterion. For example, relatively greater values of attributes such as frequency attributes, recency attributes, and/or like may be accorded greater scores. Likewise, scores may be assigned in view of the other criteria and priorities. The cumulative staging score for the object may be used, along with the staging scores of other objects stored in the cache, to rank the objects according to a precedence order. Again, the precedence order may be used to transition the objects to different stages and/or toward eviction.

The ARC 222-5 may adapt the stages and the objects stored therein to satisfy one or more cache usage and capacity constraints. For example, given a cache device capacity of, say, 1 TB of DRAM, the ARC 222-5 may adapt the stages and the objects stored therein to maintain a maximum cache usage of 80%. In addition, some embodiments may adapt the stages and the objects stored therein to satisfy one or more speed constraints. For example, the ARC 222-5 may monitor throughput to maintain an acceptable amount of access latencies (e.g., average access latencies) given both local accesses and cloud accesses in order to determine whether more or less caching should be employed to satisfy one or more latency tolerances. In view of such adaption constraints, adaption of the stages and the objects stored therein may include apply the different functions and thresholds for each stage in order to sort the objects in a precedence order. The precedence order may be utilized by the ARC 222-5 to shift stored objects toward eviction in order to meet the adaption constraints.

As indicated by block 1340, in some embodiments, the cache staging adjustment may include transitioning to a different caching mode. Some embodiments may dynamically change modes of operation in order to load balance while meeting usage and latency constraints. An initial or default mode of operation may correspond to operating from the cloud in a live manner such that objects are accessed from cache first, then, if necessary, from the cloud. Some embodiments of the ARC 222-5 may initially (e.g., within a session or time period) cache all objects that are accessed with I/O operations, and then transition to employing staging as cache usage meets one or more thresholds. The transition to staging may be incremental with one or more secondary modes of operation. For example, staging may be initially relegated to MRU and MFU staging, and then expanded to one or more of the other stages as one or more cache usage thresholds (which may be preliminary to, and lower than, the maximum cache usage threshold) are met.

In view of cache usage approaching usage constraints and meeting one or more usage thresholds, certain transition criteria may be applied incrementally with one or more additional modes of operation. For example, objects corresponding to write operations may not be initially discriminated against. Yet, as the cache usage approaches a usage constraint, that discrimination criteria may be applied after one or more usage thresholds are met.

As another example, as the cache usage further approaching a usage constraint and meeting one or more usage thresholds, the hybrid cloud storage system 400-2 may begin to make use of extended cache with one or more L2ARC devices (which may correspond to one or more low-latency Sides) for lower ranked stages (e.g., LRU and/or LFU stages). As still another example, as the cache usage further approaching a usage constraint and meeting one or more usage thresholds, the hybrid cloud storage system 400-2 may begin to make use of local storage 228 in order to conform to latency tolerances with one or more tertiary modes of operation. By way of a more specific example, rather than evicting a large, sequential streaming read operation without provisioning for future low-latency access, the extend of the operation and the frequency of access of the corresponding objects may be sufficient to meet size and frequency thresholds such that the objects are to be transitioned to local storage 228. In this way, the hybrid cloud storage system 400-2 may keep the objects available for local-latency read operations, while freeing up cache capacity for other low-latency access (which could entail other large, sequential read operations) and avoiding paying cloud latencies should the large, sequential read operation be called for again. Such selective utilization of both local storage 228 and cloud storage at the object level may further facilitate masking of cloud latencies while using cache a majority of the time and load balancing between cloud storage and local storage 228 to operate within latency tolerances. In various embodiments, this trifurcated storage adaptation can be initiated as a fallback operational mode or an initial default for certain types of operations have certain characteristics.

Accordingly, certain embodiments may alter caching modes and techniques based at least in part on the characteristics of object access. Certain embodiments may leverage caching features, cloud storage, and local storage 228 to mask latencies for cloud-based operations. In such embodiments, a majority of operations may be serviced from cache with cache hit rates typically exceeding 90% or more, which results in local latencies most of the time. If any local object is missing or corrupt, the cloud copy of the object may be accessed. With some embodiments, reading from the cloud object store 404 may only be necessary when there is no cache hit and the read request cannot be serviced from local storage 228.

In some embodiments, in lieu of the ARC checking, the local storage checking, and/or the cloud object store checking disclosed above, the mapping 406 may be used to identify the location of the one or more objects of interest. As described above, the mapping 406 may include an object directory and may maintain object states that are updated with every I/O operation. Cloud object states may be kept in an index, a table, an index-organized table, and/or the like which may be indexed on a per-object basis. The object states may include object cache states. The object cache states may indicate locations of objects in any one or combination of ARC, L2ARC, adaptive stage, local storage, and/or cloud storage. By utilizing the mapping 406, the cloud interface device 402 may directly identify the location of the one or more objects of interest. In some embodiments, the cloud interface device 402 may only utilize the mapping 406 in the event that there is no hit pursuant to the ARC checking.

In some embodiments, in addition or in alternative to the caching, the intelligent pool management include keeping a mirror that continuously syncs with the cloud object storage 404. At least partially by supporting cloud object data stores as virtual devices, certain embodiments may provide mirroring between local and cloud storage. Mirroring cloud storage with local storage may enable local storage read performance while retaining replicated copies of all data in the cloud. Through the use of the mirror, the benefit of full performance may be provided to the local system without having to keep multiple copies locally. If any local data is missing or corrupt, the cloud copy of the data may be accessed. The synchronous mirroring cloud and local devices may facilitate higher levels of performance.

Figure 14:
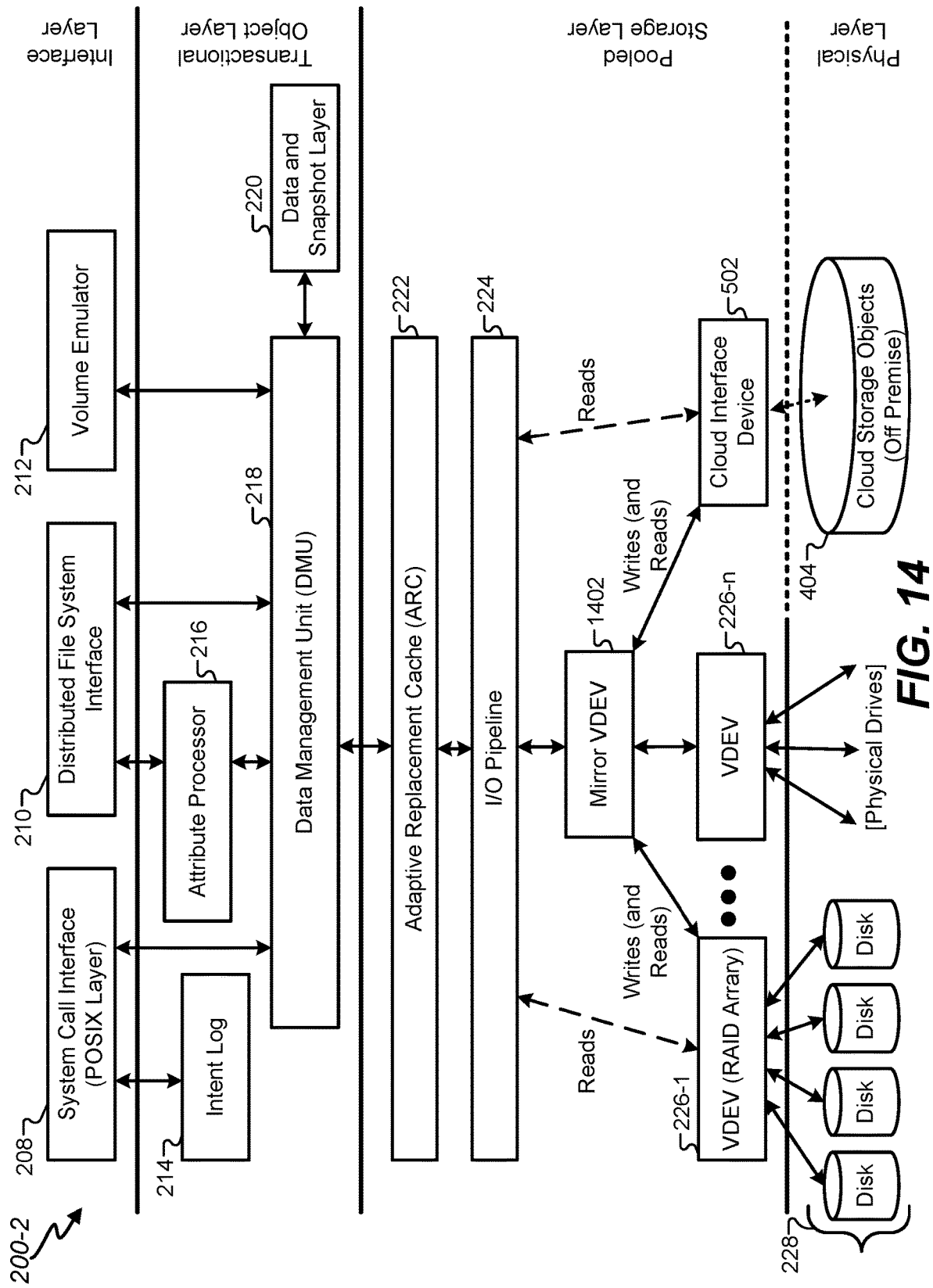
FIG. 14 illustrates an instance of an example network file system of the hybrid cloud storage system to facilitate synchronous mirroring, in accordance with certain embodiments of the present disclosure.

To facilitate such synchronous mirroring, certain embodiments may include a mirror VDEV. FIG. 14 illustrates an instance of an example network file system 200-2 of the hybrid cloud storage system 400 to facilitate synchronous mirroring, in accordance with certain embodiments of the present disclosure. The file system 200-2 may correspond to the file system 200-1, but with mirror management integrated directly into a ZFS control stack. Beyond that which is disclosed with respect to the file system 200-1, the file system 200-2 may include a mirror VDEV 1402 that facilitates cloud copies of data but local access times/speeds to read the data.

In some embodiments, the mirror VDEV 1402 may correspond to one or more VDEVs of another VDEV type of a device driver interface inside a ZFS file system architecture. The ZFS may communicate directly with the mirror VDEV 1402, which may be at a virtual device layer directly above a driver layer of the file system 200-2 and which, in some embodiments, correspond to an abstraction of the device driver interface inside the ZFS architecture. The file system 200-2 may create the mirror VDEV 1402 to be a funnel for I/O operations. In some embodiments, the mirror VDEV 1402 may be a point with which other components of the file system 200-2 may communicate primarily. For example, in some embodiments, communications from the transactional object layer may go through the mirror VDEV 1402 to the physical layer. More specifically, communications from the DMU 218 may be directed to the I/O pipeline 224 and to the mirror VDEV 1402. Responsive to such communications, the mirror VDEV 1402 may direct communications to other VDEVs, such as the VDEV 226 and the cloud interface device 502. As such, the mirror VDEV 1402 may coordinate I/O operations with respect to local storage 228 and cloud object storage 404.

In some embodiments, the mirror VDEV 1402 may only coordinate write operations with respect to local storage 228 and cloud object storage 404 such that read operations need not go through the mirror VDEV 1402. With such embodiments, the other VDEVs, such as the VDEV 226 and the cloud interface device 502, may bypass the mirror VDEV 1402 for read operations. In alternative embodiments, the mirror VDEV 1402 may coordinate all I/O operations.

Advantageously, the mirror VDEV 1402 may coordinate write operations so that each write operation is synchronously performed with respect to local storage 228 via one or more VDEVs 226 and with respect to the cloud object store 404 via the cloud interface device 502. This synchronous mirroring of each I/O operation is performed at the object level, not the file level. The data replications with each I/O operation enables the hybrid cloud storage system 400 to achieve local storage read performance that masks latencies for cloud access. As a default, the hybrid cloud storage system 400 may read from local storage 228 in order to avoid paying cloud latencies for the vast majority of read operations. Only when the hybrid cloud storage system 400 determines that local data is missing or corrupt does the hybrid cloud storage system 400 need to access the cloud object store 404 to read a cloud copy of the desired data. Such exceptions may be performed on an object basis so that the latency for cloud access is minimized.

Figure 15:
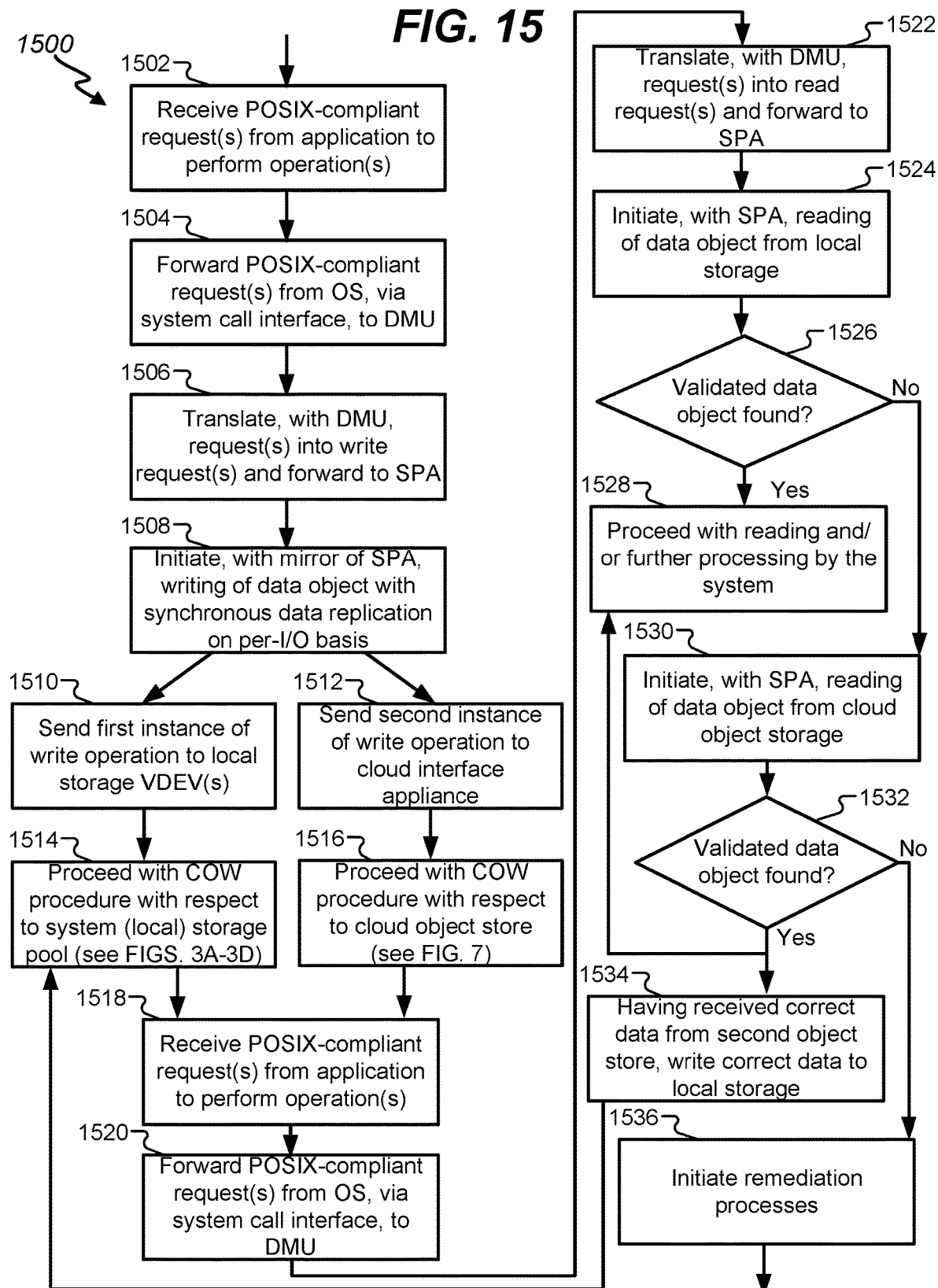
FIG. 15 is a block diagram that illustrates an example method directed to certain features of the hybrid cloud storage system for synchronous mirroring and cloud latency masking, in accordance with certain embodiments of the present disclosure.

FIG. 15 is a block diagram that illustrates an example method 1500 directed to certain features of the hybrid cloud storage system 400 for synchronous mirroring and cloud latency masking, in accordance with certain embodiments of the present disclosure. According to certain embodiments, the method 1500 may begin as indicated by block 1502. However, as clarified above, certain steps of methods disclosed herein may be shuffled, combined, and/or performed simultaneously or substantially simultaneously in any suitable manner and may depend on the implementation chosen.

As indicated by block 1502, POSIX-compliant request(s) to perform particular operation(s) (i.e., a transaction(s)) may be received from the application 202. Such an operation may correspond to writing and/or modifying data. As indicated by block 1504, the POSIX-complaint request(s) may be forwarded from the operating system, via the system call interface 208, to the DMU 218. As indicated by block 1506, the DMU 218 may translate requests to perform operations on data objects directly to requests to perform write operations (i.e., I/O requests) directed to a physical location within the system storage pool 416 and the cloud object store 404. The DMU 218 may forward the I/O requests to the SPA.

The mirror VDEV 1402 of the SPA may receive the I/O requests (e.g., by way of the ARC 222 and the I/O pipeline 224). As indicated by block 1508, the mirror VDEV 1402 may initiate writing of a data object with synchronous replication on a per-I/O operation basis. One part of the mirror VDEV 1402 may point to local storage, and one part of the mirror VDEV 1402 may point to the cloud interface device 502 of the cloud storage appliance 402. As indicated by block 1510, the mirror VDEV 1402 may direct a first instance of the write operation to one or more of the VDEVs 226. In some embodiments, as indicated by block 1514, the COW procedure disclosed above (e.g., in view of FIGS. 3A-3D) may proceed in order to write the data object to the local system storage.

As indicated by block 1512, the mirror VDEV 1402 may direct a second instance of the write operation to the cloud interface device 502 of the cloud storage appliance 402. In some embodiments, as indicated by block 1516, the COW procedure disclosed above may proceed in order to write the data object to the local system storage. For example, the method 1500 may transition to block 712 or another step of the method 700.

With each write operation synchronously performed with respect to local storage 228 and with respect to the cloud object store 404, the hybrid cloud storage system 400 may thereafter intelligently coordinate read operations in order to achieve local storage read performance that masks latencies for cloud access. At any suitable time after consummation of the replicative data storage, the hybrid cloud storage system 400 may coordinate such read operations. Referring again to FIG. 15, as indicated by block 1518, a POSIX-compliant request to perform one or more particular operations (i.e., one or more transactions) may be received from the application 202. Such an operation may correspond to reading or otherwise accessing data. As indicated by block 1520, the POSIX-compliant request may be forwarded from the operating system, via the system call interface 208, to the DMU 218. As indicated by block 1522, the DMU 218 may translate requests to perform operations on data objects directly to requests to perform one or more read operations (i.e., one or more I/O requests) directed to the local storage 228. The SPA may receive the I/O request(s) from the DMU 218. As indicated by block 1524, responsive to the request(s), the SPA may initiate reading of one or more data objects from the local storage 228. In some embodiments, the ARC 222 may be checked first for a cached version of the one or more data objects and, absent a cached version being found, an attempt to read the one or more data objects from the local storage 228 may then be made.

As indicated by block 1526, it may be determined whether one or more validated data objects corresponding to the I/O request(s) exist. This may include the SPA first determining if one or more objects corresponding to the one or more I/O request(s) are retrievable from the local storage 228. Then, if such one or more objects are retrievable, the object(s) may be checked with a checksum(s) from parent node(s) in the logical tree. In various embodiments, the checking may be performed by one or more of the VDEVs 226, the mirror VDEV 1402, and/or the I/O pipeline 224. As indicated by block 1528, in the case of the data object(s) being validated, the reading and/or further processing operations of the system 400 may proceed, as the data has been determined to be not corrupted and not the incorrect version.

However, in the case of the SPA determining that validated data objects corresponding to the I/O request(s) does not exist, process flow may transition to block 1530. Such a determination could correspond to an absence of retrievable data objects corresponding to the one or more I/O request(s), in which case an error condition may be identified. Similarly, such a determination could correspond to mismatch of actual and expected checksums of the data object(s) corresponding to the one or more I/O request(s), in which case an error condition may also be identified. In either case, the SPA may initiate reading of the one or more data objects from the cloud object store 404, as indicated by block 1530. In various embodiments, the initiating of the reading may be performed by one or a combination of the DMU 218, the mirror VDEV 1402, the I/O pipeline 224, and/or the cloud interface appliance 402.

The reading of the one or more data objects from the cloud object store 404 may include steps previously disclosed herein, for example, with regard to FIG. 9. Such steps may include one or a combination of issuing I/O request(s) to the cloud interface appliance 402, sending corresponding cloud interface request(s) to the cloud object store 404 using the mapping 406 of cloud storage objects 414, receiving data object(s) responsive to the object interface requests, and the like, which are detailed above. As indicated by block 1532, it may be determined whether a validated data object has been retrieved from the cloud object store 404. Again, this may involve steps previously disclosed herein, for example, with regard to FIG. 9, where it is determined whether to validate the data object(s) by the checksum(s) from parent node(s) in the logical tree.

In the case of the data being validated, the process flow may transition to block 1528, and the reading and/or further processing operations of the system 400 may proceed. Further, as indicated by block 1534, the correct data may be written to the local system storage. In various embodiments, the correction process may be performed by one or a combination of the DMU 218, the mirror VDEV 1402, the I/O pipeline 224, and/or the cloud interface appliance 402. In some embodiments, the process flow may transition to block 1514, where a COW procedure may proceed in order to write the correct data to the local system storage.

However, in the case of mismatch of actual and expected checksums of the data object(s), the process flow may transition to block 1536, where remediation processes may be initiated. This may involve steps previously disclosed herein, for example, with regard to FIG. 9, where remediation processes are disclosed. For example, the remediation processes may include reissuing one or more cloud interface requests, requesting the correct version of the data from another cloud object store, and/or the like.

Advantageously, when an amount of data maintained by the hybrid cloud storage system 400 exceeds a certain amount, it may become more cost-benefit optimal to transition from a mirroring mode disclosed above to a caching mode in accordance with embodiments disclosed with respect to FIGS. 12 and 13. Certain embodiments may make that transition automatically. The hybrid cloud storage system 400 may begin with mirroring techniques, proceeding until one or more thresholds are reached. Such thresholds could be defined in terms of storage usage. For example, when the usage of local storage capacity reaches a threshold percentage (or absolute value, relative value, etc.), the hybrid cloud storage system 400 may transition to adaptive I/O staging. In that way, the hybrid cloud storage system 400 may balance the load imparted on the local storage by shifting operational modes. Then, the hybrid cloud storage system 400 may the most relevant X amount of data (e.g., 10 TB, and/or the like) and shunt the rest of the data to the cloud storage. This load balancing may allow for fewer storage devices, while accommodating increasing amounts of data storage.

Figure 16:
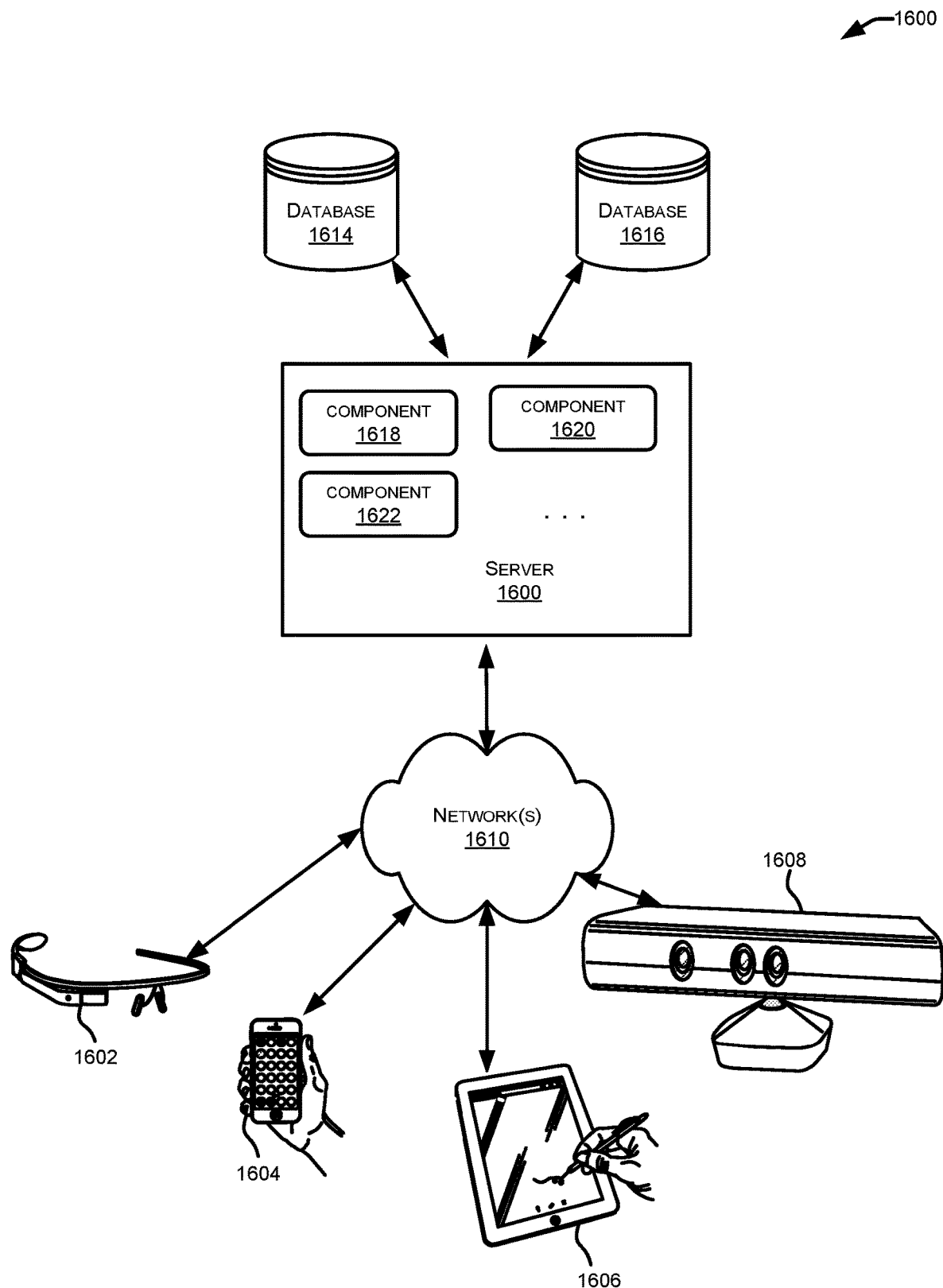
FIG. 16 depicts a simplified diagram of a distributed system for implementing certain embodiments in accordance with present disclosure.

FIG. 16 depicts a simplified diagram of a distributed system 1600 for implementing certain embodiments in accordance with present disclosure. In the illustrated embodiment, distributed system 1600 includes one or more client computing devices 1602, 1604, 1606, and 1608, which are configured to execute and operate a client application such as a web browser, proprietary client (e.g., Oracle Forms), or the like over one or more network(s) 1610. Server 1612 may be communicatively coupled with remote client computing devices 1602, 1604, 1606, and 1608 via network 1610.

In various embodiments, server 1612 may be adapted to run one or more services or software applications provided by one or more of the components of the system. In some embodiments, these services may be offered as web-based or cloud services or under a Software as a Service (SaaS) model to the users of client computing devices 1602, 1604, 1606, and/or 1608. Users operating client computing devices 1602, 1604, 1606, and/or 1608 may in turn utilize one or more client applications to interact with server 1612 to utilize the services provided by these components.

In the configuration depicted in the figure, the software components 1618, 1620 and 1622 of system 1600 are shown as being implemented on server 1612. In other embodiments, one or more of the components of system 1600 and/or the services provided by these components may also be implemented by one or more of the client computing devices 1602, 1604, 1606, and/or 1608. Users operating the client computing devices may then utilize one or more client applications to use the services provided by these components. These components may be implemented in hardware, firmware, software, or combinations thereof. It should be appreciated that various different system configurations are possible, which may be different from distributed system 1600. The embodiment shown in the figure is thus one example of a distributed system for implementing an embodiment system and is not intended to be limiting.

Client computing devices 1602, 1604, 1606, and/or 1608 may be portable handheld devices (e.g., an iPhone®, cellular telephone, an iPad®, computing tablet, a personal digital assistant (PDA)) or wearable devices (e.g., a Google Glass® head-mounted display), running software such as Microsoft Windows Mobile®, and/or a variety of mobile operating systems such as iOS, Windows Phone, Android, BlackBerry, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1602, 1604, 1606, and 1608 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1610.

Although exemplary distributed system 1600 is shown with four client computing devices, any number of client computing devices may be supported. Other devices, such as devices with sensors, etc., may interact with server 1612.

Network(s) 1610 in distributed system 1600 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1610 can be a local area network (LAN), such as one based on Ethernet, Token-Ring and/or the like. Network(s) 1610 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1612 may be adapted to run one or more services or software applications described in the foregoing disclosure. For example, server 1612 may correspond to a server for performing processing described above according to an embodiment of the present disclosure.

Server 1612 may run an operating system including any of those discussed above, as well as any commercially available server operating system. Server 1612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1612 may include one or more applications to analyze and consolidate data feeds and/or event updates received from users of client computing devices 1602, 1604, 1606, and 1608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1612 may also include one or more applications to display the data feeds and/or real-time events via one or more display devices of client computing devices 1602, 1604, 1606, and 1608.

Distributed system 1600 may also include one or more databases 1614 and 1616. Databases 1614 and 1616 may reside in a variety of locations. By way of example, one or more of databases 1614 and 1616 may reside on a non-transitory storage medium local to (and/or resident in) server 1612. Alternatively, databases 1614 and 1616 may be remote from server 1612 and in communication with server 1612 via a network-based or dedicated connection. In one set of embodiments, databases 1614 and 1616 may reside in a storage-area network (SAN). Similarly, any necessary files for performing the functions attributed to server 1612 may be stored locally on server 1612 and/or remotely, as appropriate. In one set of embodiments, databases 1614 and 1616 may include relational databases, such as databases provided by Oracle, that are adapted to store, update, and retrieve data in response to SQL-formatted commands.

Figure 17:
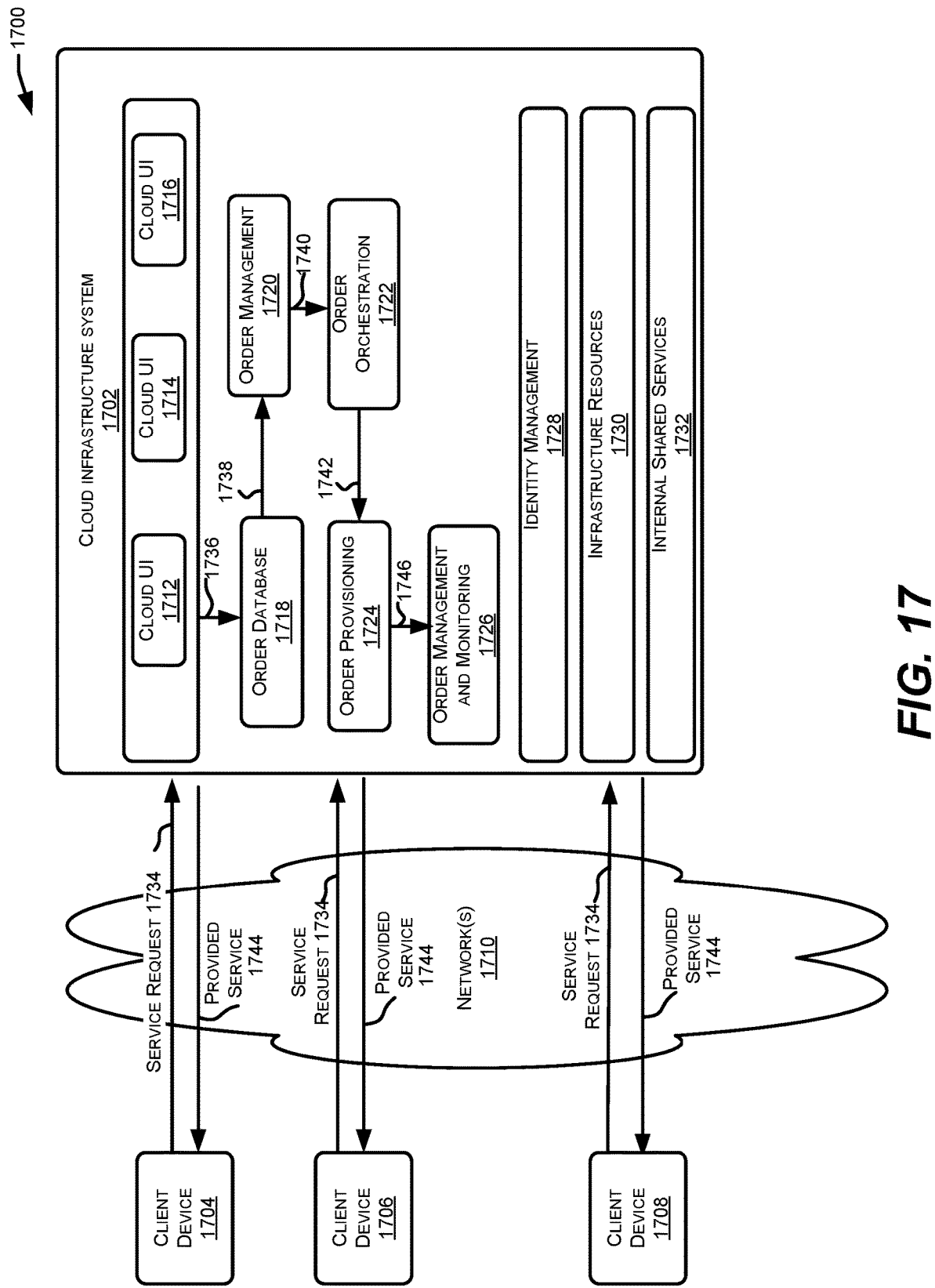
FIG. 17 is a simplified block diagram of one or more components of a system environment by which services provided by one or more components of a system may be offered as cloud services, in accordance with certain embodiments of the present disclosure.

FIG. 17 is a simplified block diagram of one or more components of a system environment 1700 by which services provided by one or more components of a system may be offered as cloud services, in accordance with certain embodiments of the present disclosure. In the illustrated embodiment, system environment 1700 includes one or more client computing devices 1704, 1706, and 1708 that may be used by users to interact with a cloud infrastructure system 1702 that provides cloud services. The client computing devices may be configured to operate a client application such as a web browser, a proprietary client application (e.g., Oracle Forms), or some other application, which may be used by a user of the client computing device to interact with cloud infrastructure system 1702 to use services provided by cloud infrastructure system 1702.

It should be appreciated that cloud infrastructure system 1702 depicted in the figure may have other components than those depicted. Further, the embodiment shown in the figure is only one example of a cloud infrastructure system that may incorporate an embodiment of the invention. In some other embodiments, cloud infrastructure system 1702 may have more or fewer components than shown in the figure, may combine two or more components, or may have a different configuration or arrangement of components.

Client computing devices 1704, 1706, and 1708 may be devices similar to those described above for 1602, 1604, 1606, and 1608. Although exemplary system environment 1700 is shown with three client computing devices, any number of client computing devices may be supported. Other devices such as devices with sensors, etc. may interact with cloud infrastructure system 1702.

Network(s) 1710 may facilitate communications and exchange of data between clients 1704, 1706, and 1708 and cloud infrastructure system 1702. Each network may be any type of network familiar to those skilled in the art that can support data communications using any of a variety of commercially-available protocols, including those described above for network(s) 1610. Cloud infrastructure system 1702 may comprise one or more computers and/or servers that may include those described above for server 1612.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1702 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1702 may be adapted to automatically provision, manage and track a customer's subscription to services offered by cloud infrastructure system 1702. Cloud infrastructure system 1702 may provide the cloud services via different deployment models. For example, services may be provided under a public cloud model in which cloud infrastructure system 1702 is owned by an organization selling cloud services (e.g., owned by Oracle) and the services are made available to the general public or different industry enterprises. As another example, services may be provided under a private cloud model in which cloud infrastructure system 1702 is operated solely for a single organization and may provide services for one or more entities within the organization. The cloud services may also be provided under a community cloud model in which cloud infrastructure system 1702 and the services provided by cloud infrastructure system 1702 are shared by several organizations in a related community. The cloud services may also be provided under a hybrid cloud model, which is a combination of two or more different models.

In some embodiments, the services provided by cloud infrastructure system 1702 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1702. Cloud infrastructure system 1702 then performs processing to provide the services in the customer's subscription order.

In some embodiments, the services provided by cloud infrastructure system 1702 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1702 may also include infrastructure resources 1730 for providing the resources used to provide various services to customers of the cloud infrastructure system. In one embodiment, infrastructure resources 1730 may include pre-integrated and optimized combinations of hardware, such as servers, storage, and networking resources to execute the services provided by the PaaS platform and the SaaS platform. In some embodiments, resources in cloud infrastructure system 1702 may be shared by multiple users and dynamically re-allocated per demand. Additionally, resources may be allocated to users in different time zones. For example, cloud infrastructure system 1730 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1732 may be provided that are shared by different components or modules of cloud infrastructure system 1702 and by the services provided by cloud infrastructure system 1702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like. In certain embodiments, cloud infrastructure system 1702 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1702, and the like.

In certain embodiments, as depicted in the figure, cloud management functionality may be provided by one or more modules, such as an order management module 1720, an order orchestration module 1722, an order provisioning module 1724, an order management and monitoring module 1726, and an identity management module 1728. These modules may include or be provided using one or more computers and/or servers, which may be general purpose computers, specialized server computers, server farms, server clusters, or any other appropriate arrangement and/or combination.

In exemplary operation 1734, a customer using a client device, such as client device 1704, 1706 or 1708, may interact with cloud infrastructure system 1702 by requesting one or more services provided by cloud infrastructure system 1702 and placing an order for a subscription for one or more services offered by cloud infrastructure system 1702. In certain embodiments, the customer may access a cloud User Interface (UI), cloud UI 1712, cloud UI 1714 and/or cloud UI 1716 and place a subscription order via these UIs. The order information received by cloud infrastructure system 1702 in response to the customer placing an order may include information identifying the customer and one or more services offered by the cloud infrastructure system 1702 that the customer intends to subscribe to.

After an order has been placed by the customer, the order information is received via the cloud UIs, 1712, 1714 and/or 1716. At operation 1736, the order is stored in order database 1718. Order database 1718 can be one of several databases operated by cloud infrastructure system 1718 and operated in conjunction with other system elements. At operation 1738, the order information is forwarded to an order management module 1720. In some instances, order management module 1720 may be configured to perform billing and accounting functions related to the order, such as verifying the order, and upon verification, booking the order.

At operation 1740, information regarding the order is communicated to an order orchestration module 1722. Order orchestration module 1722 may utilize the order information to orchestrate the provisioning of services and resources for the order placed by the customer. In some instances, order orchestration module 1722 may orchestrate the provisioning of resources to support the subscribed services using the services of order provisioning module 1724.

In certain embodiments, order orchestration module 1722 enables the management of business processes associated with each order and applies business logic to determine whether an order should proceed to provisioning. At operation 1742, upon receiving an order for a new subscription, order orchestration module 1722 sends a request to order provisioning module 1724 to allocate resources and configure those resources needed to fulfill the subscription order. Order provisioning module 1724 enables the allocation of resources for the services ordered by the customer. Order provisioning module 1724 provides a level of abstraction between the cloud services provided by cloud infrastructure system 1700 and the physical implementation layer that is used to provision the resources for providing the requested services. Order orchestration module 1722 may thus be isolated from implementation details, such as whether or not services and resources are actually provisioned on the fly or pre-provisioned and only allocated/assigned upon request.

At operation 1744, once the services and resources are provisioned, a notification of the provided service may be sent to customers on client devices 1704, 1706, and/or 1708 by order provisioning module 1724 of cloud infrastructure system 1702. At operation 1746, the customer's subscription order may be managed and tracked by an order management and monitoring module 1726. In some instances, order management and monitoring module 1726 may be configured to collect usage statistics for the services in the subscription order, such as the amount of storage used, the amount data transferred, the number of users, and the amount of system up time and system down time.

In certain embodiments, cloud infrastructure system 1700 may include an identity management module 1728. Identity management module 1728 may be configured to provide identity services, such as access management and authorization services in cloud infrastructure system 1700. In some embodiments, identity management module 1728 may control information about customers who wish to utilize the services provided by cloud infrastructure system 1702. Such information can include information that authenticates the identities of such customers and information that describes which actions those customers are authorized to perform relative to various system resources (e.g., files, directories, applications, communication ports, memory segments, etc.). Identity management module 1728 may also include the management of descriptive information about each customer and about how and by whom that descriptive information can be accessed and modified.

Figure 18:
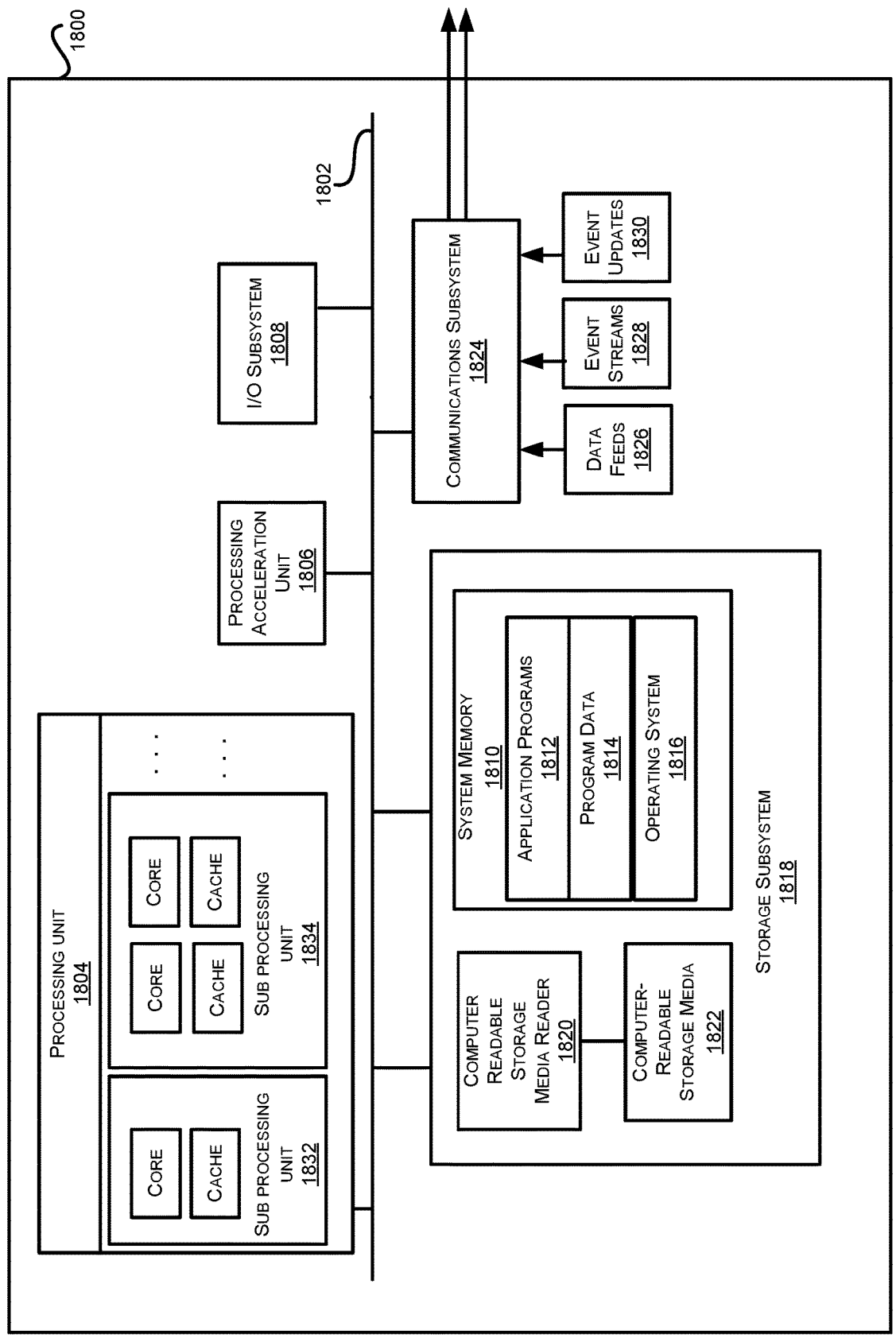
FIG. 18 illustrates an exemplary computer system, in which various embodiments of the present invention may be implemented.

FIG. 18 illustrates an exemplary computer system 1800, in which various embodiments of the present invention may be implemented. The system 1800 may be used to implement any of the computer systems described herein. As shown in the figure, computer system 1800 includes a processing unit 1804 that communicates with a number of peripheral subsystems via a bus subsystem 1802. These peripheral subsystems may include a processing acceleration unit 1806, an I/O subsystem 1808, a storage subsystem 1818 and a communications subsystem 1824. Storage subsystem 1818 includes tangible computer-readable storage media 1822 and a system memory 1810.

Bus subsystem 1802 provides a mechanism for letting the various components and subsystems of computer system 1800 communicate with each other as intended. Although bus subsystem 1802 is shown schematically as a single bus, alternative embodiments of the bus subsystem may utilize multiple buses. Bus subsystem 1802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1804, which can be implemented as one or more integrated circuits (e.g., a conventional microprocessor or microcontroller), controls the operation of computer system 1800. One or more processors may be included in processing unit 1804. These processors may include single core or multicore processors. In certain embodiments, processing unit 1804 may be implemented as one or more independent processing units 1832 and/or 1834 with single or multicore processors included in each processing unit. In other embodiments, processing unit 1804 may also be implemented as a quad-core processing unit formed by integrating two dual-core processors into a single chip.

In various embodiments, processing unit 1804 can execute a variety of programs in response to program code and can maintain multiple concurrently executing programs or processes. At any given time, some or all of the program code to be executed can be resident in processor(s) 1804 and/or in storage subsystem 1818. Through suitable programming, processor(s) 1804 can provide various functionalities described above. Computer system 1800 may additionally include a processing acceleration unit 1806, which can include a digital signal processor (DSP), a special-purpose processor, and/or the like. In some embodiments, the processing acceleration unit 1806 may include or work in conjunction with an acceleration engine such as that disclosed herein to improve computer system functioning.

I/O subsystem 1808 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1800 may comprise a storage subsystem 1818 that comprises software elements, shown as being currently located within a system memory 1810. System memory 1810 may store program instructions that are loadable and executable on processing unit 1804, as well as data generated during the execution of these programs. Depending on the configuration and type of computer system 1800, system memory 1810 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1804. In some implementations, system memory 1810 may include multiple different types of memory, such as static random access memory (SRAM) or dynamic random access memory (DRAM). In some implementations, a basic input/output system (BIOS), containing the basic routines that help to transfer information between elements within computer system 1800, such as during start-up, may typically be stored in the ROM. By way of example, and not limitation, system memory 1810 also illustrates application programs 1812, which may include client applications, Web browsers, mid-tier applications, relational database management systems (RDBMS), etc., program data 1814, and an operating system 1816. By way of example, operating system 1816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1818 may also provide a tangible computer-readable storage medium for storing the basic programming and data constructs that provide the functionality of some embodiments. Software (programs, code modules, instructions) that when executed by a processor provide the functionality described above may be stored in storage subsystem 1818. These software modules or instructions may be executed by processing unit 1804. Storage subsystem 1818 may also provide a repository for storing data used in accordance with the present invention.

Storage subsystem 1800 may also include a computer-readable storage media reader 1820 that can further be connected to computer-readable storage media 1822. Together and, optionally, in combination with system memory 1810, computer-readable storage media 1822 may comprehensively represent remote, local, fixed, and/or removable storage devices plus storage media for temporarily and/or more permanently containing, storing, transmitting, and retrieving computer-readable information.

Computer-readable storage media 1822 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1800.

By way of example, computer-readable storage media 1822 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1822 may include, but is not limited to, Zip® drives, flash memory cards, universal serial bus (USB) flash drives, secure digital (SD) cards, DVD disks, digital video tape, and the like. Computer-readable storage media 1822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magneto resistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1800.

Communications subsystem 1824 provides an interface to other computer systems and networks. Communications subsystem 1824 serves as an interface for receiving data from and transmitting data to other systems from computer system 1800. For example, communications subsystem 1824 may enable computer system 1800 to connect to one or more devices via the Internet. In some embodiments communications subsystem 1824 can include radio frequency (RF) transceiver components for accessing wireless voice and/or data networks (e.g., using cellular telephone technology, advanced data network technology, such as 18G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1824 can provide wired network connectivity (e.g., Ethernet) in addition to or instead of a wireless interface.

In some embodiments, communications subsystem 1824 may also receive input communication in the form of structured and/or unstructured data feeds 1826, event streams 1828, event updates 1830, and the like on behalf of one or more users who may use computer system 1800. By way of example, communications subsystem 1824 may be configured to receive data feeds 1826 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1824 may also be configured to receive data in the form of continuous data streams, which may include event streams 1828 of real-time events and/or event updates 1830, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like. Communications subsystem 1824 may also be configured to output the structured and/or unstructured data feeds 1826, event streams 1828, event updates 1830, and the like to one or more databases that may be in communication with one or more streaming data source computers coupled to computer system 1800.

Computer system 1800 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system. Due to the ever-changing nature of computers and networks, the description of computer system 1800 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Also, the terms in the claims have their plain, ordinary meaning unless otherwise explicitly and clearly defined by the patentee. The indefinite articles "a" or "an," as used in the claims, are defined herein to mean one or more than one of the element that the particular article introduces; and subsequent use of the definite article "the" is not intended to negate that meaning. Furthermore, the use of ordinal number terms, such as "first," "second," etc., to clarify different elements in the claims is not intended to impart a particular position in a series, or any other sequential character or order, to the elements to which the ordinal number terms have been applied.

What is claimed:

1. A method comprising:
receiving, via a block storage system, a first set of one or more requests to perform a first transaction with respect to a file;
storing, via the block storage system, data blocks and corresponding metadata in one or more storage devices of the block storage system, wherein:
the data blocks correspond to the file, and
the data blocks and the corresponding metadata are stored separately as logical blocks according to a tree hierarchy;
causing storage, in a cloud object store, of a set of cloud storage objects, where the set of cloud storage objects comprises data of the data blocks and the corresponding metadata of the tree hierarchy, and the causing storage comprises causing communication of a second set of one or more requests to the cloud object store to specify storage of the set of cloud storage objects in the cloud object store so that the set of cloud storage objects preserves the data of the data blocks, the corresponding metadata, and relationships of the data blocks and the corresponding metadata according to the tree hierarchy, wherein the set of cloud storage objects is stored in the cloud object store to correspond to a cloud-based instantiation of the tree hierarchy;
receiving, via the block storage system, a third set of one or more requests to perform a second transaction with respect to the file;
converting at least one I/O request, corresponding to the third set of one or more requests, into an object interface request; and
transferring the object interface request to cause communication with the cloud object store to perform at least one I/O operation with respect to at least a subset of the set of cloud storage objects.

2. The method as recited in claim 1, wherein the causing the communication of the second set of one or more requests to the cloud object store comprises:
transferring a fourth set of one or more requests to a cloud daemon;
wherein, responsive to the fourth set of one or more requests, the cloud daemon communicates, via an object protocol over one or more networks, with the cloud object store to specify storage of the set of cloud storage objects.

3. The method as recited in claim 1, further comprising:
converting a plurality of requests that are compliant with Portable Operating System Interface (POSIX) into a plurality of object interface requests to perform operations with respect to the cloud-based instantiation of the tree hierarchy stored in the cloud object store, where the plurality of requests comprises the at least one I/O request and the plurality of object interface requests comprises the object interface request.

4. The method as recited in claim 1, further comprising:
translating the third set of one or more requests into the at least one I/O request to perform the at least one I/O operation, where the transferring the object interface request comprises communicating with the cloud object store to perform the at least one I/O operation with respect to at least the subset of the set of cloud storage objects.

5. The method as recited in claim 4, wherein the I/O operation corresponds to a write operation and is performed according to a copy-on-write process with respect to at least the subset of the set of cloud storage objects in the cloud object store.

6. The method as recited in claim 5, wherein the specifying the storage of the set of cloud storage objects in the cloud object store comprises:
specifying a first object size to store a first subset of the set of cloud storage objects that are identified as being of a first data type; and
specifying a second object size to store a second subset of the set of cloud storage objects that are identified as being of a second data type;
wherein the first object size is different from the second object size, and the first data type is different from the second data type.

7. A system comprising:
one or more processors communicatively coupled to memory, the one or more processors to facilitate:
processing a first set of one or more requests to perform a first transaction with respect to a file;
storing data blocks and corresponding metadata in one or more storage devices of a block storage system, wherein:
the data blocks correspond to the file, and
the data blocks and the corresponding metadata are stored separately as logical blocks according to a tree hierarchy;
causing storage, in a cloud object store, of a set of cloud storage objects, where the set of cloud storage objects comprises data of the data blocks and the corresponding metadata of the tree hierarchy, and the causing storage comprises causing communication of a second set of one or more requests to the cloud object store to specify storage of the set of cloud storage objects in the cloud object store so that the set of cloud storage objects preserves the data of the data blocks, the corresponding metadata, and relationships of the data blocks and the corresponding metadata according to the tree hierarchy, wherein the set of cloud storage objects is stored in the cloud object store to correspond to a cloud-based instantiation of the tree hierarchy;
processing a third set of one or more requests to perform a second transaction with respect to the file;
converting at least one I/O request, corresponding to the third set of one or more requests, into an object interface request; and
transferring the object interface request to cause communication with the cloud object store to perform at least one I/O operation with respect to at least a subset of the set of cloud storage objects.

8. The system as recited in claim 7, wherein the causing the communication of the second set of one or more requests to the cloud object store comprises:
transferring a fourth set of one or more requests to a cloud daemon;
wherein, responsive to the fourth set of one or more requests, the cloud daemon communicates, via an object protocol over one or more networks, with the cloud object store to specify storage of the set of cloud storage objects.

9. The system as recited in claim 8, the one or more processors further to facilitate:
converting a plurality of requests that are compliant with Portable Operating System Interface (POSIX) into a plurality of object interface requests to perform operations with respect to the cloud-based instantiation of the tree hierarchy stored in the cloud object store, where the plurality of requests comprises the at least one I/O request and the plurality of object interface requests comprises the object interface request.

10. The system as recited in claim 7, the one or more processors further to facilitate:
translating the third set of one or more requests into the at least one I/O request to perform the at least one I/O operation, where the transferring the object interface request comprises communicating with the cloud object store to perform the at least one I/O operation with respect to at least the subset of the set of cloud storage objects.

11. The system as recited in claim 10, wherein the I/O operation corresponds to a write operation and is performed according to a copy-on-write process with respect to at least the subset of the set of cloud storage objects in the cloud object store.

12. The system as recited in claim 11, wherein the specifying the storage of the set of cloud storage objects in the cloud object store comprises:
specifying a first object size to store a first subset of the set of cloud storage objects that are identified as being of a first data type; and
specifying a second object size to store a second subset of the set of cloud storage objects that are identified as being of a second data type;
wherein the first object size is different from the second object size, and the first data type is different from the second data type.

13. The system as recited in claim 12, further comprising the block storage system.

14. One or more non-transitory, machine-readable media having machine-readable instructions thereon which, when executed by one or more processors, cause the one or more processors to perform operations comprising:
processing a first set of one or more requests to perform a first transaction with respect to a file;
causing storing data blocks and corresponding metadata in one or more storage devices of a block storage system, wherein:
the data blocks correspond to the file, and
the data blocks and the corresponding metadata are stored separately as logical blocks according to a tree hierarchy;
causing storage, in a cloud object store, of a set of cloud storage objects, where the set of cloud storage objects comprises data of the data blocks and the corresponding metadata of the tree hierarchy, and the causing storage comprises causing communication of a second set of one or more requests to the cloud object store to specify storage of the set of cloud storage objects in the cloud object store so that the set of cloud storage objects preserves the data of the data blocks, the corresponding metadata, and relationships of the data blocks and the corresponding metadata according to the tree hierarchy, wherein the set of cloud storage objects is stored in the cloud object store to correspond to a cloud-based instantiation of the tree hierarchy;
processing a third set of one or more requests to perform a second transaction with respect to the file;
converting at least one I/O request, corresponding to the third set of one or more requests, into an object interface request; and
causing transferring the object interface request to cause communication with the cloud object store to perform at least one I/O operation with respect to at least a subset of the set of cloud storage objects.

15. The one or more non-transitory, machine-readable media as recited in claim 14, wherein the causing the communication of the second set of one or more requests to the cloud object store comprises:
causing transferring a fourth set of one or more requests to a cloud daemon;
wherein, responsive to the fourth set of one or more requests, the cloud daemon communicates, via an object protocol over one or more networks, with the cloud object store to specify storage of the set of cloud storage objects.

16. The one or more non-transitory, machine-readable media as recited in claim 14, wherein the operations further comprise:
converting a plurality of requests that are compliant with Portable Operating System Interface (POSIX) into a plurality of object interface requests to perform operations with respect to the cloud-based instantiation of the tree hierarchy stored in the cloud object store, where the plurality of requests comprises the at least one I/O request and the plurality of object interface requests comprises the object interface request.

17. The one or more non-transitory, machine-readable media as recited in claim 14, wherein the operations further comprise:
translating the third set of one or more requests into the at least one I/O request to perform the at least one I/O operation, where the transferring the object interface request comprises communicating with the cloud object store to perform the at least one I/O operation with respect to at least the subset of the set of cloud storage objects.

* * * * *

UNITED STATES PATENT AND TRADEMARK OFFICE
CERTIFICATE OF CORRECTION

PATENT NO. : 11,442,898 B2
APPLICATION NO. : 16/822406
DATED : September 13, 2022
INVENTOR(S) : Kremer et al.

It is certified that error appears in the above-identified patent and that said Letters Patent is hereby corrected as shown below:

In the Drawings

On sheet 2 of 25, in FIG. 2, under Reference Numeral 226-1, Line 1, delete "Arrary)" and insert -- Array) --, therefor.

On sheet 2 of 25, in FIG. 2, under Reference Numeral 226-2, Line 1, delete "Arrary)" and insert -- Array) --, therefor.

On sheet 7 of 25, in FIG. 5, under Reference Numeral 226-1, Line 1, delete "Arrary)" and insert -- Array) --, therefor.

On sheet 21 of 25, in FIG. 14, under Reference Numeral 226-1, Line 1, delete "Arrary)" and insert -- Array) --, therefor.

In the Specification

In Column 5, Line 42, delete "stored stored" and insert -- stored --, therefor.

In Column 5, Line 63, delete "trouble shooting" and insert -- troubleshooting --, therefor.

In Column 9, Line 1, delete "filesystems's" and insert -- filesystem's --, therefor.

In Column 9, Line 1, delete "By" and insert -- by --, therefor.

In Column 9, Line 28, delete "taken" and insert -- taken. --, therefor.

In Column 24, Line 7, delete "filesystems's" and insert -- filesystem's --, therefor.

In Column 24, Line 7, delete "By" and insert -- by --, therefor.

Signed and Sealed this
Twenty-eighth Day of February, 2023

*Katherine Kelly Vidal*
Katherine Kelly Vidal
*Director of the United States Patent and Trademark Office*

CERTIFICATE OF CORRECTION (continued)
U.S. Pat. No. 11,442,898 B2

In Column 24, Line 36, delete "taken" and insert -- taken. --, therefor.

In Column 25, Line 35, delete "EMU" and insert -- DMU --, therefor.

In Column 26, Line 63, delete "objet" and insert -- object --, therefor.

In Column 34, Line 27, delete "LSARC" and insert -- L2ARC --, therefor.

In Column 34, Line 29, delete "LSARC" and insert -- L2ARC --, therefor.